(12) United States Patent
Wichelman et al.

(10) Patent No.: US 12,430,222 B2
(45) Date of Patent: Sep. 30, 2025

(54) DEDICATED CLOUD REGIONS AT CUSTOMER PREMISES

(71) Applicant: Oracle International Corporation, Redwood Shores, CA (US)

(72) Inventors: James Walter Wichelman, Fort Collins, CO (US); Eric J. Lundy, Omaha, NE (US); Chandramohan Krishnamoorthy, Thornton, CO (US); Andreas Lemos, Winter Garden, FL (US); Travis Lauren Anderson, Saint Augustine, FL (US); Alyssa Wachs Augsburger, Arvada, CO (US); Sidney Lorenzo Bowen, Loveland, CO (US); Jagwinder Singh Brar, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/449,615

(22) Filed: Aug. 14, 2023

(65) Prior Publication Data

US 2024/0054063 A1    Feb. 15, 2024

Related U.S. Application Data

(60) Provisional application No. 63/381,262, filed on Oct. 27, 2022, provisional application No. 63/379,427, (Continued)

(51) Int. Cl.
*G06F 11/34*  (2006.01)
*G06F 9/50*   (2006.01)

(52) U.S. Cl.
CPC ........ *G06F 11/3442* (2013.01); *G06F 9/5072* (2013.01)

(58) Field of Classification Search
CPC ................. G06F 11/3442; G06F 9/5072
(Continued)

(56) References Cited

U.S. PATENT DOCUMENTS

| 8,271,536 B2 * | 9/2012 | Amradkar | H04L 63/105 |
| | | | 707/E17.014 |
| 11,411,815 B1 | 8/2022 | Shrestha et al. | |

(Continued)

FOREIGN PATENT DOCUMENTS

CN        111090559 B  *  9/2023  .......... G06F 11/3034

OTHER PUBLICATIONS

About Blue Medora, Google Cloud, Jan. 17, 2023, 4 pages.
(Continued)

*Primary Examiner* — Wing F Chan
*Assistant Examiner* — John Fan
(74) *Attorney, Agent, or Firm* — Kilpatrick Townsend & Stockton LLP

(57) ABSTRACT

Techniques are disclosed for managing aspects of a dedicated region cloud at a customer location (a "DRCC"). A DRCC may comprise cloud infrastructure components provided by a cloud provider and hosted by computing devices located at the customer's (a "cloud owner's") location. Services of the central cloud-computing environment may be similarly executed at the DRCC. The DRCC may include a service configured to collect, store, and/or present data corresponding to the cloud infrastructure components via one or more interfaces (e.g., interfaces provided to the cloud provider and/or the cloud owner). Data collected within the DRCC (e.g., capacity and usage data, etc.) may be provided and accessible to the central cloud at any suitable time. Obtaining such data enables the user to ascertain various operational aspects of the DRCC, while enabling the system and/or user to execute various DRCC-specific operations (Continued)

regarding capacity planning, health and performance, change management, and the like.

17 Claims, 33 Drawing Sheets

Related U.S. Application Data filed on Oct. 13, 2022, provisional application No. 63/402,026, filed on Aug. 29, 2022, provisional application No. 63/398,134, filed on Aug. 15, 2022.

(58) Field of Classification Search
USPC .......................................................... 709/224
See application file for complete search history.

(56) References Cited

U.S. PATENT DOCUMENTS

| | | | |
|---|---|---|---|
| 2012/0179802 A1 | 7/2012 | Narasimhan et al. | |
| 2014/0258446 A1* | 9/2014 | Bursell | G06F 9/45558 709/217 |
| 2014/0280595 A1* | 9/2014 | Mani | H04L 67/10 709/204 |
| 2015/0006733 A1* | 1/2015 | Khan | H04L 47/808 709/226 |
| 2015/0178401 A1 | 6/2015 | Wilcox | |
| 2015/0188927 A1 | 7/2015 | Santhi et al. | |
| 2016/0011896 A1 | 1/2016 | Khalid | |
| 2017/0318083 A1 | 11/2017 | Ignatyev | |
| 2020/0104377 A1 | 4/2020 | Earnesty, Jr. et al. | |
| 2021/0067423 A1* | 3/2021 | Newman | H04L 41/5048 |

OTHER PUBLICATIONS

AWS Outposts Family, AWS, Accessed from Internet on Jan. 20, 2023, 8 pages.
AWS Outposts User Guide for racks, AWS, 2023, 97 pages.
Collecting Metrics from On-Premise and Hybrid Cloud, Google Cloud, Jan. 17, 2023, 1 page.
HPE Datacenter Care Flexible Capacity Delivering Investment Flexibility, Hewlett Packard Enterprise, Nov. 2016, 2 pages.
In-House Private Cloud, Serverbasket.com, Available Online at: https://www.serverbasket.com/shop/on-premise-cloud-india/, Accessed from Internet on Jan. 20, 2023, 13 pages.
Oracle Exadata, Wikipedia, Available online at: https://en.wikipedia.org/w/index.php?title=Oracle_Exadata&oldid=1033323235, Jul. 12, 2021, 4 pages.
Responsibilities with Satellite Infrastructure Service, IBM Cloud Docs, Dec. 13, 2022, 14 pages.
VMware vRealize® Cloud Universal™, Available Online at https://www.vmware.com/agreements, Aug. 30, 2022, 10 pages.
Parker, IBM Cloud Satellite Infrastructure Service: Get the Best of Public and Private Cloud, IBM, Jul. 26, 2021, 2 pages.
International Application No. PCT/US2023/030273, International Search Report and Written Opinion mailed on Nov. 8, 2023, 15 pages.
International Application No. PCT/US2023/073000, International Search Report and Written Opinion mailed on Nov. 22, 2023, 17 pages.
Vemulapalli, New Option for IBM Cloud Satellite Offers Integrated Experience, IBM Newsroom—Latest News, Mar. 1, 2021, 2 pages.
Yan et al., Infrastructure Management of Hybrid Cloud for Enterprise Users, 5th International DMTF Academic Alliance Workshop on Systems and Virtualization Management: Standards and the Cloud (SVM), 2011, 6 pages.

* cited by examiner

DRCC Utilization Dashboard — 502

☐ UTILIZATION < 0.8   ▦ UTILIZATION < 0.9   ▪ UTILIZATION ≥ 0.9

| Region Code | Name | 1. AMD | 2. Intel | 3. Dense INT | 4. DB | 5. Block (TiB) | 6. FSS (TiB) | 7. Physical Spc |
|---|---|---|---|---|---|---|---|---|
| R1 | Comp2 | 87% | 87% | 78% | 56% | 20% | 14% | 69% |
| R2 | Red | 25% | 25% | 82% | 88% | 46% | 55% | 67% |
| R3 | BDB-2 | 74% | 74% | 89% | 56% | 15% | 16% | 100% |
| R4 | AADC | 76% | 76% | 65% | 67% | 9% | 5% | 65% |

DRCC Utilization Details — 504

☐ UTILIZATION < 0.8   ▦ UTILIZATION < 0.9   ▪ UTILIZATION ≥ 0.9

| Region Code | Metric | 1. AMD | 2. Intel | 3. Dense INT | 4. DB | 5. Block (TB) | 6. FSS (TB) | 7. Phys. Space |
|---|---|---|---|---|---|---|---|---|
| R1 | 1. Total Capacity | 6,731 | 8,982 | 2,184 | 9 | 2,524 | 81 | 72 |
|  | 1.1 Available | 884 | 4,209 | 488 | 4 | 2,028 | 79 | 22 |
|  | 1.2 Unavailable | 5,847 | 4,773 | 1,696 | 5 | 496 | 11 | 50 |
|  | 1.2.1 OCI Used | 3,352 | 3,254 | 1,284 | 4 | 488 | 11 |  |
|  | 1.2.2 Customer Used | 123 | 0 | 0 | 1 | 7 | 9 |  |
|  | 1.2.3 Overhead | 452 | 1,146 | 252 |  |  |  |  |
|  | 1.2.4 Broken Pool | 1,920 | 373 | 160 |  |  |  |  |
| R2 | 1. Total Capacity | 10,562 | 21,277 | 2,184 | 25 | 5,427 | 121 | 124 |
|  | 1.1 Available | 7,905 | 6,081 | 388 | 3 | 2,952 | 55 | 41 |
|  | 1.2 Unavailable | 2,657 | 15,196 | 1,796 | 22 | 2,475 | 67 | 83 |
|  | 1.2.1 OCI Used | 2,216 | 7,026 | 1,444 | 7 | 958 | 23 |  |
|  | 1.2.2 Customer Used | 0 | 5,466 | 0 | 15 | 1,517 | 44 |  |
|  | 1.2.3 Overhead | 121 | 1,848 | 144 |  |  |  |  |
|  | 1.2.4 Broken Pool | 320 | 856 | 208 |  |  |  |  |
| R3 | 1. Total Capacity | 6,577 | 8,983 | 2,184 | 18 | 6,161 | 121 | 52 |
|  | 1.1 Available | 1,738 | 2,466 | 240 | 8 | 5,224 | 102 | 0 |
|  | 1.2 Unavailable | 4,839 | 6,517 | 1,944 | 10 | 937 | 19 | 52 |
|  | 1.2.1 OCI Used | 3,907 | 3,473 | 1,584 | 6 | 461 | 19 |  |
|  | 1.2.2 Customer Used | 0 | 593 | 0 | 4 | 476 | 0 |  |
|  | 1.2.3 Overhead | 804 | 2,020 | 204 |  |  |  |  |
|  | 1.2.4 Broken Pool | 128 | 431 | 156 |  |  |  |  |
| R4 | 1. Total Capacity | 13,468 | 8,892 | 2,028 | 9 | 5,345 | 81 | 78 |

*FIG. 5*

| Region Code | Customer | Substrate | Std Intel | Std AMD | Dense Intel | Block | Object | FSS | Exadata | Physical Space |
|---|---|---|---|---|---|---|---|---|---|---|
| > RG1A | CUST_A | 75% | 63% | 30% | 48% | 28% | 73% | 56% | 64% | 66% |
| > RG1B | CUST_A | 90% | 72% | 94% | 62% | 43% | 26% | 41% | 50% | 77% |
| > RG2A | CUST_A | 93% | 36% | 79% | 0% | 14% | 4% | 2% | 100% | 59% |
| > RG2B | CUST_A | 0% | 56% | 55% | 41% | 50% | 53% | 57% | 65% | 30% |
| > RG2C | CUST_A | 93% | 30% | 75% | 0% | 14% | 4% | 3% | 100% | 100% |
| > RG3A | CST B | 62% | 59% | 56% | 40% | 60% | 62% | 75% | 73% | 58% |
| > RG3B | CST B | 94% | 20% | 80% | 0% | 14% | 4% | 3% | 100% | 96% |
| > RG8A | CST C | 85% | 55% | 73% | 86% | 55% | 64% | 67% | 94% | 74% |
| > RG8B | CST C | 81% | 77% | 86% | 85% | 28% | 77% | 24% | 80% | 54% |
| TOTAL CAPACITY | | 24,244 | 8,736 | 6,647 | 2,184 | 4,973 | 3,789 | 134 | 15 | 113 |
| AVAILABLE | | 2,532 | 2,007 | 897 | 328 | 3,572 | 861 | 101 | 3 | 51 |
| UNAVAILABLE | | 17,712 | 6,729 | 5,749 | 1,856 | 1,400 | 3,017 | 33 | 12 | 62 |
| CUSTOMER USED | | 0 | 1,394 | 0 | 0 | 572 | 232 | 4 | 7 | 0 |
| PROVIDER USED | | 11,460 | 3,646 | 4,804 | 1,620 | 827 | 2,785 | 29 | 5 | 0 |
| OVERHEAD | | 6,252 | 1,689 | 945 | 236 | 0 | 0 | 0 | 0 | 0 |

FIG. 9

IMPLEMENT, AT LEAST IN PART, A DEDICATED REGION CLOUD COMPRISING A PLURALITY OF CLOUD INFRASTRUCTURE COMPONENTS PROVIDING CORRESPONDING CLOUD SERVICES ASSOCIATED WITH A CLOUD SERVICE PROVIDER, THE PLURALITY OF CLOUD INFRASTRUCTURE COMPONENTS BEING HOSTED BY ONE OR MORE COMPUTING DEVICES LOCATED AT A THIRD-PARTY LOCATION, THE THIRD-PARTY LOCATION BEING ASSOCIATED WITH A THIRD-PARTY ENTITY THAT IS DIFFERENT FROM THE CLOUD SERVICE PROVIDER
2602

OBTAIN CAPACITY AND USAGE DATA CAPACITY AND USAGE DATA ASSOCIATED WITH AT LEAST ONE OF THE PLURALITY OF CLOUD INFRASTRUCTURE COMPONENTS
2604

EXECUTE, WITHIN THE DEDICATED REGION CLOUD LOCATED AT THE THIRD-PARTY LOCATION, A CONTROL CENTER SERVICE THAT PROCESSES AND PRESENTS, AT A USER INTERFACE HOSTED WITHIN THE DEDICATED REGION CLOUD, AT LEAST A PORTION OF THE CAPACITY AND USAGE DATA THAT IS ASSOCIATED WITH THE AT LEAST ONE OF THE PLURALITY OF CLOUD INFRASTRUCTURE COMPONENTS CLOUD
2606

STORE THE CAPACITY AND USAGE DATA WITHIN A DATA STORE OF THE DEDICATED REGION CLOUD FOR SUBSEQUENT USE
2608

DEDICATED CLOUD REGIONS AT CUSTOMER PREMISES

CROSS REFERENCE TO RELATED APPLICATIONS

The present application claims priority to U.S. Provisional Application No. 63/398,134, filed on Aug. 15, 2022, entitled "Multiple Top-of-Rack (TOR) Switches Connected to a Network Virtualization Device," U.S. Provisional Application No. 63/402,026, filed Aug. 29, 2022, entitled "Dedicate Cloud Regions at Customer Premises," U.S. Provisional Application No. 63/379,427, filed Oct. 13, 2022, entitled "Dedicated Cloud Regions at Customer Premises," and U.S. Provisional Application No. 63/381,262, filed on Oct. 27, 2022, entitled "NETWORK ARCHITECTURE FOR DEDICATED REGION CLOUD AT CUSTOMER (DRCC)," the content of which are herein incorporated by reference in their entirety for all purposes.

BACKGROUND

In cloud computing, processing and storage is generally performed by one or more service providers implemented at a centralized location. Data can be received from customers at the centralized location, processed there, and then processed (or other) data can be transmitted back to customers. However, having a centralized location for cloud infrastructure components may not be ideal for all users. Some users may wish to host cloud infrastructure components with hardware located on their premises. These users may generally be referred to as "cloud owners." The cloud owner may have unique needs and challenges with respect to hosting these resources including, but not limited to capacity management, expansion management, health and performance tracking, change management, and the like. Techniques discussed herein are intended to address these aspects of cloud management.

BRIEF SUMMARY

In the following description, for the purposes of explanation, specific details are set forth in order to provide a thorough understanding of certain embodiments. However, it will be apparent that various embodiments may be practiced without these specific details. The figures and description are not intended to be restrictive.

Some embodiments may include a method. The method may comprise implementing, at least in part by a computing device, a dedicated region cloud comprising a plurality of cloud infrastructure components providing corresponding cloud services associated with a cloud service provider. In some embodiments, the plurality of cloud infrastructure components may be hosted by one or more computing devices located at a third-party location. The third-party location may be associated with a third-party entity that is different from the cloud service provider. The method may comprise obtaining, by the computing device, capacity and usage data associated with at least one of the plurality of cloud infrastructure components. The method may comprise executing, by the computing device and within the dedicated region cloud located at the third-party location, a control center service that processes and presents, at a user interface hosted within the dedicated region cloud, at least a portion of the capacity and usage data that is associated with the at least one of the plurality of cloud infrastructure components cloud. The method may comprise storing, by the computing device, the capacity and usage data within a data store of the dedicated region cloud for subsequent use.

In some embodiments, the capacity and usage data is initially obtained by a data processing service operating in a separate tenancy from a tenancy associated with the third-party entity.

In some embodiments, the capacity and usage data presented at the user interface comprises physical space data indicates a number of units of physical space available for placing additional computing devices at the third-party location.

In some embodiments, the user interface hosted within the dedicated region cloud is implemented based at least in part on a console plug-in installed with a preexisting dedicated region console of the dedicated region cloud.

In some embodiments, the capacity and usage data comprises first capacity and usage data corresponding to the third-party entity and second capacity and usage data corresponding to the cloud service provider.

In some embodiments, storing the capacity and usage data within the data store of the dedicated region cloud causes the capacity and usage data to be obtained by one or more corresponding computing devices of a central cloud-computing environment hosted by the cloud service provider.

In some embodiments, at least one of the one or more corresponding computing devices of the central cloud-computing environment presents the first capacity and usage data with additional capacity and usage data that was obtained from one or more additional dedicated region clouds that are individually associated with a respective third-party entity.

Systems, devices, and computer media are disclosed, each of which may comprise one or more memories on which instructions corresponding to the methods disclosed herein may be stored. The instructions may be executed by one or more processors of the disclosed systems and devices to execute the methods disclosed herein. One or more computer programs can be configured to perform operations corresponding to the described methods by virtue of including instructions that, when executed one or more processors, cause the one or more processors to perform the operations.

BRIEF DESCRIPTION OF THE DRAWINGS

To easily identify the discussion of any particular element or act, the most significant digit or digits in a reference number refer to the figure number in which that element is first introduced.

FIG. 5 is a block diagram depicting an exemplary user interface presenting data DRCC utilization details, according to at least one embodiment.

FIG. 9 is a block diagram depicting an exemplary user interface presenting an executive capacity dashboard, according to at least one embodiment.

FIG. 26 is a block diagram illustrating an exemplary method for obtaining capacity and usage data within a dedicated region cloud, according to at least one embodiment.

DETAILED DESCRIPTION

Figure 1:
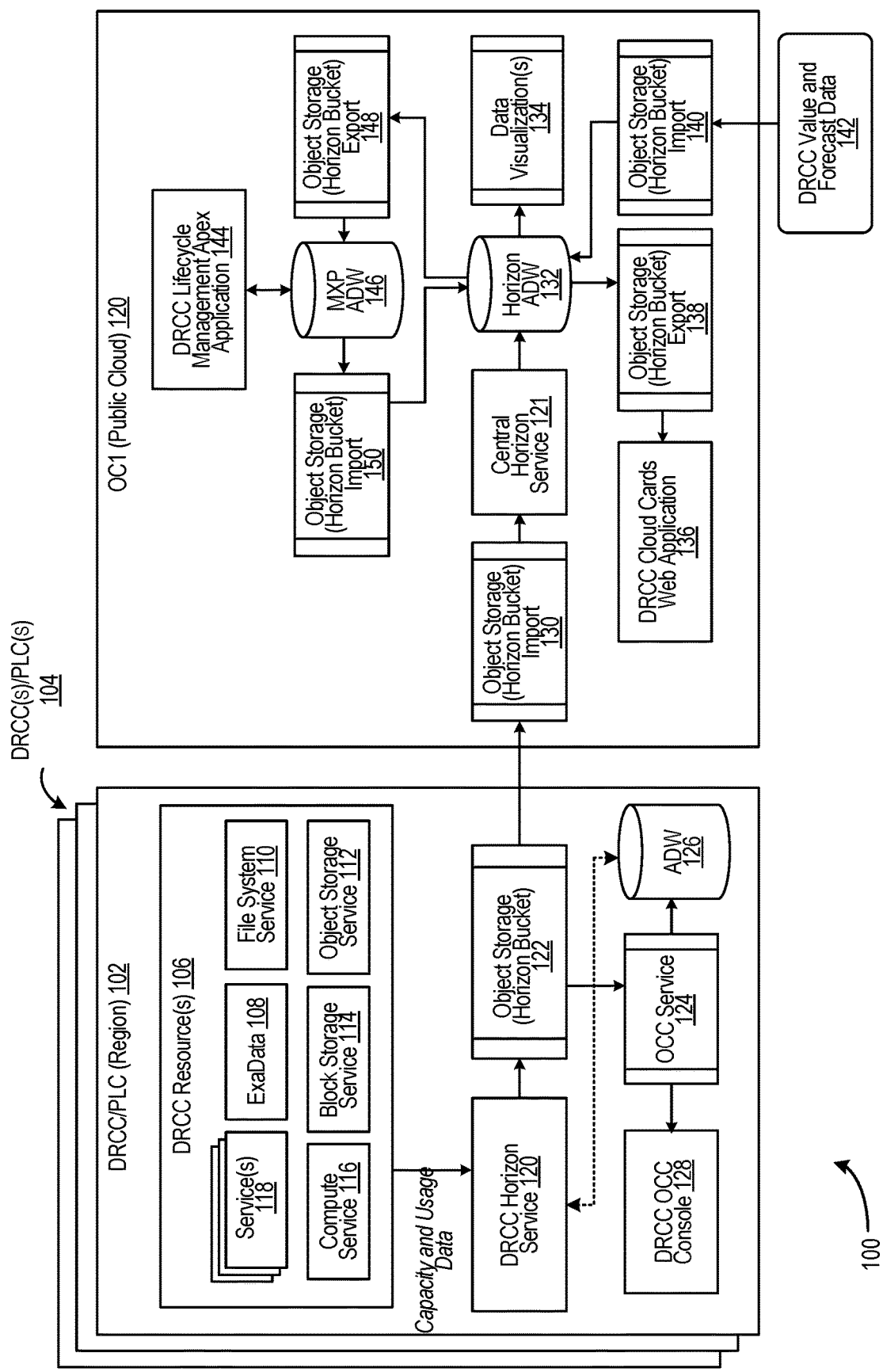
FIG. 1 is a block diagram of an environment in which a Dedicated Region Cloud (a "DRCC") is hosted at a customer, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

Infrastructure as a service (IaaS) is one type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. In some embodiments, an entity may deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like. IaaS provisioning may refer to acquiring computers or virtual hosts for use, and even installing needed libraries or services on them. In most cases, deployment does not include provisioning, and the provisioning may need to be performed first.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Dedicated Region Cloud at Customer Environments

The present disclosure relates to Dedicated Region Clouds at Customer (DRCCs) that host infrastructure and services provided by a cloud service provider (CSP) (also referred to as "cloud provider," for brevity) that are deployed and operate at computing devices that are physically located at a customer's (e.g., a "cloud owner's") own datacenter. With DRCCs, enterprises can easily consolidate mission-critical database systems, with applications that were previously deployed on expensive hardware on the highly available and secure infrastructure of the CSP, thereby creating operational efficiencies and modernization opportunities.

The DRCC framework brings the full capabilities of the public cloud on-premises, so that enterprises can reduce infrastructure and operational costs, upgrade legacy applications on modern cloud services, and meet the most demanding regulatory, data residency, and latency requirements—all with the infrastructure of the CSP, which offers enhanced performance and highest levels of security. Customers get the choice and flexibility to run all the cloud services of the CSP in their data centers. Customers can choose from all public cloud services provided by the CSP, for example, including VMware Cloud, Autonomous Database, Container Engine for Kubernetes, Bare Metal Servers, Exadata Cloud Service, and only pay for services they consume. The DRCC framework is designed to keep data and customer operations completely isolated from the internet—where the control plane and data plane operations remain on-premises—to help customers meet their most demanding compliance and latency requirements. With a fully managed experience and access to new capabilities the moment they become available in the public cloud, the DRCC framework offers cloud-scale security, resiliency and scale, and support for mission-critical workloads with the tools to incrementally modernize legacy workloads.

In some examples, a dedicated cloud region (and/or realm) may be hosted using hardware located at a customer's (e.g., a "cloud owner's") premises. This cloud environment may be referred to as a "Dedicated Region Cloud at Customer" (DRCC) environment (or "DRCC," for brevity). A DRCC may provide similar services and functionality as would be available in a centralized cloud environment more traditionally managed by the cloud provider at the cloud-provider's premises. One example of a centralized cloud (referred to as a "central cloud," an "OCI cloud" or "a public cloud" herein) may be an IaaS environment that is publicly available to many customers and hosted with, for example, Oracle Cloud Infrastructure (OCI). Similar techniques discussed herein can be applied to a Private Label Cloud. A "Private Label Cloud" (PLC) refers to a cloud environment which is managed by a cloud provider (e.g., Oracle, etc.) but is branded as if it is being offered by a third-party (e.g., the customer). While examples herein are discussed in reference to a DRCC, any reference to functionality or features provided in a DRCC can be similarly provided in a PLC.

Hosting the cloud at the customer's location introduces unique needs for the cloud owner (e.g., the DRCC customer). The DRCC customer is unique from the standard public cloud customer due to the heightened responsibilities for the facility in which the DRCC runs. The DRCC customer may act more like a partner with the cloud provider than a typical public cloud consumer. While the cloud provider may manage most of the infrastructure of the DRCC, the customer has substantial responsibilities and stake in ensuring their DRCC functions effectively. These responsibilities require the customer to have a different level of insight into the physical infrastructure running in their data center than a public cloud customer.

Customers may be provided with the tools to effectively manage their DRCCs while keeping the same public cloud (e.g., OCI) experience. DRCC customers will require a rich set of tools to manage various aspects (e.g., operations and capacity) of their DRCC. The techniques disclosed herein diverge from the public cloud experience with respect to an increased visibility into the underpinnings of the DRCC and its operational activities enabling the user to access (via the user interfaces of FIGS. 4-22 discussed herein) data that was previously unavailable and/or inaccessible to customers.

The disclosed techniques are directed to managing a DRCC. In some embodiments, a OCI Control Center (OCC) service may be used to provide a variety of tools for managing aspects of a DRCC related to facilities management, consumption reporting, capacity planning, health and performance, change management, and alerts, to name a few. While user interfaces discussed herein are directed to presenting capacity and usage data corresponding to capacity planning, it should be appreciated that any suitable combination of data related to facilities management, consumption reporting, capacity planning, health and performance, change management, and alerts may be presented. The term "OCI Control Center (OCC) is intended to refer to any suitable service configured to manage aspects of a DRCC regardless of whether the service is provided by Oracle. In some embodiments, the DRCC may include resources of a public cloud (e.g., any suitable combination of the cloud services provided in OCI) while providing these resources via a smaller form factor than a conventional cloud computing environment (e.g., 33 racks instead of 45 racks, for example). The OCC service may be configured to provide region and/or realm level information and across tenancies and/or compartment. The information provided by the service (e.g., capacity/usage data for each region) may aid the user in forecasting and workload planning. By way of example, a user may view usage and availability details regarding compute cores, block storage, object storage, file storage, database resources, physical space (e.g., floor tiles), server resources/racks, network resources/racks, and power consumption. A console (or console plug-in implemented for an existing console) may be used to display information related to any suitable aspect of managing the DRCC.

A Horizon Service can be utilized to collect a variety of data corresponding to the operations provided by the DRCC. The term "Horizon Service" refers to any suitable service configured to collect any suitable usage or capacity data corresponding to resources (e.g., hardware, software, physical devices/racks, etc.) of the DRCC. By way of example, this data may relate to any suitable combination of resource capacity, health and performance, change management, expansion management, and the like. The Horizon Service may collect this data at any suitable frequency, according to a schedule, upon request, or the like. In some embodiments, the data collection process performed by the Horizon Service may be invoked/triggered by one or more other services and/or components of the DRCC. Once collected, the data may be stored in a data store that is local with respect to the DRCC. In some embodiments, the data may be pushed to a data store of the public cloud (e.g., OCI), or a corresponding service of the central cloud may be configured to obtain the data stored at the data store of the DRCC. One or more interfaces (e.g., provided by a console plug-in for DRCC OCC Console 128, the DRCC OCC Console 128 sans plug-in, etc.) may be utilized to present at least some portion of this data to the user of the DRCC. In some embodiments, this data may be specific to the DRCC (e.g., to a realm or region(s) corresponding to the DRCC, including region 102). In some embodiments, a user associated with the cloud provider (e.g., an OCI Operator) may view the data specific to any suitable number of DRCCs, including the customer's DRCC of the ongoing example. Data obtained with the DRCC may be utilized within the DRCC hosted at the customer's location, as well as the central cloud hosted by the cloud provider at the cloud provider's location, to view any suitable aspect of the operations at the DRCC for any suitable combination of identifying resource capacity, identifying health and performance, performing change management, expansion management, and the like.

The ability to monitor DRCC data is paramount for capacity planning, facilities management, consumption reporting, health and performance, change management, and the like. While conventional cloud customers had no need to review this information as the cloud provider (OCI) managed the hardware of the cloud, in a DRCC, the customer hosts the hardware at their premises. Conventionally, the data related to capacity planning, facilities management, consumption reporting, health and performance, change management, as well as various alerts were provided to the cloud provider alone. Managing such data within the DRCC, as well as providing tools to review this data, was not previously implemented. With the move of this hardware to the customer's premises, there is also a need to ensure the data is synchronized within the central cloud (OCI). The techniques described herein provide the ability for users associated with the cloud owner as well as users associated with the cloud service provider to obtain this data. The user interfaces discussed herein enable both types of users to manage and monitor various aspects of the DRCC which is essential for ensuring the operational performance of the components of the DRCC.

Moving on to the figures, FIG. 1 is a block diagram of an environment 100 in which a Dedicated Region Cloud (a "DRCC") is hosted at a customer premises and interacts with public cloud infrastructure of a cloud provider, according to at least one embodiment. Region 102 may be one of many DRCC(s) or private label cloud(s) (e.g., DRCC(s)/PLC(s) 104). In a DRCC, the customer may own the hardware which hosts region 102. The region 102 may be managed by a cloud service provider. In a PLC, the hardware owner (e.g., the cloud customer) may utilize region 102 to provide cloud services to its customers under its own label.

Region 1002 may include DRCC resource(s) 106 including, but not limited to Exadata 108, File System Service 110, Object Storage Service 112, Block Storage Service 114, Compute Service 116, and service(s) 118 which may include any suitable number of services configured to provide cloud services similar to those accessible within a public cloud. OC1 120 may be an example of a public cloud.

Region 102 may include DRCC Horizon Service 120 which may be configured to obtain capacity and usage data associated with the hardware hosting region 102. Capacity and usage data may include any suitable data related to compute, block storage, object storage, file storage, database resources, physical space, server resources, networking resources, power consumption, or the like. Specific examples of such data may be presented and discussed in further detail with respect to FIGS. 4-22 below. In some embodiments, DRCC Horizon Service 120 may be configured to communicate with any suitable combination of DRCC resource(s) 106 to obtain any suitable information corresponding to capacity management, expansion management, health and performance tracking, change management, and the like.

In some embodiments, DRCC Horizon Service 120 may be a lightweight version of the Central Horizon Service 121 of OC1 120 and may be configured to provide a subset of the functionality provided by Central Horizon Service 121. By way of example, in some embodiments, DRCC Horizon Service 120 may be configured to obtain only capacity management data, while the Central Horizon Service 121 may be configured to obtain any suitable combination of capacity management data, expansion management data, health and performance tracking data, and/or change management data.

The DRCC Horizon Service 120 may store any suitable combination of the obtained data in object storage 122 within a dedicated bucket (e.g., Horizon bucket) associated with that service. In some embodiments, as discussed in more detail in connection with FIG. 30, the DRCC Horizon Service 120 may operate in a separate tenancy than the DRCC resource(s) 106 and/or any suitable component of the region 102 as shown in FIG. 1.

Region 102 may host Oracle Control Center (OCC) Service 124. OCC Service 124 may be configured to obtain any suitable data collected by DRCC Horizon Service 120 from object storage 122 (e.g., from a bucket specific/dedicated to the DRCC Horizon Service 120) and may store the obtained data in an autonomous data warehouse (e.g., ADW 126). ADW 126 may be an example of any suitable data store (e.g., an object storage bucket accessible to and managed by the OCC Service 124). In some embodiments, the DRCC Horizon Service 120 may be configured to store the data it has collected directly to ADW 126 as shown in FIG. 1. The data obtainable by DRCC Horizon Service 120 may pertain to region 102 only. The DRCC Horizon Service 120 of a given region may not be communicatively connected with any other DRCC/PLC of DRCC(s)/PLC(s) 104.

OCC Service 124 may retrieve and provide any suitable portion the data stored in ADW 126 to DRCC OCC Console 128. In some embodiments, DRCC OCC Console 128 may be configured to present any suitable portion of that data via any suitable number of user interfaces. Examples of such user interfaces are discussed in more detail below with respect to FIGS. 4-22. Using these interfaces, an owner of the hardware hosting region 102 may view the data collected by DRCC Horizon Service 120. The data presented by DRCC OCC Console 128 may be specific to region 102. Data corresponding to other DRCCs and/or PLCs may be collected and presented via respective components of those environment and inaccessible to the DRCC OCC Console 128 of region 102.

At 130 (e.g., according to a predefined schedule or at any suitable time), any suitable portion of the data of object storage 122 may be imported to a corresponding object storage bucket associated with the Central Horizon Service 121. Central Horizon Service 121 may be configured to retrieve the data from this bucket and store the data at Horizon ADW 132, a data store within OC1 120. In some embodiments, Horizon ADW 132 may be a bucket of the object storage of a public cloud that is dedicated for storing data collected by the DRCC Horizon Service 120. The Central Horizon Service 121 may be configured to retrieve any suitable data from any suitable number of the DRCC(s)PLC(s) 104 for storage at Horizon ADW 132 in this manner. At 134, any suitable portion of the data stored within Horizon ADW 132 may be provided via one or more data visualizations. By way of example, the data visualization may be presented to the user (e.g., a public cloud operator) via any suitable user interface.

OC1 120 may execute a DRCC Cloud Cards Web Application 136. At 138, DRCC Cloud Cards Web Application may export any suitable data from Horizon ADW 132, from the object storage bucket associated with the Central Horizon Service 121. By way of example, this data may be presented using the user interfaces discussed in connection to FIGS. 4-22 below.

At 140, DRCC Value and Forecast Data 142 may be imported to the object storage bucket associated with the Central Horizon Service 121. The DRCC Value and Forecast Data 142 may include any suitable data provided by any external source including, but not limited to, forecasted values corresponding to capacity, usage, costs, orders, revenue, or the like associated with any suitable combination of the DRCC(s)/PLC(s) 104. In some embodiments, this information may be provided (e.g., by the DRCC Cloud Cards Web Application 136 and/or DRCC Lifecycle Management Apex Application 144) via any suitable interface.

In some embodiments, OC1 120 may include DRCC Lifecycle Management Apex Application 144 which may be configured to obtain and present data stored within MXP ADW 146. In some embodiments, the data presented by DRCC Lifecycle Management Apex Application 144 may pertain to any suitable component of DRCC(s)/PLC(s) 104.

At 148, data may be exported from Horizon ADW 132 (e.g., a bucket within object storage that is associated with the Central Horizon Service 121) and stored in MXP ADW 146. Such data may be viewable at DRCC Lifecycle Management Apex Application 144. In some embodiments, any suitable data (e.g., user input provided via user interfaces hosted by DRCC Lifecycle Management Apex Application 144) may be stored in MXP ADW 146. At 150, any suitable data stored in MXP ADW 146 may be imported to the object storage bucket associated with the Central Horizon Service 121 (e.g., Horizon ADW 132).

The operations of FIG. 1 may be performed any suitable number of times to enable data collected at the DRCC(s)/PLC(s) 104 to be viewable by a user of the public cloud via the applications of OC1 120. The data collected by each DRCC Horizon Service (e.g., the DRCC Horizon Service 120 of region 102) may be viewable at any suitable time using DRCC OCC Console 128. In some embodiments, the DRCC OCC Console 128 may be configured to provide user interfaces and/or data visualizations (e.g., data visualization depicted at 134) that may be similar to those provided by the DRCC Cloud Cards Web Application 136 and/or the DRCC Lifecycle Management Apex Application 144 and/or the data visualization(s) 134. However, those user interfaces, data, and/or data visualization may be DRCC/PLC specific and may not pertain to other DRCC(s)/PLC(s) 104.

Figure 2:
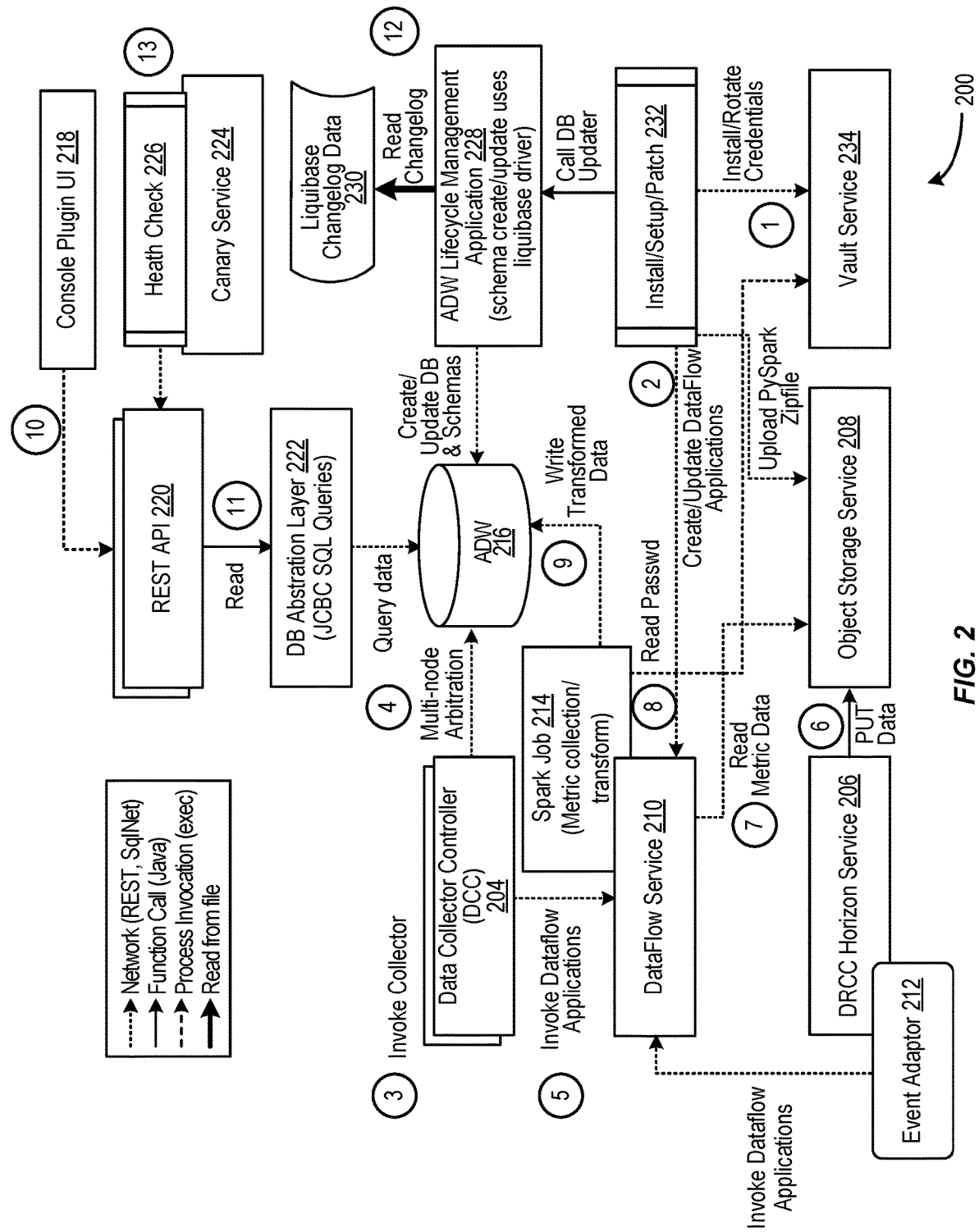
FIG. 2 is a block diagram for illustrating an example flow for obtaining operational data corresponding to a DRCC, according to at least one embodiment.

FIG. 2 is a block diagram for illustrating an example flow 200 for obtaining operational data corresponding to a DRCC, according to at least one embodiment. FIG. 2 depicts a number of components of a DRCC such as a DRCC corresponding to region 102 of FIG. 1. The following components and flow 200 may similarly applied to Private Label Clouds.

The DCC 204 may be a software component that is configured (e.g., by timer and/or via a predetermined schedule or frequency) to trigger the collection of metrics that were obtained by the DRCC Horizon Service 206. DRCC Horizon Service 206 may be an example of the DRCC Horizon Service 120 of FIG. 1. In some embodiments, DRCC Horizon Service 206 may collect capacity and/or usage data associated with the hosting region 102. Capacity and/or usage data may be associated with any suitable combination of compute resources, object storage, block storage, file storage, database resources, physical space, server devices, networking devices, and/or power consumption. DRCC Horizon Service 206 may be configured to communicate with any suitable combination of DRCC resource(s) 106 of FIG. 1 to obtain any suitable information corresponding to capacity management (e.g., capacity and usage data), expansion management, health and performance tracking, change management, and the like. This data may be collectively referred to as "metric data." The DRCC Horizon Service 206 may perform data collection operations according to its own internal schedule or predefined periodicity. The collected data may be stored (e.g., via a PUT command, or the like) by the DRCC Horizon Service 206 within an object storage bucket (e.g., a bucket ("Horizon Bucket," not depicted) of object storage that is dedicated to the Horizon Service, such as an object storage bucket). In some embodiments, storing and retrieving data may be performed by issuing requests to the object storage service 208 which may be configured to manage object storage (including the Horizon Bucket). DCC 204 may trigger DataFlow Service 210 to retrieve (e.g., read, using the object storage service 208) the metric data stored in the object storage bucket at any suitable time, or according to any suitable predetermined frequency and/or schedule.

In some embodiments, DRCC Horizon Service 206 may include an event adaptor 212 that may be configured to similarly invoke the DataFlow Service 210 to read the metric data from object storage bucket (e.g., utilizing a REST API corresponding to the object storage service 208). Some embodiments may utilize any suitable combination of the DCC 204 and/or event adaptor 212 to invoke the functionality of DataFlow Service 210.

In some embodiments, multiple instances of the DCC 204 (e.g., two, three, etc.) may be utilized for multi-node arbitration and redundancy. That is, each DCC 204 instance may attempt to perform a lock (e.g., a daily lock) of the ADW 216. If the lock is successful, the corresponding instance may proceed with invoking the data flow application. If not (because another instance of the DCC 204 has already locked the ADW 216), the instance may halt execution.

DataFlow Service 210 may execute any suitable number of jobs (e.g., spark job 214) to collect and/or transform data from the object storage bucket (utilizing the REST API associated with Object Storage Service 208). In some embodiments, the spark job 214 may perform any suitable predefined transform of the collected data and may be configured to write the transformed data to ADW 216 (and example of ADW 126 of FIG. 1).

Console Plugin User Interface (UI) 218 may be utilized at any suitable time to request and/or display any suitable portion of the metric data. In some embodiments, the Console Plugin UI 218 is an example of the DRCC OCC Console 128 of FIG. 1. The input provided via the Console Plugin UI 218 may be submitted (e.g., directly, or via the OCC Service 124 of FIG. 1), as a query via REST API 220. REST API 220 may be configured to provide access to the region-specific metric data within ADW 216. In some embodiments, the query may be passed through DB abstraction layer 222. DB abstraction layer 222 may be a read-only layer that shields the REST API 220 from details of how data is stored in the underlying database (e.g., ADW 216).

Canary Service 224 (an example of a health collection service) may be configured to perform a health check 226 of the various services and/or components (e.g., DCC 204, DataFlow Service 210, DRCC Horizon Service 206, Object Storage Service 208, etc.) Health check 226 (e.g., a collection of health-related metrics of the services mentioned above) may be performed at any suitable time, according to any suitable frequency and/or predetermined schedule.

ADW Lifecycle Management Application 228 may be a software component configured to manage the lifecycle of the ADW database including, but not limited to, managing changes to schemas, scheduling SQL jobs, etc. In some embodiments, the ADW Lifecycle Management Application 228 may utilize Liquibase to manage these aspects of the ADW 216. Lifecycle management operations of the ADW Lifecycle Management Application 228 may be identified based at least in part on reading Liquibase changelog data 230 corresponding to the ADW 216.

Another computing component of the DRCC may perform operations at 232 for installing/setting up/patching the DataFlow Service 210. For example, instructions for performing operations may be stored at the DataFlow Service 210 as part of an install performed at 232. In some embodiments, the operations performed at 232 may include installing and/or rotating a credential for the ADW 216 that is stored in Vault Service 234

Flow 200 may begin at step 1, where credentials are installed for the ADW 216 at Vault Service 234 At step 2, instructions for DataFlow Service 210 and the credentials for ADW 216 may be installed.

At step 3, the functionality of DCC 204 may be invoked (e.g., by a function call initiated at Event Adaptor 212 or otherwise, via a timer, according to a predetermined schedule or frequency, etc.). In some embodiments, the functionality of DCC 204 may be invoked using a REST API corresponding with the DCC 204.

At step 4, DCC 204 may attempt to perform a lock of ADW 216. If unsuccessful the DCC 204 may halt processing and the flow may cease. Otherwise, the DCC 204 may invoke DataFlow applications of the DataFlow Service 210 at step 5.

The DRCC Horizon Service 206 may have previously collected metric data and stored this data within a dedicated bucket associated with the service (not depicted) by executing a PUT data command with object storage service 208. These operations are depicted at step 6 and may have occurred at any suitable time.

At step 7, the DataFlow Service 210 may, according to the instructions installed at step 2, read (or otherwise obtain from the Object Storage Service 208) metric data collected by the DRCC Horizon Service 206 and previously stored in the Horizon Bucket by Object Storage Service 208. Spark Job 214 may be executed by the DataFlow Service 210 to collect and/or transform that data. At step 8, Spark Job 214 may be configured to read and/or obtain the password (or other credential) for ADW 216 from Vault Service 234. At step 9, Spark Job 214 may write the collect and/or transformed data to ADW 216 (e.g., using the previously credentials installed at the DataFlow Service 210, or the ones obtained at step 8).

At step 10 (or any suitable time), input may be received at the Console Plugin UI 218 to access the metric data stored at ADW 216. In some embodiments, this input may be obtained from one of the user interfaces of FIGS. 4-22 that are presented by the Console Plugin UI 218. At step 11, the user input may be passed through the REST API 220 and DB abstraction layer 222 to query the ADW 216 for the requested metric data.

At any suitable time the ADW Lifecycle Management Application 228 may read the Liquibase Changelog Data 230 at step 12 to identify and perform changes to the ADW 216. Canary Service 224 (an example of a service or application that performs health checks and/or collects health related data of one or more other components) can perform health check 226 at step 13 to collect health related data corresponding to the other components of FIG. 2. In some embodiments, the Canary Service 224 requests metric data (e.g., via the REST API 220 and DB abstraction layer 222 to identify health of the other components of FIG. 2 (e.g., The DRCC Horizon Service 206, the DataFlow Service 210, etc.) and/or the components of the DRCC (e.g., the DRCC resource(s) 106 of FIG. 1.

Figure 3:
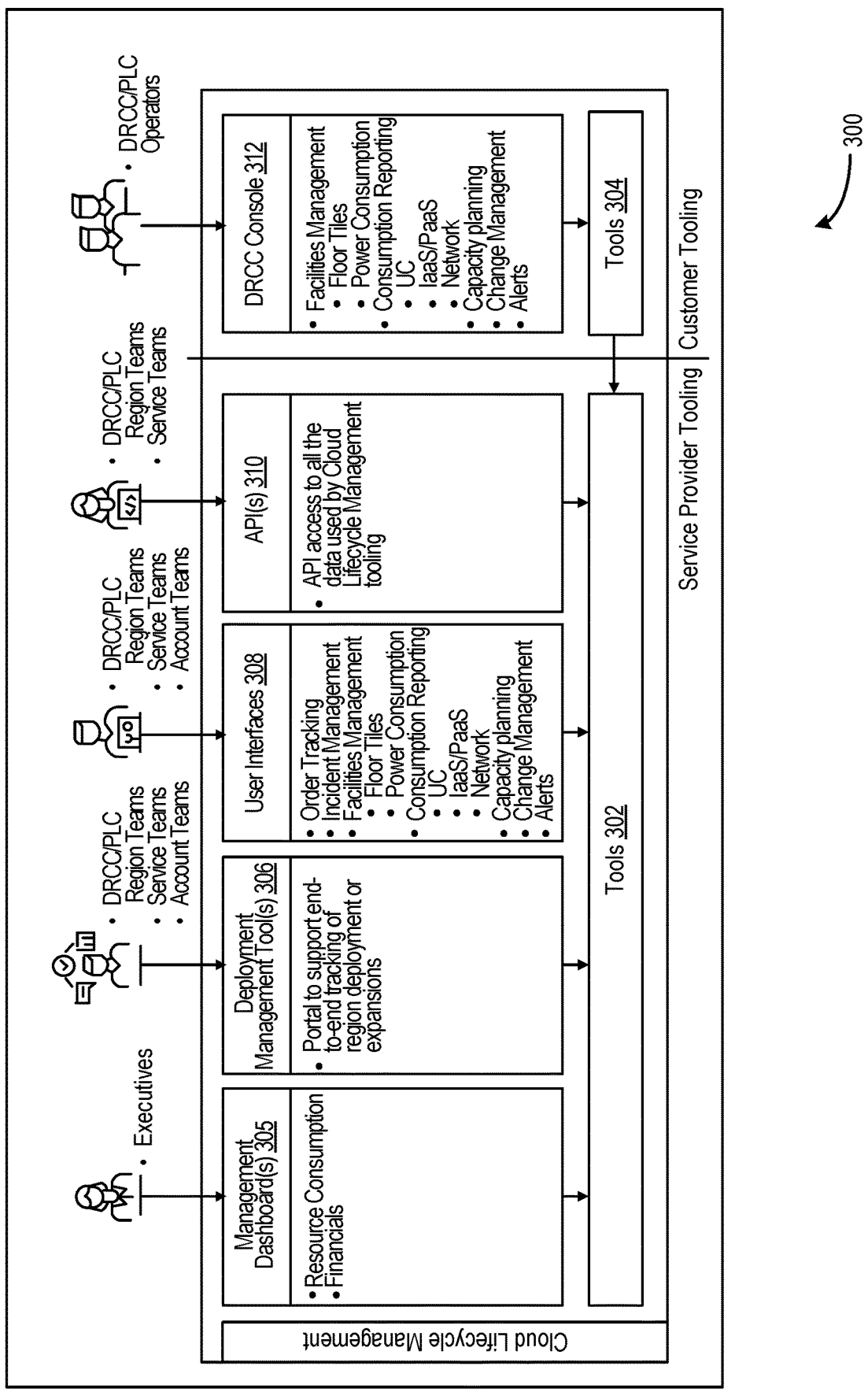
FIG. 3 is a block diagram for illustrating an overview of a number of software tools available to a variety of entities corresponding to a cloud provider and/or a customer, according to at least one embodiment.
Figure 8:
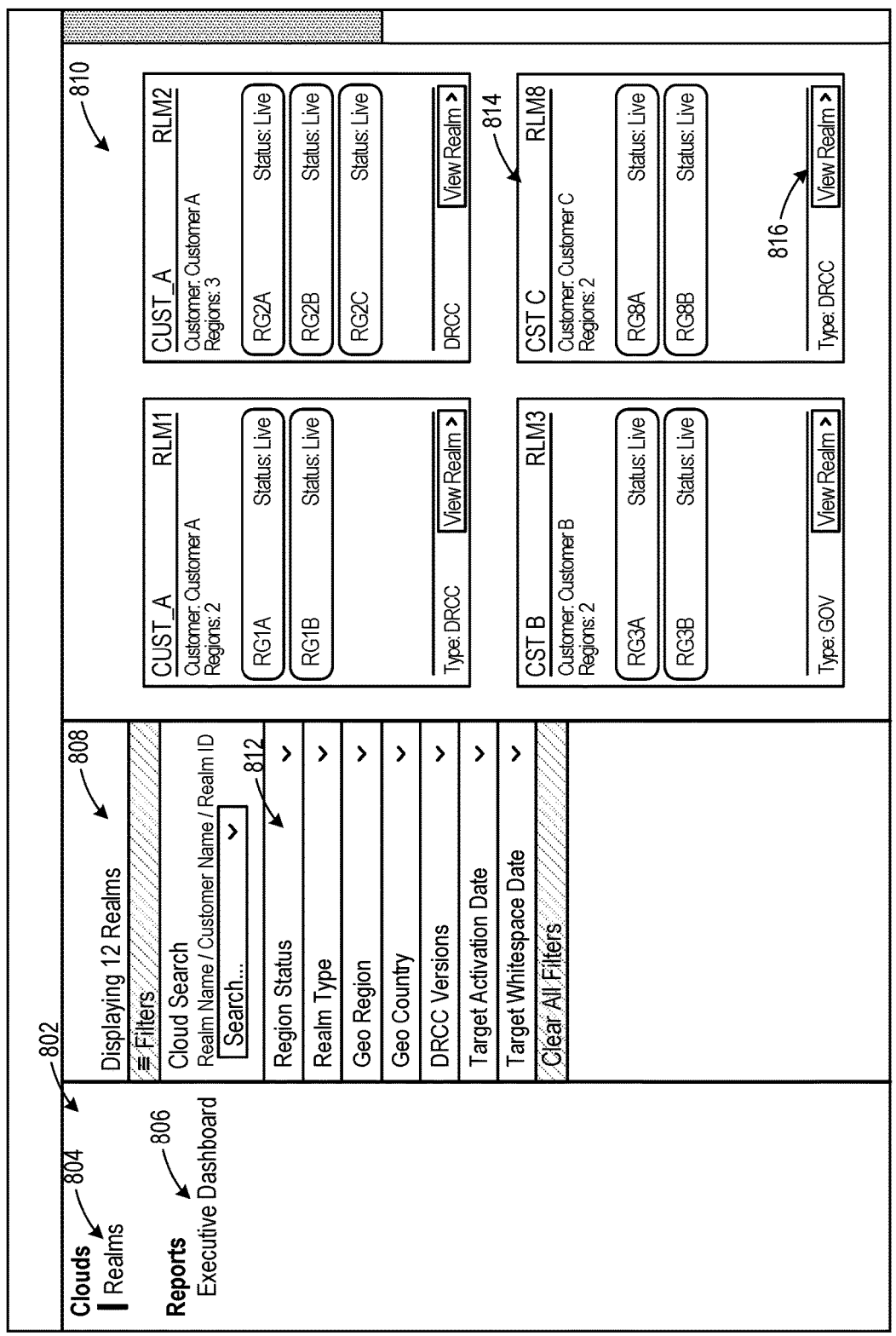
FIG. 8 is a block diagram depicting another exemplary user interface presenting data corresponding to a number of DRCCs, according to at least one embodiment.

FIG. 8 depicts an example user interface (e.g., user interface 800, one of the user interface(s) 308 of FIG. 3). As depicted the user interface 800 presents data regarding live customers, signed customers, and pipeline customers corresponding to numerous DRCCs/PLCs (each an example of the DRCC(s)/PLC(s) 104 of FIG. 1). As depicted, user interface 800 depicts customer identifiers, status, regions, countries, quantities, and status details for the DRCCs/PLCs. Although provided in tabular form, the data presented in user interface 800 may be differently formatted.

FIG. 3 is a block diagram 300 for illustrating an overview of a number of software tools available to a variety of entities corresponding to a cloud provider and/or a customer, according to at least one embodiment. Service provider tools (e.g., Tool(s) 302) may include management dashboard(s) 305. In some embodiments, management dashboard(s) 305 may be used to view lifecycle management data and financial information related to any suitable number of DRCCs (and/or PLCs) such as the DRCC(s)/PLC(s) 104 of FIG. 1.

Tool(s) 302 may include any suitable number of deployment management tools 306 (e.g., portals) to support end-to-end tracking of deployment or expansions of the DRCC/PLC (e.g., the DRCC(s)/PLC(s) 104 of FIG. 1). In some embodiments, deployment management tools 306 may be utilized by DRCC/PLC region teams, service teams, and account teams, among others.

Tool(s) 302 may include user interface(s) 308. User interface(s) 308 (e.g., FIGS. 5-24) may be utilized for any suitable combination of order tracking, incident management, facilities management, consumption reporting, capacity planning, change management, and alerts, to name a few.

In some embodiments, user interface(s) 308 may be utilized by DRCC/PLC region teams, service teams, and account teams, among others.

Tool(s) 302 may include application programming interface(s) (API(s)) 310. API(s) 310 may be utilized to access metric data and/or data used by cloud lifecycle management tooling (e.g., ADW Lifecycle Management Application 228 of FIG. 2). In some embodiments, API(s) 310 may be utilized by DRCC/PLC region teams and service teams, among others.

Tool(s) 304 may include DRCC Console 312 (an example of DRCC OCC Console 128 of FIG. 1). DRCC Console 312 may be utilized to access metric data and/or data used for facilities management, consumption reporting, capacity planning, change management, and alerts, among other uses. In some embodiments, DRCC Console 312 may be utilized by DRCC/PLC region teams and service teams, among others. DRCC Console 312 may present any suitable combination of this data on any suitable combination of the user interfaces of FIGS. 4-22, discussed in more detail below.

Figure 4:
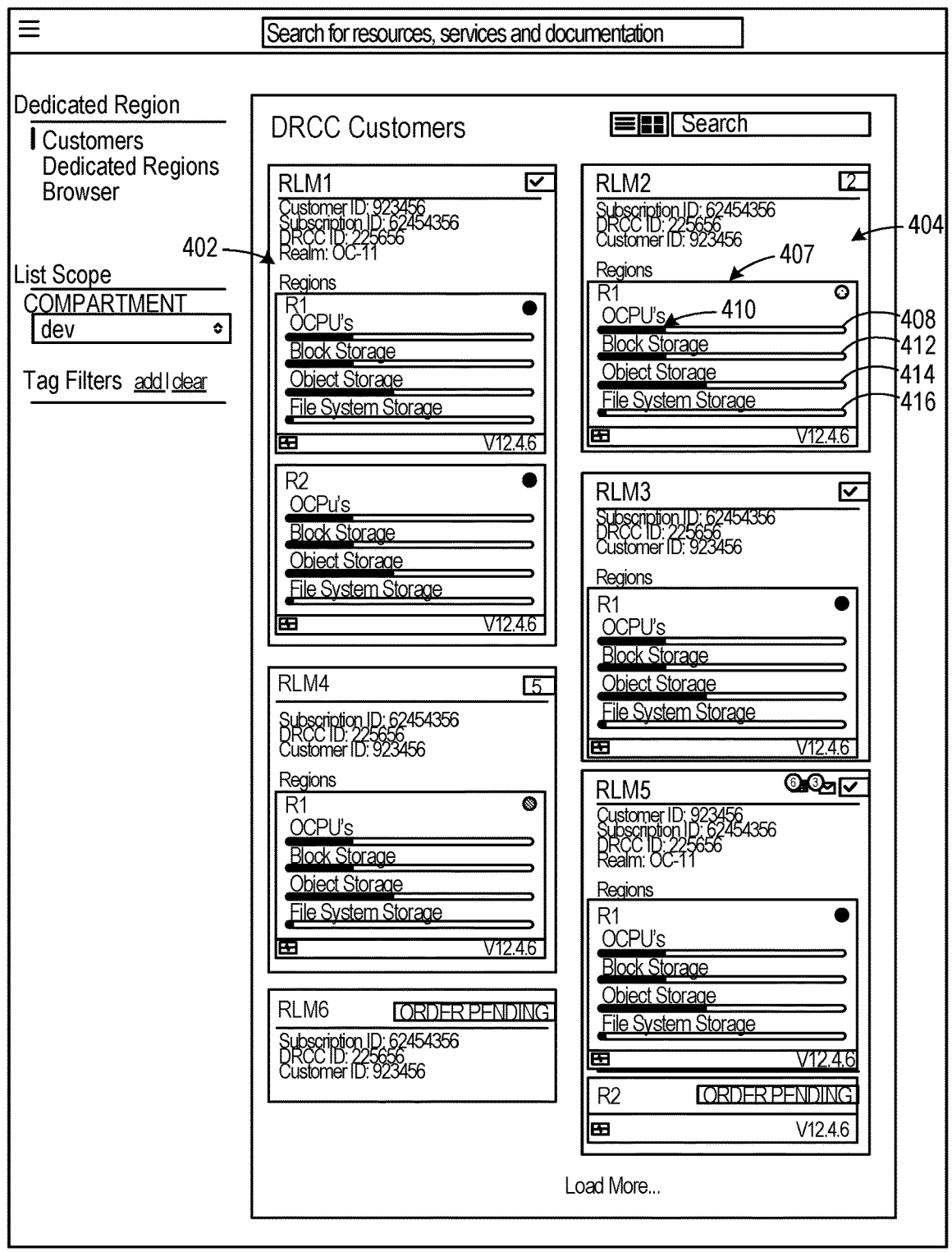
FIG. 4 is a block diagram depicting an exemplary user interface presenting data corresponding to a number of DRCCs, according to at least one embodiment.

FIG. 4 is a block diagram depicting an exemplary user interface (e.g., user interface 400, an example of one the user interface(s) 308 of FIG. 3) presenting data corresponding to a number of DRCC, according to at least one embodiment. As depicted the user interface 400 presents data (e.g., capacity planning information) corresponding to numerous DRCCs/PLCs (each an example of the DRCC(s)/PLC(s) 104 of FIG. 1).

User interface 400 may include any suitable number of graphical elements representing individual realms that include one or more DRCCs, or any suitable region (e.g., a PLC, a government region, a commercial regions, etc.). By way of example, graphical element 402 represents realm "RLM1" that includes regions "R1" and "R2," and graphical element 404 represents another realm "RLM2" that includes region "R1." These realms and corresponding region(s) may correspond to the same, or a different, customer/cloud owner. As depicted, realms RLM1 and RLM 2 correspond to different cloud owners.

As depicted within graphical elements 402 and 404, any suitable customer and/or DRCC related data may be presented including but not limited to customer identifiers, subscription identifiers, DRCC (or PLC) identifiers, realm identifiers, region identifiers/versions, etc. In some embodiments, a graphical element (e.g., the graphical element 402) may include an additional element (e.g., element 407) that presents capacity and usage data indicating, for example, any suitable combination of compute core use/availability, block storage use/availability, object storage use/availability, and/or file system storage use/availability.

Element 408 depicts a total amount of CPU cores with region R1 of DRCC B, while the portion 410 depicts a number of CPUs being currently used. Elements 412, 414, and 416 may similarly present a total amount of block storage, objet storage, and file system storage, with respective portions (e.g., darkened portions similar to portion 410) that indicate a current used amount of block storage, object storage, and file system storage, respectively. The data presented in user interface 400 may be differently formatted and may include additional data or may lack some of the data shown in FIG. 4. A graphical element similar to element 407 may be presented for any DRCC of a realm. In some embodiments, the element 407 may indicate a statue (e.g., "order pending") when a region is not yet available/operational.

FIG. 5 is a block diagram depicting an exemplary user interface 500 presenting data DRCC utilization details, according to at least one embodiment. User interface 500 is another example of the user interface(s) 308 of FIG. 3. As depicted the user interface 500 presents DRCC utilization dashboard 502 corresponding to a numerous DRCCs/PLCs (each an example of the DRCC(s)/PLC(s) 104 of FIG. 1). As depicted, DRCC utilization dashboard 502 may include a table presenting region code(s) for any suitable DRCC, common name(s) of DRCC regions, and usage data corresponding to any suitable combination of hardware processors (e.g., AMD, Intel, Dense Intel, etc.), block storage usage, file system storage, and physical space. In some examples, blocks within the user interface 500 may be colored according to predefined thresholds to indicate a degree of usage. By way of example, resources that are maxed out (e.g., at or above a 90 percent threshold usage) may be depicted in red. Resources that breach another threshold (e.g., 80-90 percent usage) may be depicted in yellow, while all other blocks that fail to breach either threshold may be depicted in green.

In some embodiments, user interface 500 may include DRCC utilization details 504. As depicted, DRCC utilization details 504 may include a table presenting region code(s) for any suitable DRCC, common name(s) of DRCC regions, and usage data corresponding to any suitable combination of hardware processors (e.g., AMD, Intel, Dense Intel, etc.), block storage usage, file system storage, and physical space. For each region, the table may represent metrics such as total capacity, available resources, unavailable resources, a number of resources used by the cloud provider (e.g., OCI), a number of resources used by the customer (e.g., the cloud owner), a number of resources used for overhead, and a number of resources identified as being in a broken pool (e.g., unusable, at least temporarily). Block and file system storage usage may be expressed in tebibyte (TiB) units of data capacity, where 1 TiB is equal to $1024^4$ bytes. Blocks with DRCC utiliation details 504 may be similarly colored according to predefined thresholds to indicate a degree of usage, where resources that are maxed out (e.g., at or above a 90 percent threshold usage) may be depicted in red, resources that breach another threshold (e.g., 80-90 percent usage) may be depicted in yellow, and all other blocks that fail to breach either threshold may be depicted in green.

The DRCC utilization dashboard 502 and/or the DRCC utilization detail 504 may include data related to any suitable number of DRCCs and/or may include more or less data than depicted in FIG. 5.

Figure 6:
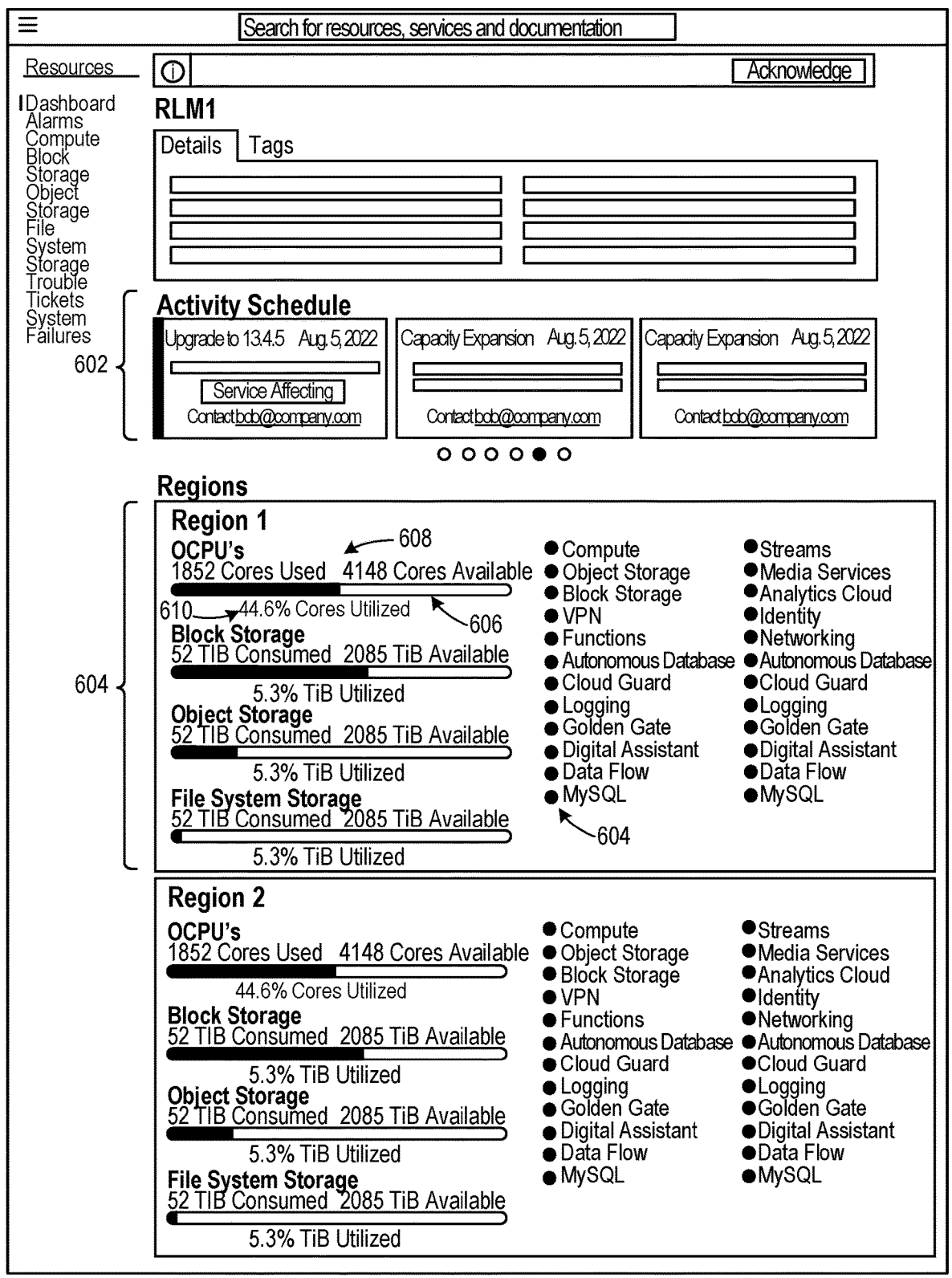
FIG. 6 is a block diagram depicting an exemplary user interface presenting data corresponding to one or more DRCC regions of a realm associated with a single cloud owner

FIG. 6 is a block diagram depicting an exemplary user interface (e.g., user interface 600, one of the user interface(s) 308 of FIG. 3) presenting data corresponding to one or more DRCC regions of a realm (e.g., RLM1, of FIG. 4) associated with a single cloud owner, according to at least one embodiment. The user interface 600 may be utilized by operators of a DRCC/PLC and/or operators associated with the cloud provider to view any suitable information regarding the DRCCs/PLCs of RLM1. As depicted, user interface 600 provides an operator (e.g., a DRCC operator or a cloud provider (CP) operator) with an aggregated view of all regions deployed within a customer's realm.

User interface 600 includes activity section 602 which may be configured to present any suitable data related to events scheduled for execution within the realm RLM1. As depicted, the activity section 602 indicates an upgrade event and two capacity expansions, however, any suitable number and/or type of events may be indicated within activity section 602.

User interface 600 may include a region list including any suitable number of graphical elements corresponding to a given region (e.g., a DRCC region "Region 1") presented in section 604. Section 604 may include graphical elements similar to element 408 of FIG. 4 to indicate total available resources and currently used resources. By way of example, element 606 (alone, or in conjunction with text 608) indicates that a number (e.g., 1852) of cores are currently being used and that a number (e.g., 4,148) of cores are available. In some embodiments, text 610 may be included to textually indicate a percentage of cores used. Similar elements may be provided as depicted in FIG. 6 to present corresponding information related to block storage, object storage, and file system storage availability and use.

In some embodiments, user interface 600 may include indicators (e.g., indicator 612) that may be colored according to a predefined scheme (e.g., red, yellow, green, etc.) to indicate a status of various services and/or functionality within the region. By way of example, the indicator 612 may be colored (e.g., green) to indicate a given functionality or service is operational and/or available.

The data presented in user interface 600 may be differently formatted and may include additional data or may lack some of the data shown in FIG. 6.

Figure 7:
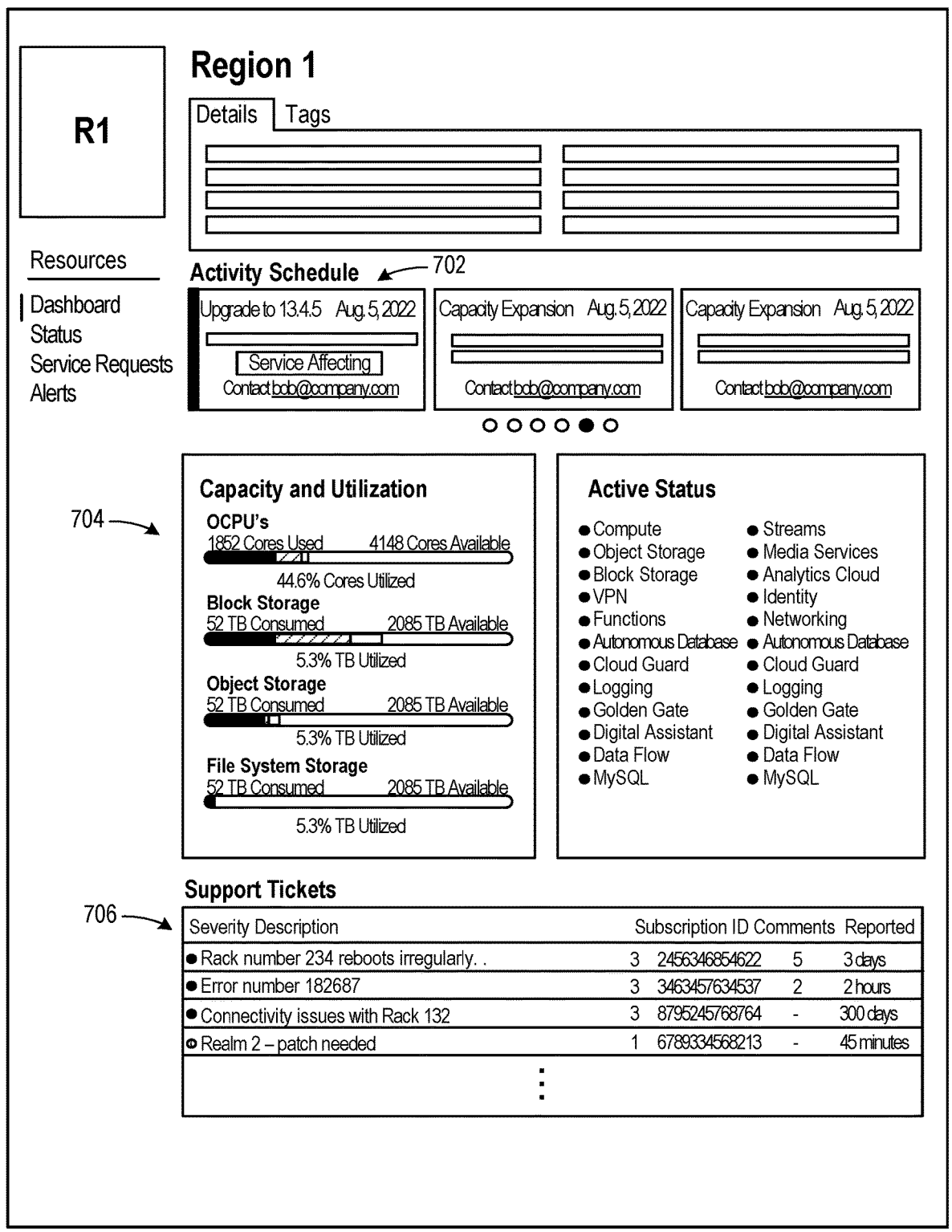
FIG. 7 is a block diagram depicting an exemplary user interface presenting a region view of a DRCC region, according to at least one embodiment.

FIG. 7 is a block diagram depicting an exemplary user interface (e.g., user interface 700, one of the user interface(s) 308 of FIG. 3) presenting a region view of a DRCC region, according to at least one embodiment. The user interface 700 may be accessible from selecting any suitable area with section 604 of FIG. 6. The user interface 700 may be utilized to view any suitable information associated with a region of the DRCC/PLC. As depicted, user interface 700 presents similar information as presented in FIG. 6 at 702 and 704 (corresponding to activity section 602 and section 604 of FIG. 6, respectively).

In some embodiments, additional details associated with the region may be presented in FIG. 7. By way of example, user interface 700 may present a number of support tickets at 706 that are associated with software patches, maintenance work, errors, or any suitable aspect of supporting and/or maintaining software, hardware, or physical space of the DRCC.

The data presented in user interface 700 may be differently formatted and may include additional data or may lack some of the data shown in FIG. 7.

FIG. 8 is a block diagram depicting another exemplary user interface (e.g., user interface 800, one of the user interface(s) 308 of FIG. 3) presenting data corresponding to a number of DRCCs, according to at least one embodiment. Area 802 of user interface 800 may be a navigation panel that includes any suitable number of links or shortcuts that may be used to navigate to other interfaces discussed below. The content of area 802 may update based at least in part on user input (e.g., selections made within area 802, selections made within area 810, etc.). As depicted, user interface 800 may correspond to the navigational item 806, while selection of navigational item 808 may be used to navigate the user to the user interface 900 of FIG. 9. Each navigation may update the content of area 802 to correspond to the user interface being presented.

User interface 800 may include area 808 which may include any suitable number of user interface elements for filtering the data provided in area 810. By way of example, area 808 may include elements for conducting a search of the realm associated data presented in area 810 and one or more additional filter options (e.g., filter option 812) which may be used to further filter the items displayed within area 810. As a non-limiting example, filter option 812 may be expanded and used to filter the items displayed within area 810 based on a region status associated with region (e.g., DRCC regions), and the items presented in area 810 may be modified to filter based on the input provided using filter option 812. Additional filter options depicted in area 808 enable the user to filter on realm type, geographical region, geographical country, DRCC versions, target activation date, and target whitespace date, although other potential filters are contemplated.

Area 810 may include user interface element 814 that represents a single realm (e.g., "RLM8"). Any suitable number of regions (e.g., DRCC regions) may be associated with a realm. Any suitable number of user interface elements similar to user interface element 814 may be presented in area 810 to represent a respective realm. As depicted, user interface element 814 is associated with realm "RLM8" that is associated with two regions, "RG8A" and "RG8B." Each of these two regions are intended to be at example of a DRCC. The user interface element 814 may include any suitable data associated with the realm and/or regions. As depicted, user interface element 814 provides an overview of the realm RLM8 including a common name (e.g., "CST C") associated with a given customer (e.g., "Customer C," referring to a particular DRCC owner), a full name associated with the customer (e.g., "Customer C"), a number of regions corresponding realm "RLM8," a respective status (e.g., "Live") for each region, and a type (e.g., "DRCC") associated with the realm and/or regions of the realm.

Any suitable user interface element (e.g., user interface element 814) may include option 816. Option 816 may be in any suitable form, not necessarily a button as depicted in FIG. 8. Option 816 may be selected to navigate the user to an additional user interface (e.g., the user interface 1000 of FIG. 10) where additional details related to the realm may be viewed. Selection of the options 818 or 820 may be used to navigate the user to an additional user interface (e.g., the user interface 1200 of FIG. 12) to view additional details associated with the respective region.

The data presented in user interface 800 may be differently formatted and may include additional data or may lack some of the data shown in FIG. 8.

FIG. 9 is a block diagram depicting an exemplary user interface (e.g., user interface 900, one of the user interface(s) 308 of FIG. 3) presenting an executive capacity dashboard, according to at least one embodiment. As depicted the user interface 900 presents DRCC utilization dashboard 902 corresponding to a numerous DRCCs/PLCs (each an example of the DRCC(s)/PLC(s) 104 of FIG. 1). The user may navigate to user interface 900 based at least in part on selecting option 806 of FIG. 8. Once selected, area 802 may be replaced with the content of area 903. As depicted, DRCC utilization dashboard 902 may include a table presenting capacity and usage information associated with a number of regions including "RG8A" and "RG8B" that are associated with customer C as depicted with user interface element 814 of FIG. 8. Any suitable number of regions may be presented within DRCC utiliation dashboard 902. As depicted, the utilization dashboard 902 may include each region depicted in FIG. 8 and individually corresponding to customers A, B, and C.

DRCC utilization dashboard 902 may include any suitable number of columns corresponding to various attributes of region data such as region code, common customer name (corresponding to the "Customer" column presented), in addition to various usage metrics corresponding to an amount utilized of substrate, standard Intel processors, standard AMD processors, dense Intel processors, block storage, object storage, file system storage, Exadata resources, and physical space. Each of the columns corresponding to substrate, standard Intel processors, standard AMD processors, dense Intel processors, block storage, object storage, file system storage, Exadata resources, and physical space may include a corresponding field that indicates a percentage of total available resources currently being utilized. Field 904 indicates (with text "63%" that 63% of available standard Intel processors are currently being utilized. Although percentages are depicted, a number may be utilized to indicate current utilization. By way of example, a number may be provided that indicates a current number of block, object, and file system storage units (e.g., in tebibyte (TiB) of currently utilized capacity. A number (e.g., of cores) may be utilized to express a number of processing cores (e.g., standard/dense Intel and/or AMD) that are currently being utilized. A number of units (e.g., floor tiles) of physical space may be utilized to indicate currently utilized physical space.

In some examples, blocks within the user interface 900 may be colored according to predefined thresholds to indicate a degree of usage. By way of example, resources that are maxed out (e.g., at or above a 90 percent threshold usage) may be depicted in red (as depicted at 906). Resources that breach another threshold (e.g., 80-90 percent usage) may be depicted in yellow (as depicted at 908, while all other blocks that fail to breach either threshold may be depicted in green (as depicted at 910). Any suitable visual indicator such as color, shading, or outlining may be utilized.

In some embodiments, each row of DRCC utilization dashboard 902 may initially be presented in a collapsed view as depicted at 912 with respect to region data corresponding to the region "RG2B" that is associated with customer A (as indicated by common name "CUST_A"). At any suitable time, a toggle or other interface element (e.g., toggle 914) may be select to transition a row to an expanded view. Area 916 depicts an expanded view of the region details corresponding to the region "RG8B" that is associated with customer C (as indicated by common name "CST C"). Area 916 may present corresponding details of the region "RG8B" depicted within user interface element 814 of FIG. 8. While presenting the expanded view, area 916 may include the original row of DRCC utilization dashboard 902 which provided the same region data corresponding to row 918 as would be presented in a collapsed view, with additional region data corresponding to a number of total capacity number of resources, a number of available resources, a number of unavailable resources, a number of resources used by the customer, a number of resources used by the cloud provider on behalf of the customer, and a number of resources used for overhead (e.g., to provide cloud provider services). By way of example, area 916 indicates that there are 8,736 total standard Intel processors of which 2,007 are available, 6,729 are unavailable, 1,394 processors of the unavailable processors are currently being used by the customer, 3,646 processors are being used by the provider on behalf of the customer, and 1,689 processors are being used for overhead. Each column of the DRCC utilization dashboard 902 corresponding to columns 920 may be similarly utilized to provide corresponding numbers associated with the resources corresponding to substrate, standard Intel processors, standard AMD processors, dense Intel processors, block storage, object storage, file system storage, Exadata resources, and physical space. More or fewer types of resources may be provided in DRCC utilization dashboard 902, the particular resources shown are illustrative and not intended to limit the scope of this disclosure.

The data presented in user interface 900 may be differently formatted and may include additional data or may lack some of the data shown in FIG. 9.

Figure 10:
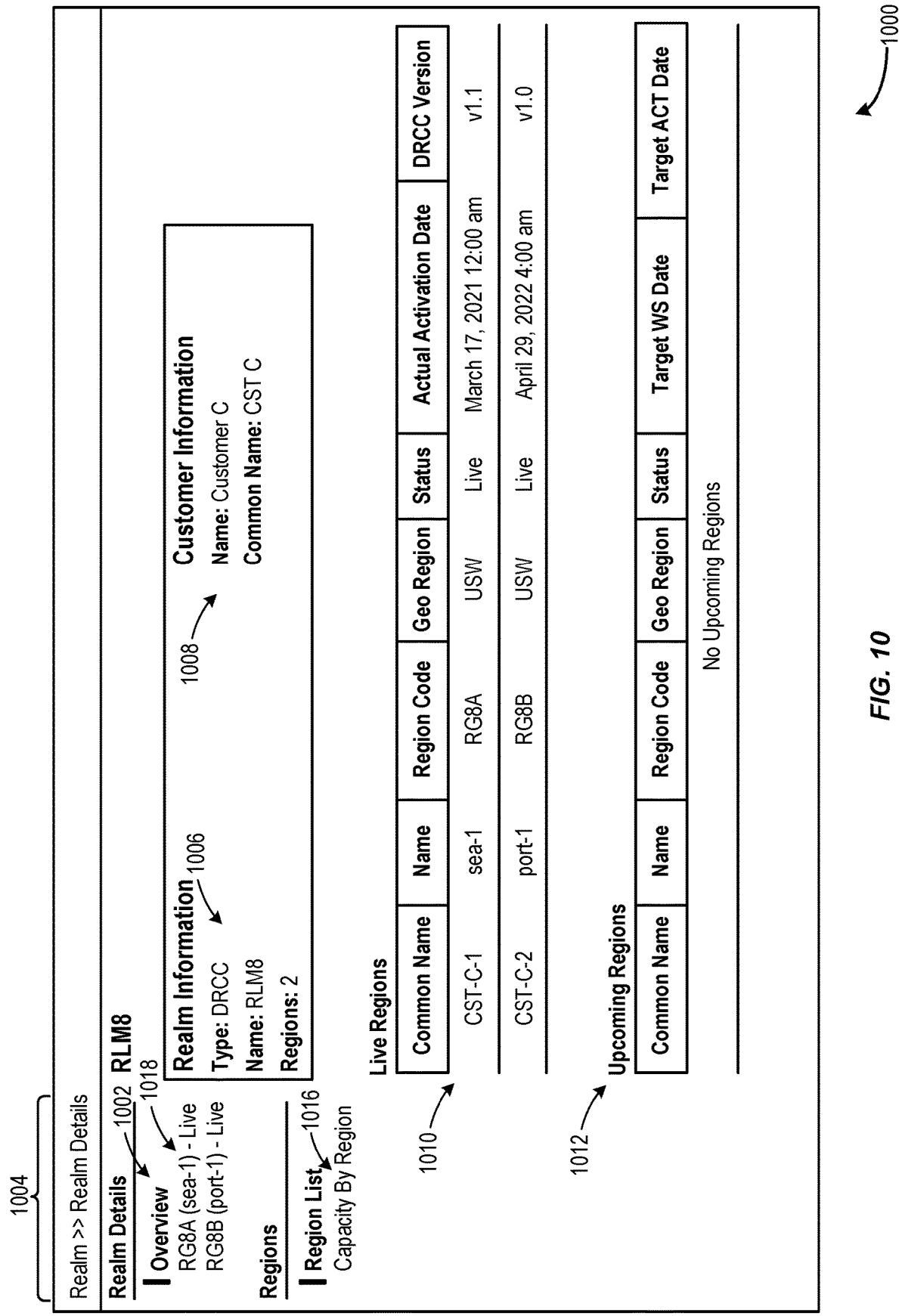
FIG. 10 is a block diagram depicting an exemplary user interface presenting a region list, according to at least one embodiment.

FIG. 10 is a block diagram depicting an exemplary user interface (e.g., user interface 1000, one of the user interface(s) 308 of FIG. 3) presenting a region list (e.g., region list 1002), according to at least one embodiment. As described above, a user may navigate to user interface 1000 by selecting option 816 of FIG. 8. Selecting option 816 may navigate the user to an overview view of the realm "RLM8" as indicated at 1002 of navigational panel 1004, the contents of which may replace or update the contents of area 802 of FIG. 8 based on selecting option 816. The user interface 1000 may include any suitable data corresponding to a realm. Realm data may include, but is not limited to, realm type, common name, and number of regions that are associated with the realm as depicted at 1006. Any suitable customer data, including but not limited to a customer name (e.g., "customer C") and a common name (e.g., "CST C") may be presented at 1008. Realm data may be presented in any suitable format, at any suitable location, and in any suitable manner within the user interface 1000.

User interface 1000 may include region list 1010. Region list 1010 may list any suitable number of regions and present any suitable region data associated with the regions listed. As depicted, region list 1010 includes region data associated with the regions "RG8A" and "RG8B" previously presented within user interface element 814 of FIG. 8. As presented in FIG. 10, region list 1010 may include a common name ("CST-C-1"), a shortened name (e.g., "sea-1"), a region code "RG8A"), a geographical region (e.g., "USW"), a status (e.g., "Live"), an actual activation date (e.g., "Mar. 17, 2021 at 12:00 am"), and a DRCC version (e.g., v1.1). The number and particular attributes of a region (e.g., a DRCC region associated with the region code "RG8A" and realm "RLM8") may differ from those presented in FIG. 10.

User interface 1000 may include upcoming region list 1012. Upcoming region list 1012 may present any suitable region data corresponding to planned, but currently non-operational regions. As depicted, "RLM8" include no upcoming regions.

Navigational panel 1004 may include any suitable number of options. By way of example, navigational options corresponding to the "RG8A" region and the RG8B" region may be presented in navigational panel 1004. For example, selecting option 1018 may navigate the user away from user interface 1000, to user interface 1200 of FIG. 12. Navigational panel 1004 may include a navigational option corresponding to user interface 1100 of FIG. 11. For example, selecting option 1016 may navigate the user away from user interface 1000, to user interface 1100.

The data presented in user interface 1000 may be differently formatted and may include additional data or may lack some of the data shown in FIG. 10.

Figure 11:
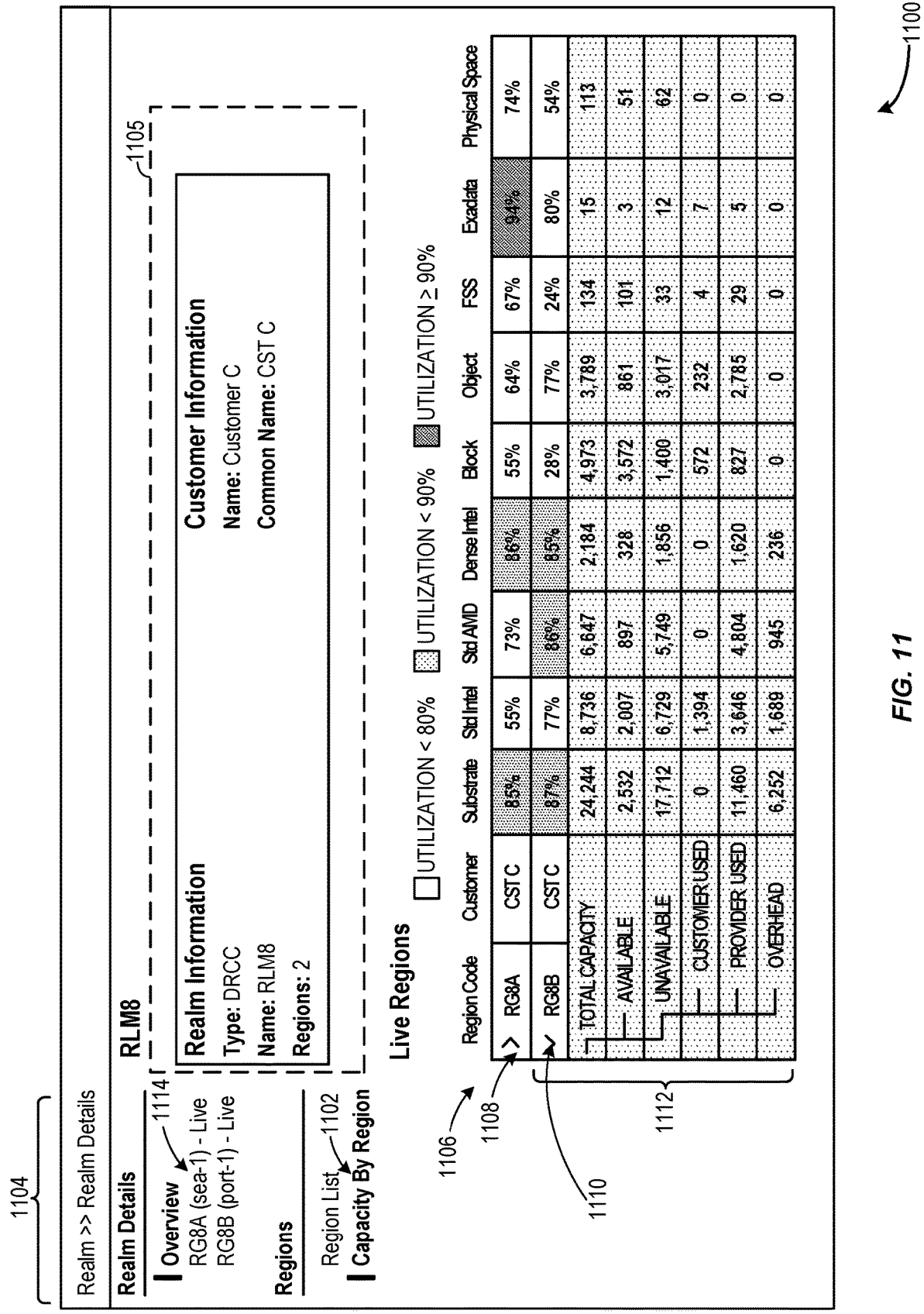
FIG. 11 is a block diagram depicting an exemplary user interface presenting capacity information corresponding to multiple regions, according to at least one embodiment.

FIG. 11 is a block diagram depicting an exemplary user interface (e.g., user interface 1100, one of the user interface(s) 308 of FIG. 3) presenting capacity information corresponding to multiple regions, according to at least one embodiment. As described above, a user may navigate to user interface 1100 by selecting option 1016 of FIG. 10. Selecting option 1016 may navigate the user to a capacity by region view as indicated at 1102 of navigational panel 1104, the contents of which may replace or update the contents of area 1004 of FIG. 10 based on selecting option 1016. The user interface 1100 may include any suitable data corresponding live regions associated with the realm "RLM8." The presentation of the realm data of FIG. 10 may persist within area 1105.

User interface 1000 may include region utilization dashboard 1106 (e.g., a table, grid, etc.) corresponding to the regions associated with realm "RLM8." In the ongoing example, region utilization dashboard 1106 presents regions "RG8A" and RG8B" in accordance with their association with realm "RLM8." As depicted, region utilization dashboard 1106 may include a table presenting capacity and usage information associated with regions "RG8A" and "RG8B" that are associated with customer C as depicted with user interface element 814 of FIG. 8. The regions and corresponding region data depicted in FIG. 11 may be similar to the data presented within DRCC utilization dashboard 902 but may only include data corresponding to regions associated with the selected realm (e.g., "RLM8").

Like DRCC utilization dashboard 902, region utilization dashboard 1106 may include any suitable number of columns corresponding to various attributes of region data such as region code, common customer name (corresponding to the "Customer" column presented), in addition to various usage metrics corresponding to an amount utilized of substrate, standard Intel processors, standard AMD processors, dense Intel processors, block storage, object storage, file system storage, Exadata resources, and physical space. In some embodiments, the particular number and combination of attributes may differ from those presented within DRCC utilization dashboard 902.

In some examples, blocks within the region utilization dashboard 1106 may be colored according to predefined thresholds to indicate a degree of usage. By way of example, resources that are maxed out (e.g., at or above a 90 percent threshold usage) may be depicted in red (as depicted at 906). Resources that breach another threshold (e.g., 80-90 percent usage) may be depicted in yellow (as depicted at 908, while all other blocks that fail to breach either threshold may be depicted in green (as depicted at 910). Any suitable visual indicator such as color, shading, or outlining may be utilized.

In some embodiments, each row of region utilization dashboard 1106 may initially be presented in a collapsed view as depicted at 1108 with respect to region data corresponding to the region "RG8A." At any suitable time, a toggle or other interface element (e.g., toggle 1110) may be select to transition a row to an expanded view. Area 1112 depicts an expanded view of the region details corresponding to the region "RG8B." Area 1112 may be similarly utilized to present data as described above in connection with area 916 of FIG. 9. The data within region utilization dashboard 1106 may be similarly or differently formatted and may utilize similar or different units, numbers, and/or percentages as those used in FIG. 9.

The data presented in user interface 1100 may be differently formatted and may include additional data or may lack some of the data shown in FIG. 11.

Figure 12:
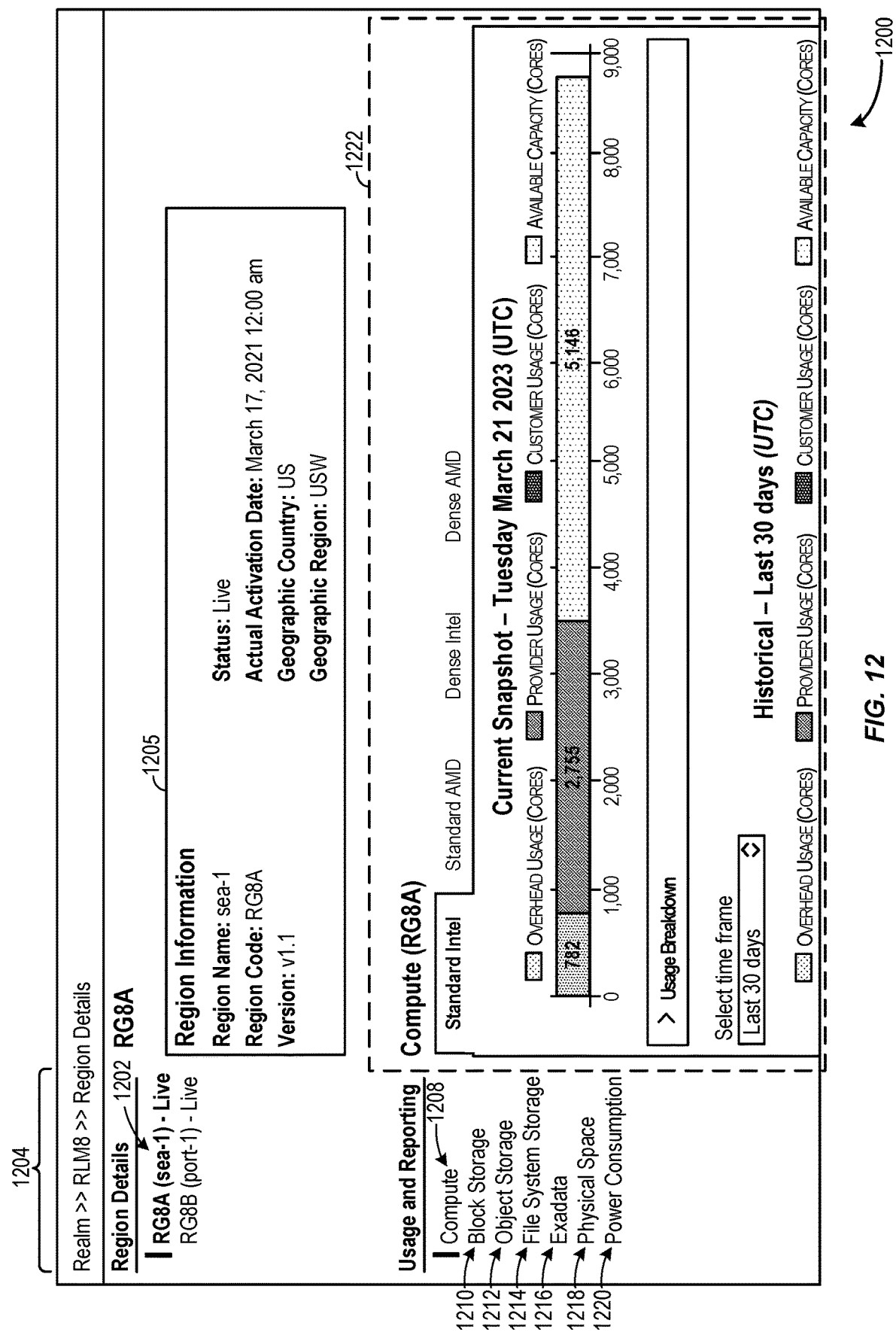
FIG. 12 is a block diagram depicting an exemplary user interface presenting region details, according to at least one embodiment.

FIG. 12 is a block diagram depicting an exemplary user interface (e.g., user interface 1200, one of the user interface(s) 308 of FIG. 3) presenting region details (e.g., region data corresponding to region "RG8A"), according to at least one embodiment. As described above, a user may navigate to user interface 1200 by selecting option 1018 of FIG. 10 and/or option 1114 of FIG. 11. Selecting option 1018 or 1114 may navigate the user to the region details view presented in FIG. 12 as indicated at 1202 of navigational panel 1204, the contents of which may replace or update the contents of area 1004 of FIG. 10 or 1104 of FIG. 11 based on the navigational option selected. The user interface 1200 may present in area 1205 any suitable data corresponding to a region, in this example, region RG8A. Region data may include, but is not limited to, region name ("sea-1"), region code ("RG8A"), and version (e.g., "v1.1"), region status (e.g., "Live"), actual activation date (e.g., "Mar. 17, 2021, 12:00 am," indicated a date and/or time at which the region was activated), geographic country (e.g., "US"), and geographic region (e.g., "USW"), to name a few. Region data may be presented in any suitable format, at any suitable location, and in any suitable manner within the user interface 1200.

A number of options corresponding to the selected region may be presented within area 1204. In some embodiments, by default, area 1222 may present data corresponding to compute resources of the selected region. Selecting any of options 1208-1220 may cause the content of area 1222 to be updated to data corresponding to the selected option as will be discussed in further detail with respect to FIGS. 13-22. Once an option is selected, the user may scroll down to view additional details of area 1222. In some embodiments, the area 1205 may remain docked at the top of user interface 1200 as depicted, or the area 1205 may scroll of the screen as more of area 1222 is presented. In some embodiments, through scrolling downward or otherwise navigating within user interface 1200, the user may be presented additional details corresponding to compute resources, block storage, object storage, file system storage, Exadata resources, physical space, and power consumption in the order listed in area 1204. In some embodiments, selecting an option (e.g., option 1208), the user may be navigated to user interface 1300 of FIG. 13.

The data presented in user interface 1200 may be differently formatted and may include additional data or may lack some of the data shown in FIG. 12.

Figure 13:
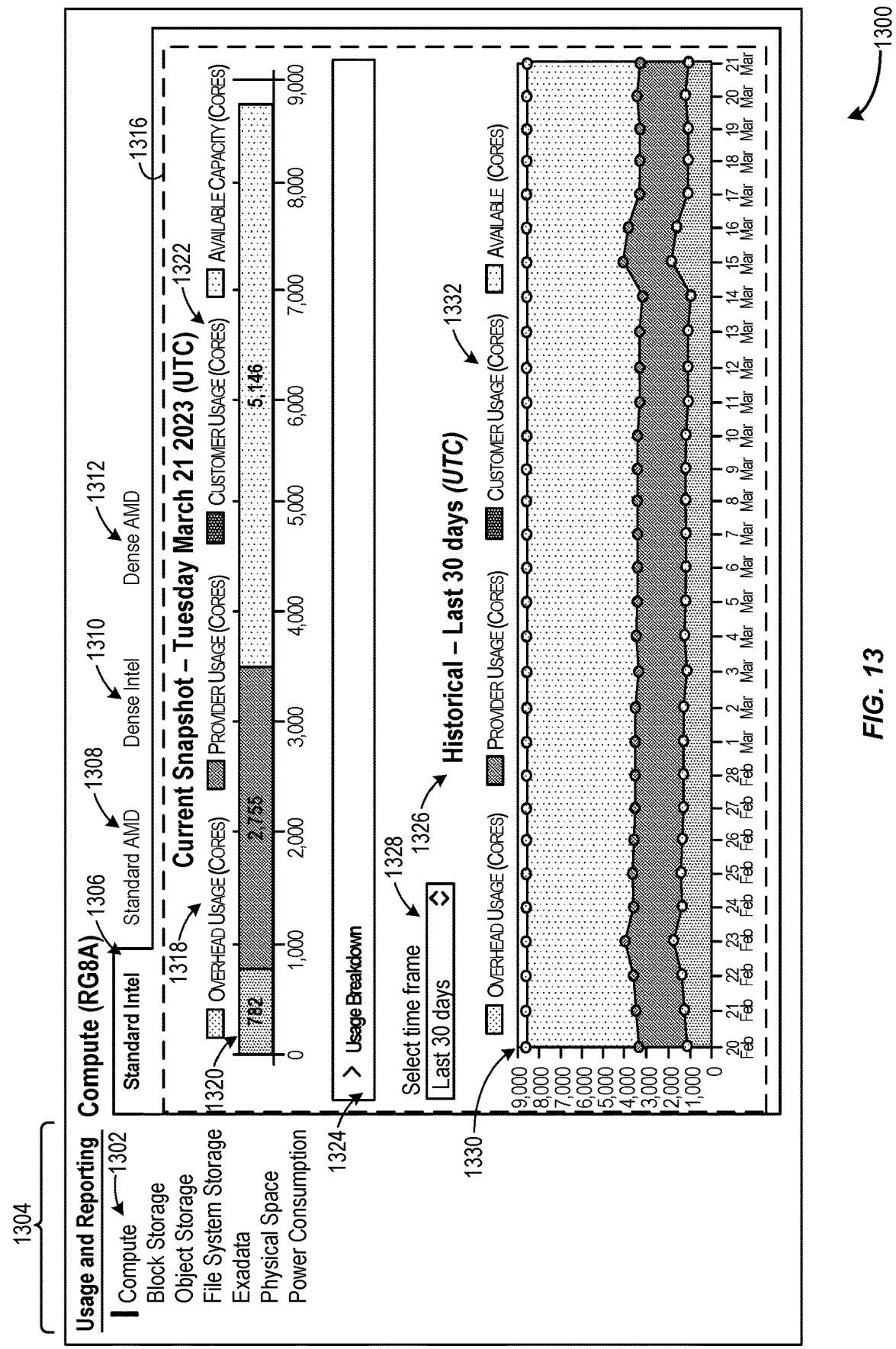
FIG. 13 is a block diagram depicting an exemplary user interface presenting compute details corresponding to a single region, according to at least one embodiment.

FIG. 13 is a block diagram depicting an exemplary user interface (e.g., user interface 1300, one of the user interface(s) 308 of FIG. 3) presenting compute details corresponding to a single region (e.g., region "RG8A"), according to at least one embodiment. In some embodiments, user interface 1300 may represent a portion of user interface 1200, or the user interface 1300 may provide a interface separate from user interface 1200. As described above, a user may navigate to user interface 1300 by selecting option 1208 of FIG. 12. Selecting option 1208 may navigate the user to the compute details view presented in FIG. 13 as indicated at 1302 of navigational panel 1304, the contents of which may replace or update the contents of area 1204 of FIG. 12 based on the navigational option selected. User interface 1300 may be configured to initially display data corresponding to tab 1306 that may correspond to a particular type of compute resource (e.g., cores that utilize standard Intel processors). One or more additional, or alternative tabs may be utilized, such as tab 1308, 1310, and/or 1312, corresponding to cores that utilize standard AMD processors, dense Intel processors, and dense AMD processors, respectively. When selected, each tab may present within area 1314 similar data, but specific to the type of cores indicated by each respective tab. Any suitable number of tabs may be provided, depending on the number of different compute resources being utilized in the region.

Area 1316 may present current snapshot data 1318 indicating a number of cores used for any suitable combination of cores used for overhead, cores used by the cloud provider, cores used by the customer, and available (currently unutilized) cores. The number of cores indicated within bar graph 1320 indicates, in accordance with the current selection of tab 1306, that 782 standard Intel cores are currently being used for overhead, 2,755 standard Intel cores are currently being used for the cloud provider, and 5,146 are available for use (currently not being utilized). The bar graph 1320 may be colorized such that the individual metrics depicted with bar graph 1320 may correspond with the colors presented in legend 1322. The current snapshot data may be differently formatted or presented in a different area of 1316 than depicted in FIG. 13 without departing from this disclosure.

Area 1316 may include option 1324 corresponding to usage data corresponding to compute resources of RG8A. As depicted here, option 1324 may indicate that data is available, but the data may initially be hidden from view. By selecting, option 1324, the area 1316 may be updated with the data presented in expanded view 1400. Any suitable data previously presented within area 1316 may be repositioned to accommodate the expanded view 1400 of the user interface component corresponding to option 1324.

Figure 14:
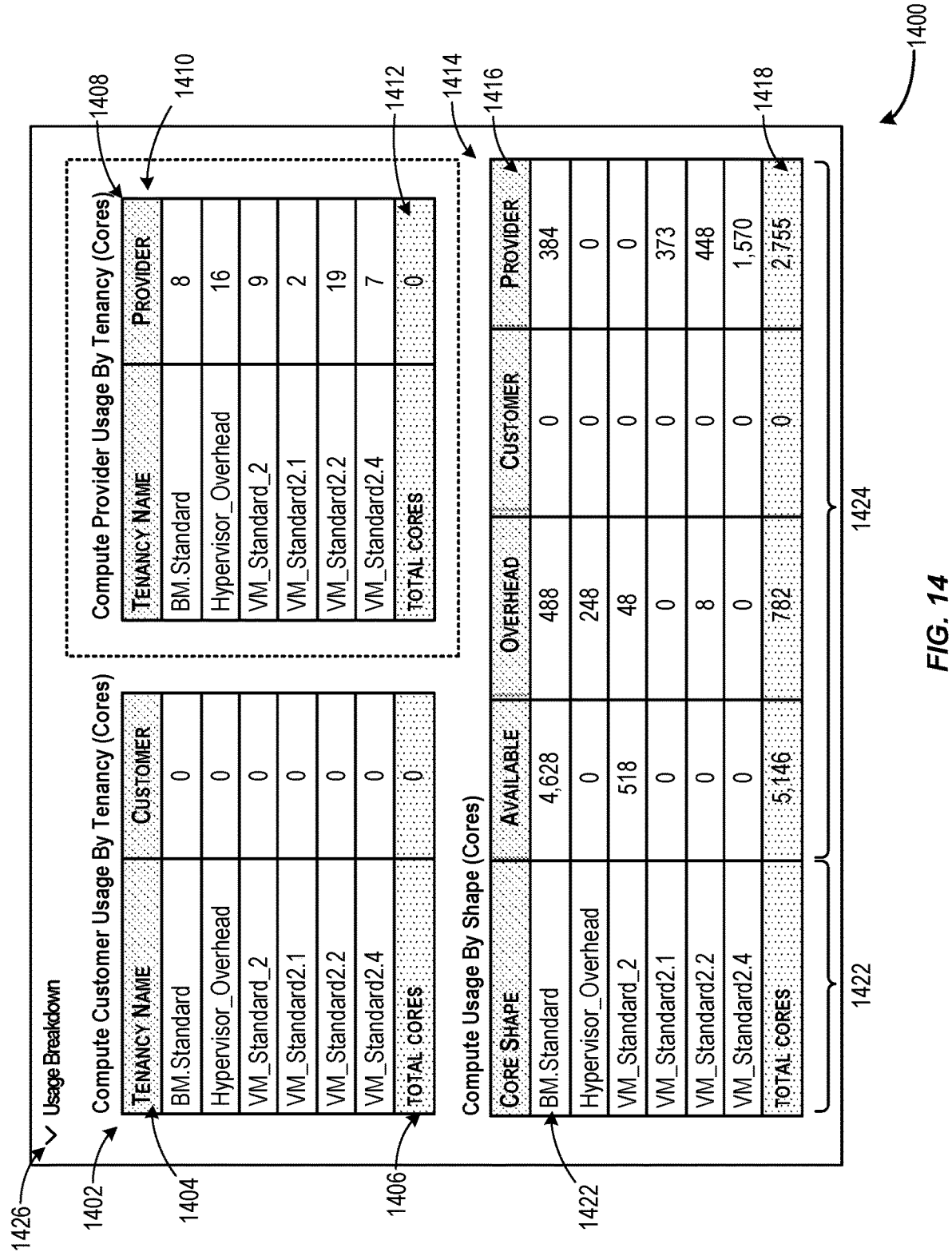
FIG. 14 is a block diagram depicting an expanded view of a user interface component of FIG. 13, according to at least one embodiment.

FIG. 14 is a block diagram depicting an expanded view (e.g., user interface 1400, one of the user interface(s) 308 of FIG. 3) of a user interface component of FIG. 13, according to at least one embodiment. In expanded view 1400, a number of usage tables are presented. By way of example, expanded view 1400 may include table 1402 corresponding to compute resource usage for the customer by tenancy. Row 1404 may be utilized to label columns "Tenancy Name" and "Customer." Rows of table 1402 positioned below row 1404 and above row 1406 may indicate a particular tenancy and a particular number of cores (e.g., standard Intel cores in the ongoing example, in accordance with the current selection of tab 1306) used by the customer. Row 1404 may be utilized to indicate a total number of cores used by the customer across all tenancies. In use cases in which the user interface 1300 of FIG. 13 and expanded view 1400 are being utilized by a user that is associated with the cloud provider, the expanded view may include table 1408. Row 1410 may be used to labels columns "Tenancy Name" and "Provider." Rows positioned below row 1410 and above row 1412 may indicate a particular tenancy and a particular number of cores (e.g., standard Intel cores in the ongoing example) used by the cloud provider. A total number of cores used by the cloud provider across all tenancies may be indicated in row 1404.

In some embodiments, expanded view 1400 may include table 1410. Row 1416 may be utilized to label columns "Core Shape," "Available," "Overhead," "Customer," and "Provider." Rows below row 1416 and above row 1418 may indicate a number of available, overhead utilized, customer utilized, and provider utilized cores of a give core shape (e.g., the core shape indicated in a corresponding field of column 1422). As a non-limiting example, data of columns 1424 and row 1420 may be used to indicate that there are 4,628 standard Intel cores having a "BM.Standard" shape available, that there are 488 standard Intel cores of the "BM.Standard" shape being currently utilized for overhead, 0 standard Intel cores of the "BM.Standard" shape being currently utilized by the customer, and 384 standard Intel cores of the "BM.Standard" shape currently being utilized by the provider. Data of columns 1424 and row 1418 may be utilized to provide respective core totals corresponding to available standard Intel cores, standard Intel cores being currently used for overhead, standard Intel cores being currently used by the customer, and standard Intel cores being currently used by the provider, respectively, and regardless of core shape. Selecting toggle 1426 may transition the user interface 1300 from presenting the expanded view 1400 back to presenting the option 1324.

Retuning to FIG. 13, the user interface may present historical data 1326. As depicted, and potentially by default, the historical data may represent historical data that is associated with a default time period (e.g., the last 30 days). However, option 1328 may be presented which, if utilized, enables the user to select different time frames (e.g., the last week, the last 24 hours, the last year, the last 6 months, etc.). In some embodiments, selection made via option 1328 may cause the historical data 1326 to be updated to correspond to the selection made.

In some embodiments, historical data 1326 may include graph 1330, although the historical data 1326 may be differently presented, and in any suitable format. The graph 1326 may present a number of different sets of usage data. By way of example, the graph 1330 may be configured to present usage data corresponding to standard Intel cores being currently utilized for overhead, by the provider, by the customer, and those which are not currently being utilized (e.g., available) according to legend 1332. Each set of data may be colorized to distinguish the data sets from one another. The color (or other distinguishing feature) corresponding to each data set may be indicated within legend 1332 or in any suitable manner.

The data presented in user interface 1300 may be differently formatted and may include additional data or may lack some of the data shown in FIG. 13.

Figure 15:
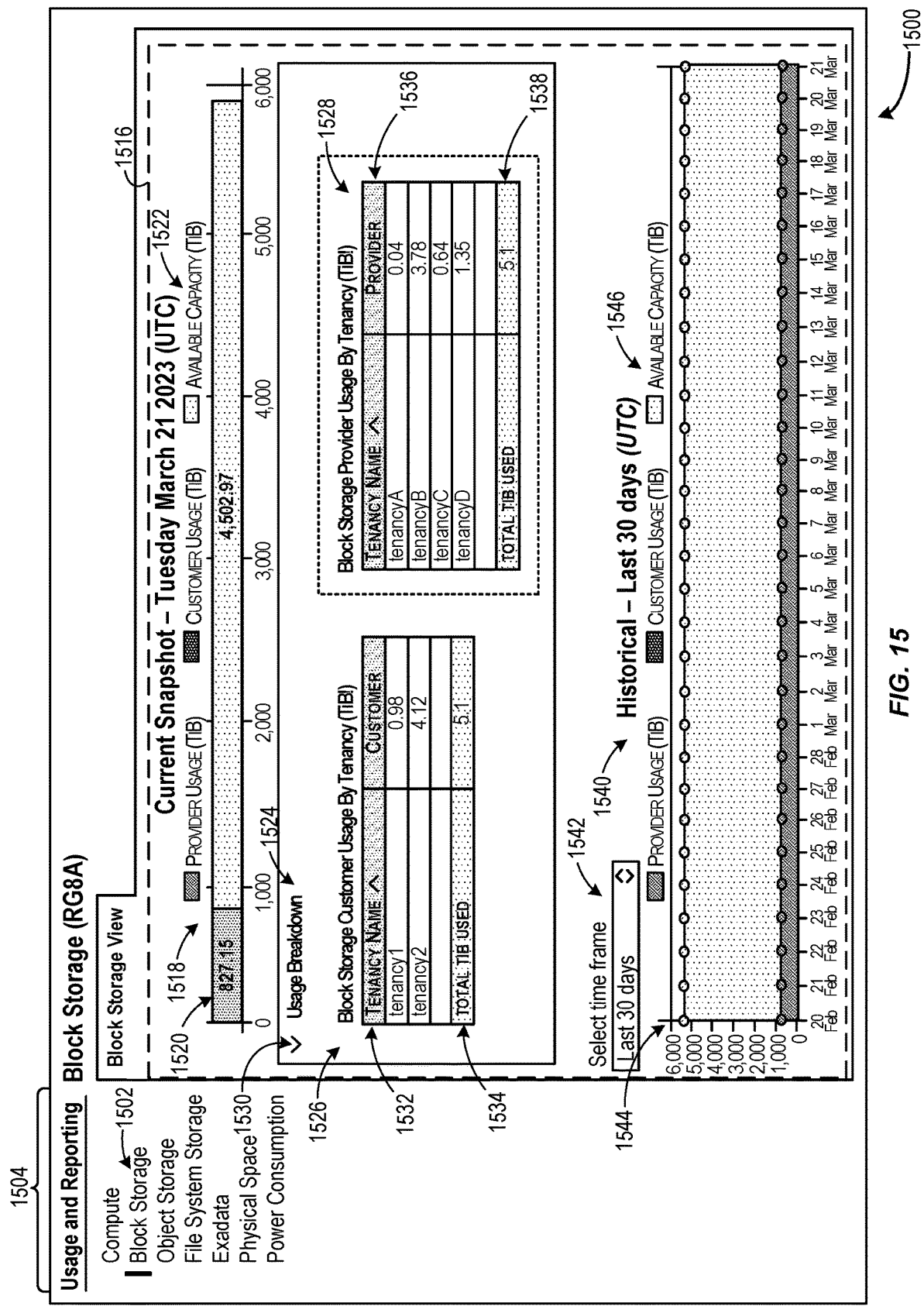
FIG. 15 is a block diagram depicting an exemplary user interface presenting block storage details corresponding to a single region, according to at least one embodiment.

FIG. 15 is a block diagram depicting an exemplary user interface (e.g., user interface 1500, one of the user interface(s) 308 of FIG. 3) presenting block storage details corresponding to a single region (e.g., "RG8A"), according to at least one embodiment. In some embodiments, user interface 1500 may represent a portion of user interface 1200, or the user interface 1500 may provide a interface separate from user interface 1200. As described above, a user may navigate to user interface 1500 by selecting option 1210 of FIG. 12. Selecting option 1210 may navigate the user to the block storage details view presented in FIG. 15 as indicated at 1502 of navigational panel 1504, the contents of which may replace or update the contents of area 1204 of FIG. 12, or any suitable previously presented navigational panel, based on the navigational option selected.

Area 1516 may present current snapshot data 1518 indicating block storage currently being used by the provider, block storage currently being used by the customer, and block storage that is not currently in use (e.g., available block storage). Any suitable unit of capacity (e.g., tebibyte (TiB)) may be utilized. The amounts indicated within bar graph 1520 indicates that 827.15 TiBs of block storage is currently being used by the provider, and 4,502.97 TiBs of block storage capacity is currently available. The bar graph 1520 may be colorized such that the individual metrics depicted with bar graph 1520 may correspond with the colors presented in legend 1522. The current snapshot data may be differently formatted or presented in a different area of 1516 than depicted in FIG. 15 without departing from this disclosure.

Area 1516 may include user interface element 1524 corresponding to usage data associated with block storage resources of region RG8A. User interface element 1524 may initially be presented in a collapsed view. Once selected, the user interface element 1524 may be expanded to present an expanded view including tables 1526 and, potentially table 1528. Selecting toggle 1530 may transition the user interface element 1524 between expanded view and a collapsed view any suitable number of times. In collapsed view, table 1526 and table 1528 may not be visible within user interface element 1524. Any suitable data previously presented within area 1516, before user interface element 1524 is expanded, may be repositioned to accommodate the expanded view of user interface element 1524.

In expanded view, user interface element may present table 1526 corresponding to block storage usage for the customer by tenancy. Row 1532 may be utilized to label columns "Tenancy Name" and "Customer." Rows of table 1526 positioned below row 1532 and above row 1534 may indicate a particular tenancy and a particular capacity used for a given tenancy. Row 1534 may be utilized to indicate a total amount of block storage (in TiBs) used by the customer across all tenancies. In use cases in which the user interface 1500 is being utilized by a user that is associated with the cloud provider, user interface element 1524 may include table 1528. In some embodiments, table 1524 may not be presented to users associated with the customer. Row 1536 may be used to labels columns "Tenancy Name" and "Provider." Rows positioned below row 1536 and above row 1538 may indicate a particular tenancy and a particular amount of block storage (in TiBs) used by the cloud provider. A total amount of block storage used by the cloud provider across all tenancies may be indicated in row 1538.

The user interface 1500 may present historical data 1540. As depicted, and potentially by default, the historical data may represent historical data that is associated with a default time period (e.g., the last 30 days). However, option 1542 may be presented which, if utilized, enables the user to select different time frames (e.g., the last week, the last 24 hours, the last year, the last 6 months, etc.). In some embodiments, selection made via option 1542 may cause the historical data 1540 to be updated to correspond to the selection made.

In some embodiments, historical data 1540 may be presented in graph 1544, although the historical data 1540 may be differently presented, and in any suitable format. The graph 1544 may present a number of different sets of usage data. By way of example, the graph 1544 may be configured to present usage data corresponding to an amount (in TiBs) of block storage utilized by the provider, an amount (in TiBs) of block storage utilized by the customer, and an amount (in TiBs) of block storage capacity not currently being utilized (e.g., available) according to legend 1546. Each set of data may be colorized to distinguish the data sets from one another. The color (or other distinguishing feature) corresponding to each data set may be indicated within legend 1546 or in any suitable manner.

The data presented in user interface 1500 may be differently formatted and may include additional data or may lack some of the data shown in FIG. 15.

Figure 16:
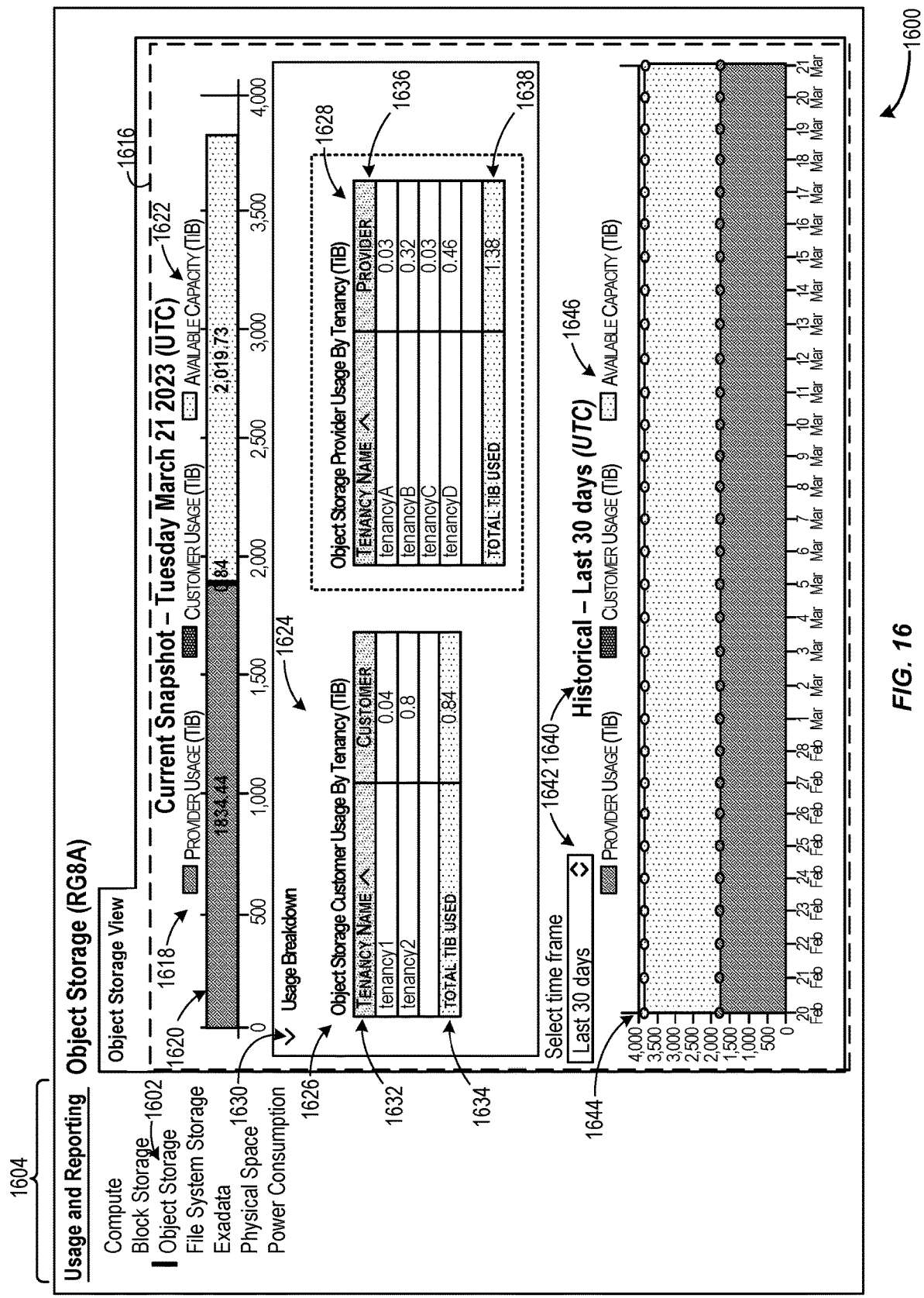
FIG. 16 is a block diagram depicting an exemplary user interface presenting object storage details corresponding to a single region, according to at least one embodiment.

FIG. 16 is a block diagram depicting an exemplary user interface (e.g., user interface 1600, one of the user interface(s) 308 of FIG. 3) presenting object storage corresponding to a single region (e.g., "RG8A"), according to at least one embodiment. In some embodiments, user interface 1600 may represent a portion of user interface 1200, or the user interface 1600 may provide a interface separate from user interface 1200. As described above, a user may navigate to user interface 1600 by selecting option 1212 of FIG. 12. Selecting option 1212 may navigate the user to the object storage details view presented in FIG. 16 as indicated at 1602 of navigational panel 1604, the contents of which may replace or update the contents of area 1204 of FIG. 12, or any suitable previously presented navigational panel, based on the navigational option selected.

Area 1616 may present current snapshot data 1618 indicating object storage currently being used by the provider, object storage currently being used by the customer, and object storage that is not currently in use (e.g., available object storage). Any suitable unit of capacity (e.g., tebibyte (TiB)) may be utilized. The amounts indicated within bar graph 1620 indicates that 1834.44 TiBs of object storage is currently being used by the provider, and 0.84 TiBs of object storage is currently being utilized by the customer, and 2,019.73 TiBs of object storage capacity is currently available for use (e.g., not currently being utilized). The bar graph 1620 may be colorized such that the individual metrics depicted with bar graph 1620 may correspond with the colors presented in legend 1622. The current snapshot data may be differently formatted or presented in a different area of 1616 than depicted in FIG. 16 without departing from this disclosure.

Area 1616 may include user interface element 1624 corresponding to usage data associated with object storage resources of region RG8A. User interface element 1624 may initially be presented in a collapsed view. Once selected, the user interface element 1624 may be expanded to present an expanded view including tables 1626 and, potentially table 1628. Selecting toggle 1630 may transition the user interface element 1624 between expanded view and a collapsed view any suitable number of times. In collapsed view, table 1626 and table 1628 may not be visible within user interface element 1624. Any suitable user data previously presented within area 1616, before user interface element 1624 is expanded, may be repositioned to accommodate the expanded view of user interface element 1624.

In expanded view, user interface element may present table 1626 corresponding to object storage usage for the customer by tenancy. Row 1632 may be utilized to label columns "Tenancy Name" and "Customer." Rows of table 1626 positioned below row 1632 and above row 1634 may indicate a particular tenancy and a particular capacity used for a given tenancy. Row 1634 may be utilized to indicate a total amount of object storage (in TiBs) used by the customer across all tenancies. In use cases in which the user interface 1600 is being utilized by a user that is associated with the cloud provider, user interface element 1624 may include table 1628. In some embodiments, table 1624 may not be presented to users associated with the customer. Row 1636 may be used to labels columns "Tenancy Name" and "Provider." Rows positioned below row 1636 and above row 1638 may indicate a particular tenancy and a particular amount of object storage (in TiBs) used by the cloud provider. A total amount of object storage used by the cloud provider across all tenancies may be indicated in row 1538.

The user interface 1600 may present historical data 1640. As depicted, and potentially by default, the historical data may represent historical data that is associated with a default time period (e.g., the last 30 days). However, option 1642 may be presented which, if utilized, enables the user to select different time frames (e.g., the last week, the last 24 hours, the last year, the last 6 months, etc.). In some embodiments, selection made via option 1642 may cause the historical data 1640 to be updated to correspond to the selection made.

In some embodiments, historical data 1640 may be presented in graph 1644, although the historical data 1640 may be differently presented, and in any suitable format. The graph 1644 may present a number of different sets of usage data. By way of example, the graph 1644 may be configured to present usage data corresponding to an amount (in TiBs) of object storage utilized by the provider, an amount (in TiBs) of object storage utilized by the customer, and an amount (in TiBs) of object storage capacity not currently being utilized (e.g., available) according to legend 1646. Each set of data may be colorized to distinguish the data sets from one another. The color (or other distinguishing feature)

corresponding to each data set may be indicated within legend 1646 or in any suitable manner.

The data presented in user interface 1600 may be differently formatted and may include additional data or may lack some of the data shown in FIG. 16.

Figure 17:
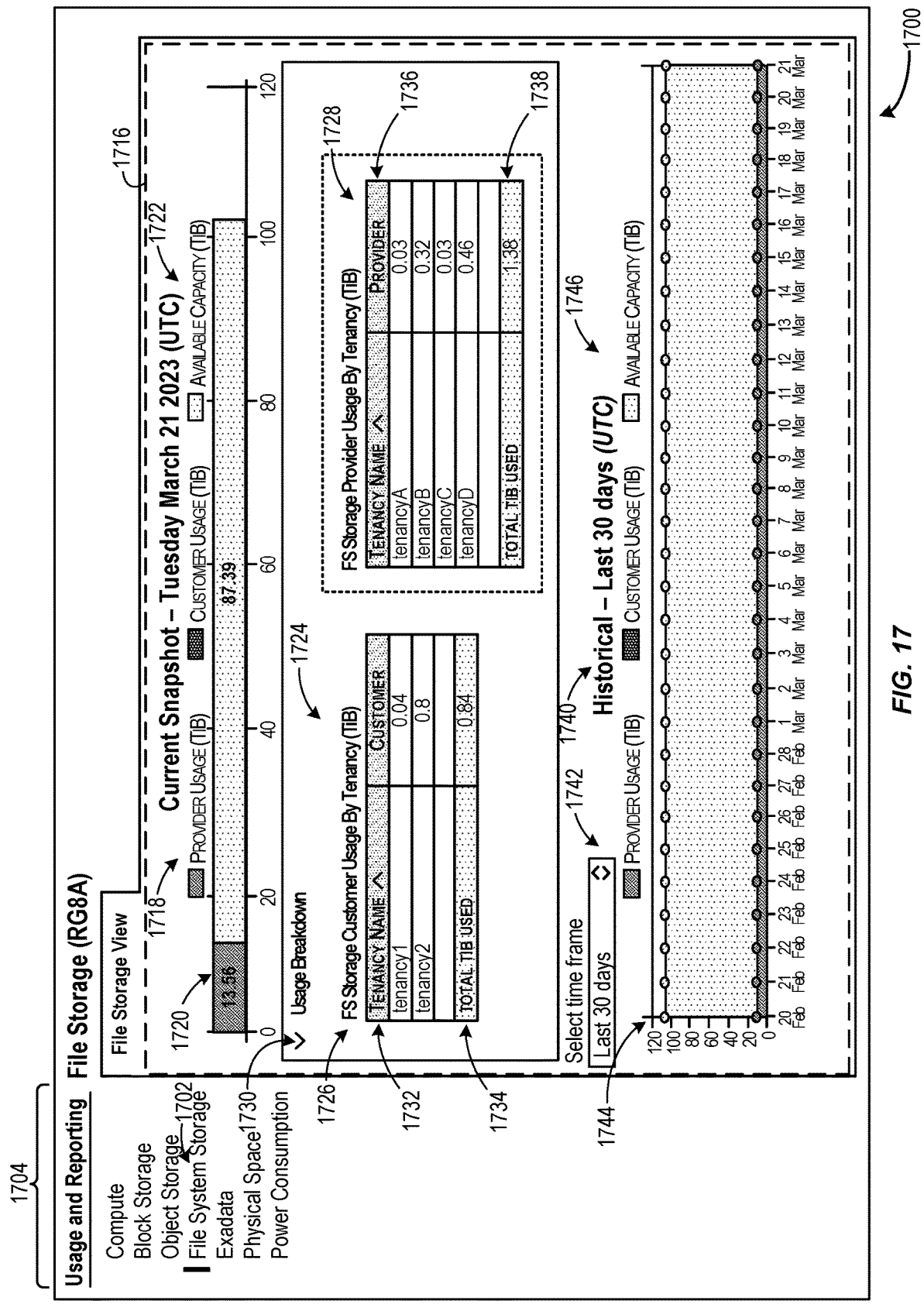
FIG. 17 is a block diagram depicting an exemplary user interface presenting file storage details corresponding to a single region, according to at least one embodiment.

FIG. 17 is a block diagram depicting an exemplary user interface (e.g., user interface 1700, one of the user interface(s) 308 of FIG. 3) presenting file storage details corresponding to a single region (e.g., "RG8A"), according to at least one embodiment. In some embodiments, user interface 1700 may represent a portion of user interface 1200, or the user interface 1700 may provide a interface separate from user interface 1200. As described above, a user may navigate to user interface 1700 by selecting option 1214 of FIG. 12. Selecting option 1214 may navigate the user to the file system storage view presented in FIG. 17 as indicated at 1702 of navigational panel 1704, the contents of which may replace or update the contents of area 1204 of FIG. 12, or any suitable previously presented navigational panel, based on the navigational option selected.

Area 1716 may present current snapshot data 1718 indicating file system storage currently being used by the provider, file system storage currently being used by the customer, and file system storage that is not currently in use (e.g., available file system storage). Any suitable unit of capacity (e.g., tebibyte (TiB)) may be utilized. The amounts indicated within bar graph 1720 indicates that 13.56 TiBs of file system storage is currently being used by the provider, and 87.39 TiBs of file system storage is currently available for use (e.g., not currently being utilized). The bar graph 1720 may be colorized such that the individual metrics depicted with bar graph 1720 may correspond with the colors presented in legend 1722. The current snapshot data may be differently formatted or presented in a different area of 1716 than depicted in FIG. 17 without departing from this disclosure.

Area 1716 may include user interface element 1724 corresponding to usage data associated with file system storage resources of region "RG8A." User interface element 1724 may initially be presented in a collapsed view. Once selected, the user interface element 1724 may be expanded to present an expanded view including tables 1726 and, potentially table 1728. Selecting toggle 1730 may transition the user interface element 1724 between expanded view and a collapsed view any suitable number of times. In collapsed view, table 1726 and table 1728 may not be visible within user interface element 1724. Any suitable data previously presented within area 1716, before user interface element 1724 is expanded, may be repositioned to accommodate the expanded view of user interface element 1724.

In expanded view, user interface element may present table 1726 corresponding to file system storage usage for the customer by tenancy. Row 1732 may be utilized to label columns "Tenancy Name" and "Customer." Rows of table 1726 positioned below row 1732 and above row 1734 may indicate a particular tenancy and a particular capacity used for a given tenancy. Row 1734 may be utilized to indicate a total amount of file system storage (in TiBs) used by the customer across all tenancies. In use cases in which the user interface 1700 is being utilized by a user that is associated with the cloud provider, user interface element 1724 may include table 1728. In some embodiments, table 1724 may not be presented to users associated with the customer. Row 1736 may be used to labels columns "Tenancy Name" and "Provider." Rows positioned below row 1736 and above row 1738 may indicate a particular tenancy and a particular amount of file system storage (in TiBs) used by the cloud provider. A total amount of file system storage used by the cloud provider across all tenancies may be indicated in row 1738.

The user interface 1700 may present historical data 1740. As depicted, and potentially by default, the historical data may represent historical data that is associated with a default time period (e.g., the last 30 days). However, option 1742 may be presented which, if utilized, enables the user to select different time frames (e.g., the last week, the last 24 hours, the last year, the last 6 months, etc.). In some embodiments, selection made via option 1742 may cause the historical data 1740 to be updated to correspond to the selection made.

In some embodiments, historical data 1740 may be presented in graph 1744, although the historical data 1740 may be differently presented, and in any suitable format. The graph 1744 may present a number of different sets of usage data. By way of example, the graph 1744 may be configured to present usage data corresponding to an amount (in TiBs) of file system storage utilized by the provider, an amount (in TiBs) of file system storage utilized by the customer, and an amount (in TiBs) of file system storage capacity not currently being utilized (e.g., available) according to legend 1746. Each set of data may be colorized to distinguish the data sets from one another. The color (or other distinguishing feature) corresponding to each data set may be indicated within legend 1746 or in any suitable manner.

The data presented in user interface 1700 may be differently formatted and may include additional data or may lack some of the data shown in FIG. 17.

Figure 18:
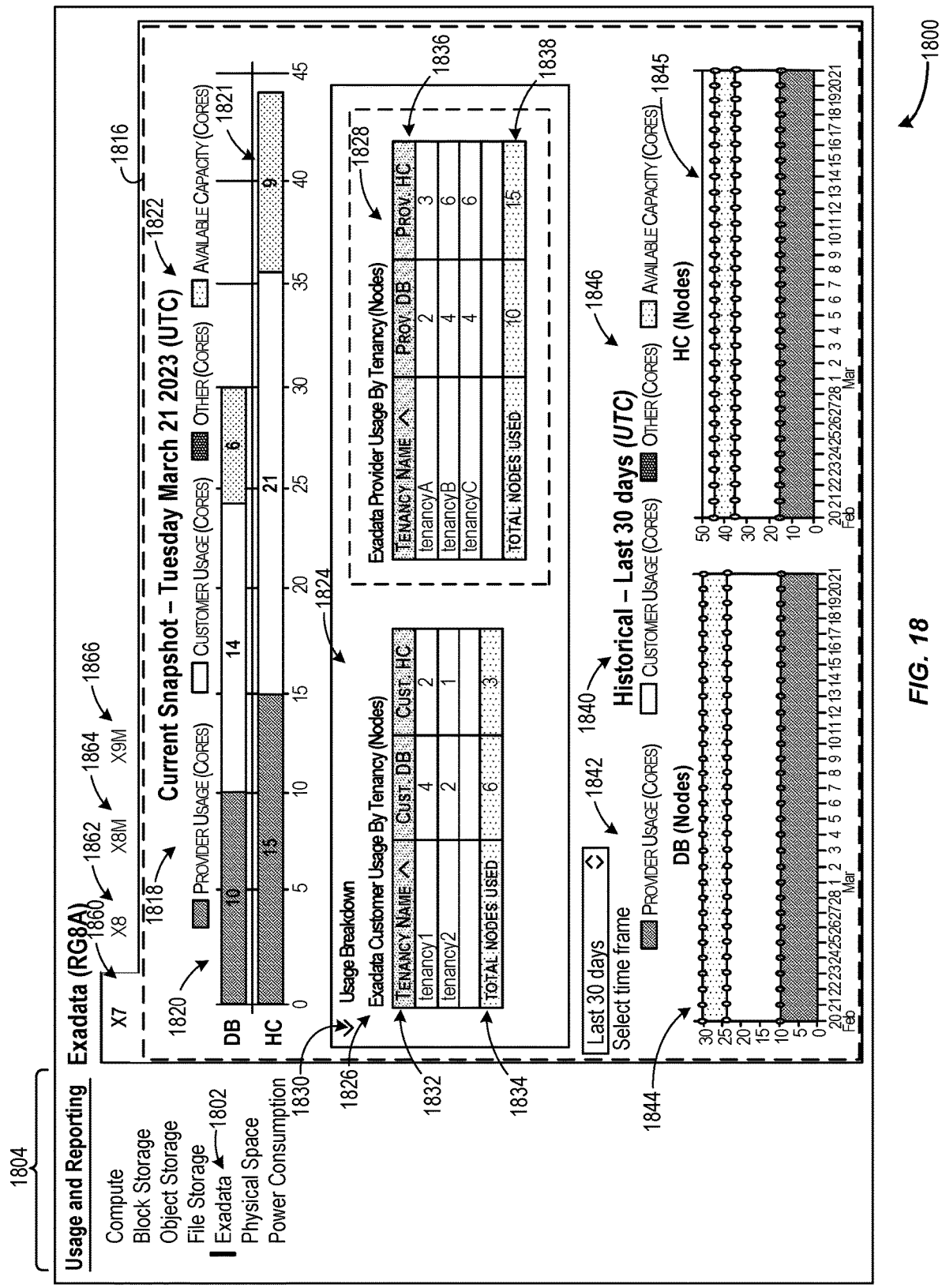
FIG. 18 is a block diagram depicting an exemplary user interface presenting database details corresponding to a single region, according to at least one embodiment.

FIG. 18 is a block diagram depicting an exemplary user interface (e.g., user interface 1800, one of the user interface(s) 308 of FIG. 3) presenting database details corresponding to a single region (e.g., "RG8A"), according to at least one embodiment. In some embodiments, user interface 1800 may represent a portion of user interface 1200, or the user interface 1800 may provide a interface separate from user interface 1200. As described above, a user may navigate to user interface 1800 by selecting option 1216 of FIG. 12. Selecting option 1216 may navigate the user to the Exadata view presented in FIG. 18 as indicated at 1802 of navigational panel 1804, the contents of which may replace or update the contents of area 1204 of FIG. 12, or any suitable previously presented navigational panel, based on the navigational option selected. User interface 1800 may be configured to initially display data corresponding to tab 1860 that may correspond to a particular type of Exadata resources (e.g., cores operating as part of an X7 Oracle Exadata Database (DB) Machine, a hardware component configured to execute in accordance with a predefined Oracle Exadata Data Machine model). One or more additional, or alternative tabs may be utilized, such as tab 1862, 1864, and/or 1866, corresponding to X8, X8M, and X9M DB machines, each being preconfigured to correspond to a predefined DB machine model. When selected, each tab may present within area, but specific to the type of rack indicated by each respective tab. Any suitable number of tabs may be provided, depending on the number of DB machine models utilized in the region.

Area 1816 may present current snapshot data 1818 indicating Exadata resources currently being used by the provider, Exadata resources currently being used by the customer, and Exadata resources that are not currently in use (e.g., available). Any suitable unit (e.g., cores, nodes, etc.) may be utilized. Snapshot data 1818 may include one or more bar graphs (e.g., bar graph 1820 corresponding to cores being utilized by DB nodes and bar graph 1821 for cores being used by high capacity (HC) nodes) The amounts indicated within bar graph 1820 indicates that, with respect to cores being used for DB nodes, 10 cores are being utilized by the provider, 14 by the customer, and 6 cores are available. The amounts indicated within bar graph 1821 indicates that, with respect to cores being used for HC nodes, 15 cores are being utilized by the provider, 21 by the customer, and 9 cores are available. The bar graphs 1820 and 1821 may be colorized such that the individual metrics depicted with bar graphs 1820 and 1821 may correspond with the colors presented in legend 1822. The current snapshot data may be differently formatted or presented in a different area of 1816 than depicted in FIG. 18 without departing from this disclosure.

Area 1816 may include user interface element 1824 corresponding to usage data associated with Exadata resources of region RG8A. User interface element 1824 may initially be presented in a collapsed view. Once selected, the user interface element 1824 may be expanded to present an expanded view including tables 1826 and, potentially table 1828. Selecting toggle 1830 may transition the user interface element 1824 between expanded view and a collapsed view any suitable number of times. In collapsed view, table 1826 and table 1828 may not be visible within user interface element 1824. Any suitable data previously presented within area 1816, before user interface element 1824 is expanded, may be repositioned to accommodate the expanded view of user interface element 1824.

In expanded view, user interface element may present table 1826 corresponding to a node usage for the customer by tenancy. Row 1832 may be utilized to label columns "Tenancy Name," "Cust. DB," and "Cust. HC" Rows of table 1826 positioned below row 1832 and above row 1834 may indicate a particular tenancy and a number of DB nodes and HC nodes used for that tenancy. Row 1834 may be utilized to indicate a total amount of DB nodes, and a total amount of HC nodes, used by the customer across all tenancies. In use cases in which the user interface 1800 is being utilized by a user that is associated with the cloud provider, user interface element 1824 may include table 1828. In some embodiments, table 1824 may not be presented to users associated with the customer. Row 1836 may be used to labels columns "Tenancy Name," "Provider DB," and Provider HC." Rows positioned below row 1836 and above row 1838 may indicate a particular tenancy and a particular number of DB nodes and HC nodes used by the cloud provider. Total amounts of DB nodes and HC nodes used by the cloud provider across all tenancies may be indicated in row 1838.

The user interface 1800 may present historical data 1840. As depicted, and potentially by default, the historical data may represent historical data that is associated with a default time period (e.g., the last 30 days). However, option 1842 may be presented which, if utilized, enables the user to select different time frames (e.g., the last week, the last 24 hours, the last year, the last 6 months, etc.). In some embodiments, selection made via option 1842 may cause the historical data 1840 to be updated to correspond to the selection made.

In some embodiments, historical data 1840 may be presented in graph 1844 and/or graph 1845, although the historical data 1840 may be differently presented, and in any suitable format. The graph 1844 may present a number of different sets of usage data corresponding to DB nodes/cores. By way of example, the graph 1844 may be configured to present usage data indicating a number of DB nodes/cores utilized by the provider, a number of DB nodes/cores utilized by the customer, and a number of DB nodes/cores not currently being utilized (e.g., available) according to legend 1846. Similarly, the graph 1845 may be configured to present usage data indicating a number of HC nodes/cores utilized by the provider, a number of HC nodes/cores utilized by the customer, and a number of HC nodes/cores not currently being utilized (e.g., available) according to legend 1846. Each set of data of graphs 1844 and/or 1845 may be colorized to distinguish the data sets from one another. The color (or other distinguishing feature) corresponding to each data set may be indicated within legend 1846 or in any suitable manner.

The data presented in user interface 1800 may be differently formatted and may include additional data or may lack some of the data shown in FIG. 18.

Figure 19:
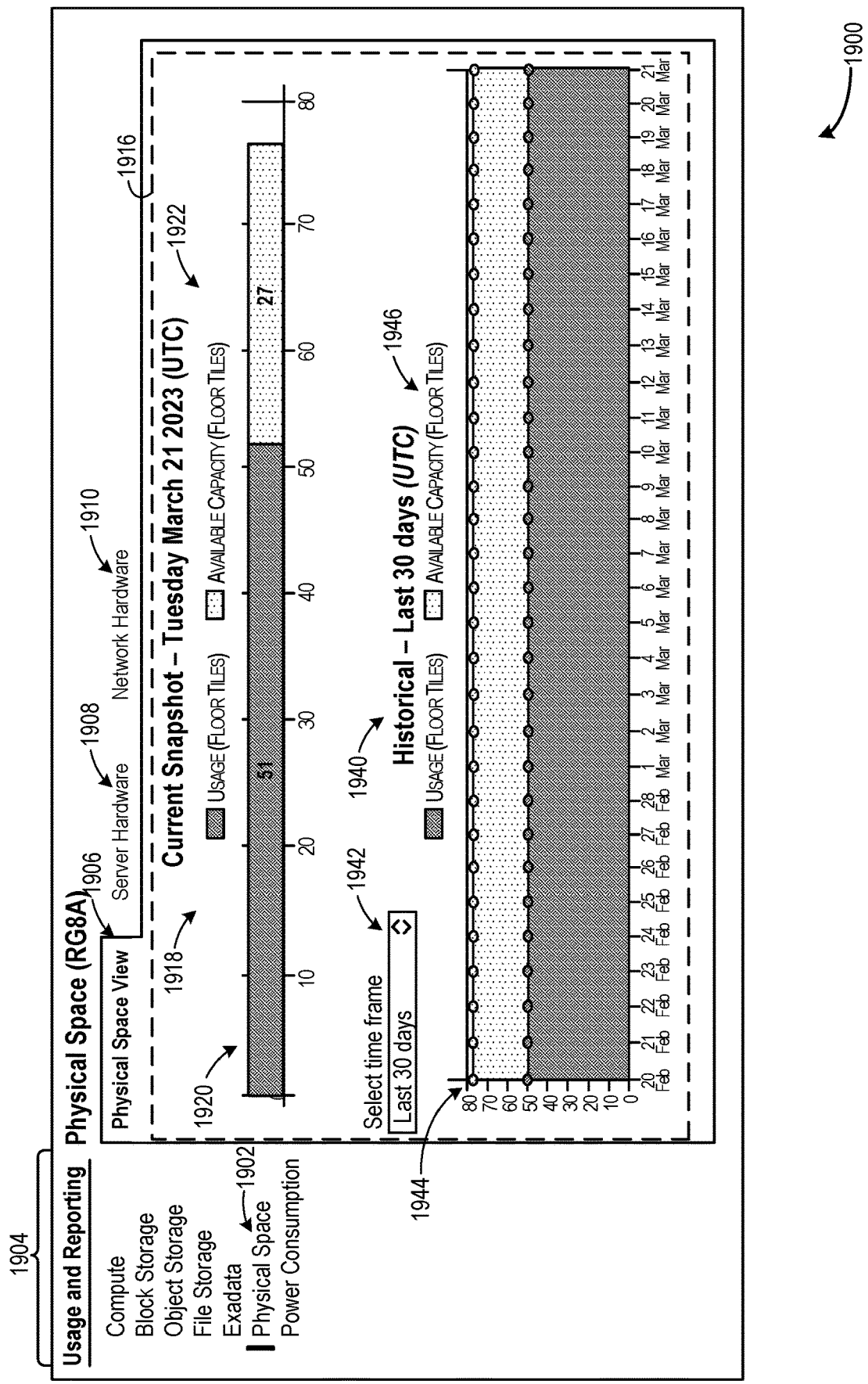
FIG. 19 is a block diagram depicting an exemplary user interface presenting physical space details corresponding to a single region, according to at least one embodiment.

FIG. 19 is a block diagram depicting an exemplary user interface (e.g., user interface 1900, one of the user interface(s) 308 of FIG. 3) presenting physical space details corresponding to a single region (e.g., "RG8A"), according to at least one embodiment. In some embodiments, user interface 1900 may represent a portion of user interface 1200, or the user interface 1900 may provide a interface separate from user interface 1200. As described above, a user may navigate to user interface 1900 by selecting option 1218 of FIG. 12. Selecting option 1218 may navigate the user to the physical space view presented in FIG. 19 as indicated at 1902 of navigational panel 1904, the contents of which may replace or update the contents of area 1204 of FIG. 12, or any suitable previously presented navigational panel, based on the navigational option selected. User interface 1900 may be configured to initially display data corresponding to tab 1906 that may correspond to physical floor tiles with the DRCC corresponding to region "RG8A." One or more additional, or alternative tabs may be utilized, such as tab 1908 corresponding to server hardware and/or tab 1910 corresponding to network hardware. Tabs 1908 and 1910 will be discussed in further detail with respect to FIGS. 20 and 21, respectively.

Area 1916 may present current snapshot data 1918 indicating a number of units of physical space (e.g., floor tiles) currently being used and a number of units of physical space that are not currently in use (e.g., available). Any suitable unit (e.g., floor tiles of a raised floor system, having a predefined area) may be utilized. Snapshot data 1918 may include one or more bar graphs (e.g., bar graph 1920). The amounts indicated within bar graph 1920 indicates 51 floor tiles are being utilized and that 27 floor tiles are available. The bar graph 1920 may be colorized such that the individual metrics depicted with bar graph 1920 may correspond with the colors presented in legend 1922. The current snapshot data may be differently formatted or presented in a different area of 1916 than depicted in FIG. 19 without departing from this disclosure.

The user interface 1900 may present historical data 1940. As depicted, and potentially by default, the historical data may represent historical data that is associated with a default time period (e.g., the last 30 days). However, option 1942 may be presented which, if utilized, enables the user to select different time frames (e.g., the last week, the last 24 hours, the last year, the last 6 months, etc.). In some embodiments, selection made via option 1942 may cause the historical data 1940 to be updated to correspond to the selection made.

In some embodiments, historical data 1940 may be presented in graph 1944, although the historical data 1940 may be differently presented, and in any suitable format. The graph 1944 may present a number of different sets of usage data. By way of example, the graph 1944 may be configured to present a number of physical tiles being utilized historically and a number of physical tiles that have been historically available. Each set of data may be colorized to distinguish the data sets from one another. The color (or other distinguishing feature) corresponding to each data set may be indicated within legend 1946 or in any suitable manner.

The data presented in user interface 1900 may be differently formatted and may include additional data or may lack some of the data shown in FIG. 19. Selecting tab 1908 may navigate the user to user interface 2000 of FIG. 20.

Figure 20:
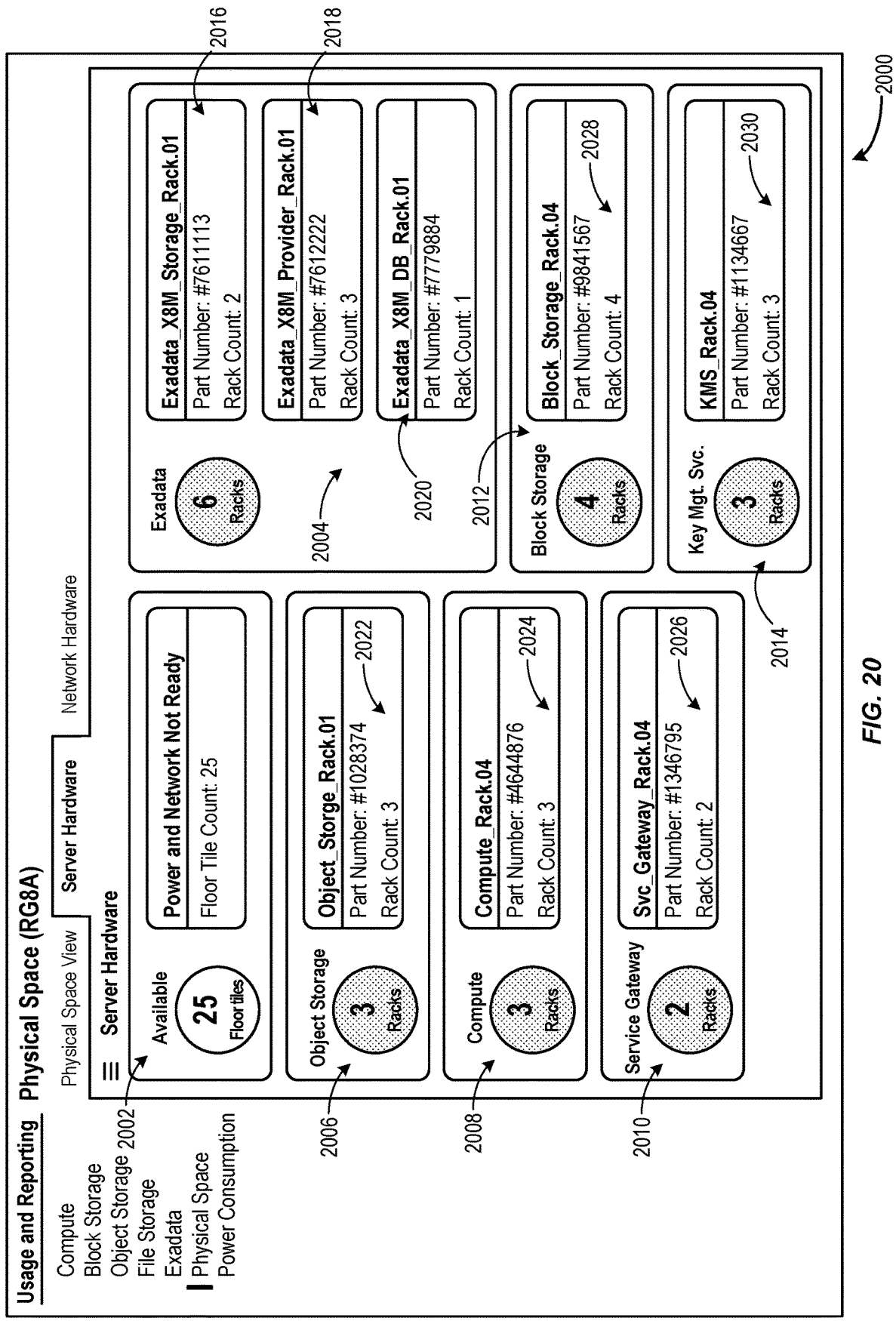
FIG. 20 is a block diagram depicting an exemplary user interface presenting server hardware details corresponding to a single region, according to at least one embodiment.

FIG. 20 is a block diagram depicting an exemplary user interface (e.g., user interface 2000, one of the user interface(s) 308 of FIG. 3) presenting server hardware details corresponding to a single region (e.g, region "RG8A"), according to at least one embodiment. User interface 2000 may be presented in response to selection of tab 1908 of FIG. 19. User interface 2000 may include include any suitable number of user interface elements (e.g., UI elements 2002-2014). Each UI element may present data corresponding to a category of server hardware resources. By way of example, UI element 2002 presents any suitable data corresponding to available server hardware (e.g., floor tiles) for which power and networking are not currently ready. In some embodiments, UI element 2002 may present a number (e.g., 25 floor tiles) indicating an amount that corresponds to an available server hardware category.

As a further example, UI element 2004 may present any suitable data corresponding to Exadata hardware (e.g., a number of racks corresponding to a configuration for executing an X8M Exadata Database Machine). As depicted, UI element 2004 may present a number indicating an amount of racks (e.g., 6) that are currently being utilized. In some embodiments, a number of additional user interface elements (e.g., UI elements 2016, 2018, and 2020) may be presented that provide data corresponding to a number of subcategories corresponding to the utilized racks. By way of example, UI element 2016 presents data (e.g., a part number, a rack count corresponding to a number of individual units/racks) that are configured according to a first configuration (e.g., Exadata_X8M_Storage_Rack.01). UI element 2018 presents data (e.g., a part number, a rack count corresponding to a number of individual units/racks) that are configured according to a second configuration (e.g., Exadata_X8M_Provider_Rack.01). UI element 2018 presents data (e.g., a part number, a rack count corresponding to a number of individual units/racks) that are configured according to a third configuration (e.g., Exadata_X8M_DB_Rack.01).

As depicted, UI element 2006 presents any suitable data corresponding to server hardware currently being utilized for object storage. In some embodiments, UI element 2006 may present a number (e.g., 3) indicating a number of racks that are currently being utilized to provide object storage. One or more additional user interface elements (e.g., UI element 2022) may be presented providing data corresponding to a number of respective subcategories corresponding to the utilized racks. UI element 2022 presents data (e.g., a part number, a rack count corresponding to a number of individual units/racks) that are configured according to a fourth configuration (e.g., Object_Storage_Rack.01).

As depicted, UI element 2008 presents any suitable data corresponding to server hardware currently being utilized for compute resources. In some embodiments, UI element 2008 may present a number (e.g., 3) indicating a number of racks that are currently being utilized to provide compute resources. One or more additional user interface elements (e.g., UI element 2024) may be presented providing data corresponding to a number of respective subcategories corresponding to the utilized racks. UI element 2024 presents data (e.g., a part number, a rack count corresponding to a number of individual units/racks) that are configured according to a fifth configuration (e.g., Compute_Rack.04).

As depicted, UI element 2010 presents any suitable data corresponding to server hardware currently being utilized to provide service gateways. In some embodiments, UI element 2010 may present a number (e.g., 2) indicating a number of racks that are currently being utilized to provide service gateways. One or more additional user interface elements (e.g., UI element 2026) may be presented providing data corresponding to a number of respective subcategories corresponding to the utilized racks. UI element 2026 presents data (e.g., a part number, a rack count corresponding to a number of individual units/racks) that are configured according to a sixth configuration (e.g., Svc_Gateay_Rack.04).

As depicted, UI element 2012 presents any suitable data corresponding to server hardware currently being utilized for block storage. In some embodiments, UI element 2012 may present a number (e.g., 4) indicating a number of racks that are currently being utilized to provide block storage. One or more additional user interface elements (e.g., UI element 2028) may be presented providing data corresponding to a number of respective subcategories corresponding to the utilized racks. UI element 2028 presents data (e.g., a part number, a rack count corresponding to a number of individual units/racks) that are configured according to a seventh configuration (e.g., Block_Storage_Rack.04).

As depicted, UI element 2014 presents any suitable data corresponding to server hardware currently being utilized for to provide key management services. In some embodiments, UI element 2014 may present a number (e.g., 3) indicating a number of racks that are currently being utilized to provide key management services. One or more additional user interface elements (e.g., UI element 2030) may be presented providing data corresponding to a number of respective subcategories corresponding to the utilized racks. UI element 2030 presents data (e.g., a part number, a rack count corresponding to a number of individual units/racks) that are configured according to a eighth configuration (e.g., KMS_Rack.04).

User interface 2000 may include any suitable number of user interface elements corresponding to any suitable number of server hardware categories, the number presented being dependent on the number of different categories utilized in the region (e.g., RG8A). Each of the UI elements may individually include any suitable number of additional UI elements corresponding to any suitable number of server hardware subcategories, the number presented being dependent on the number of different subcategories utilized in the region.

The data presented in user interface 2000 may be differently formatted and may include additional data or may lack some of the data shown in FIG. 20.

Figure 21:
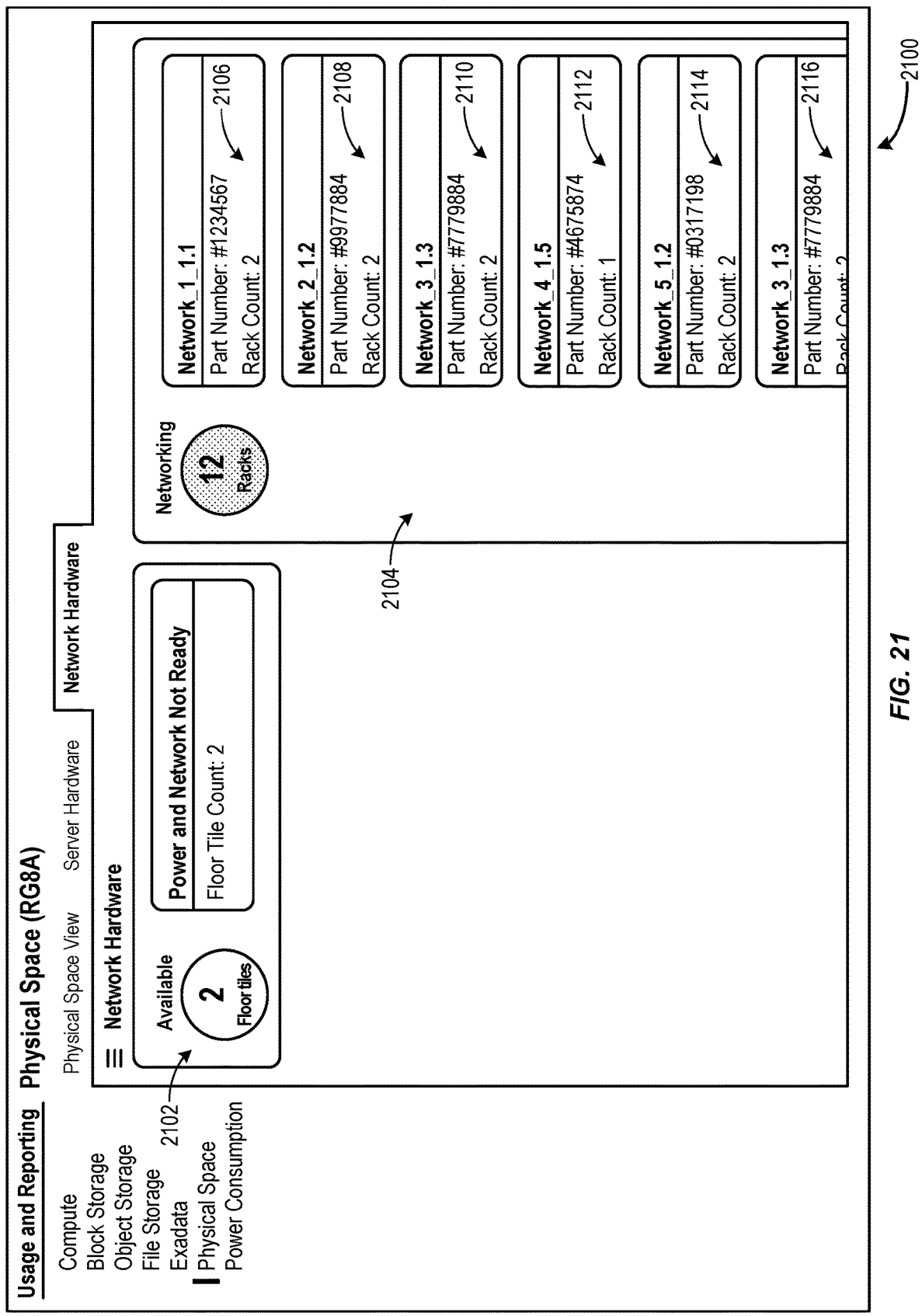
FIG. 21 is a block diagram depicting an exemplary user interface presenting network hardware details corresponding to a single region, according to at least one embodiment.

FIG. 21 is a block diagram depicting an exemplary user interface (e.g., user interface 2100, one of the user interface(s) 308 of FIG. 3) presenting network hardware details corresponding to a single region (e.g, region "RG8A"), according to at least one embodiment. User interface 2100 may be presented in response to selection of tab 1910 of FIG. 19. User interface 2100 may include any suitable number of user interface elements (e.g., UI elements 2102 and 2104). Each UI element may present data corresponding to a category of network hardware resources. By way of example, UI element 2002 presents any suitable data corresponding to available network hardware resources (e.g., floor tiles) for which power and networking are not currently ready. In some embodiments, UI element 2102 may present a number (e.g., 2 floor tiles) indicating an amount that corresponds to a network hardware category (e.g., "available").

As depicted, UI element 2104 presents any suitable data corresponding to currently utilized network hardware. In some embodiments, UI element 2104 may present a number (e.g., 12) indicating a number of racks that are currently being utilized for networking. One or more additional user interface elements (e.g., UI elements 2106-2116) may be presented providing data corresponding to a number of respective subcategories corresponding to the utilized racks. By way of example, UI element 2106 presents data (e.g., a part number, a rack count corresponding to a number of individual units/racks) that are configured according to a particular configuration (e.g., Network_1_1.1). Each of the UI elements 2106-2116 may correspond to a different rack configuration.

The data presented in user interface 2100 may be differently formatted and may include additional data or may lack some of the data shown in FIG. 21.

Figure 22:
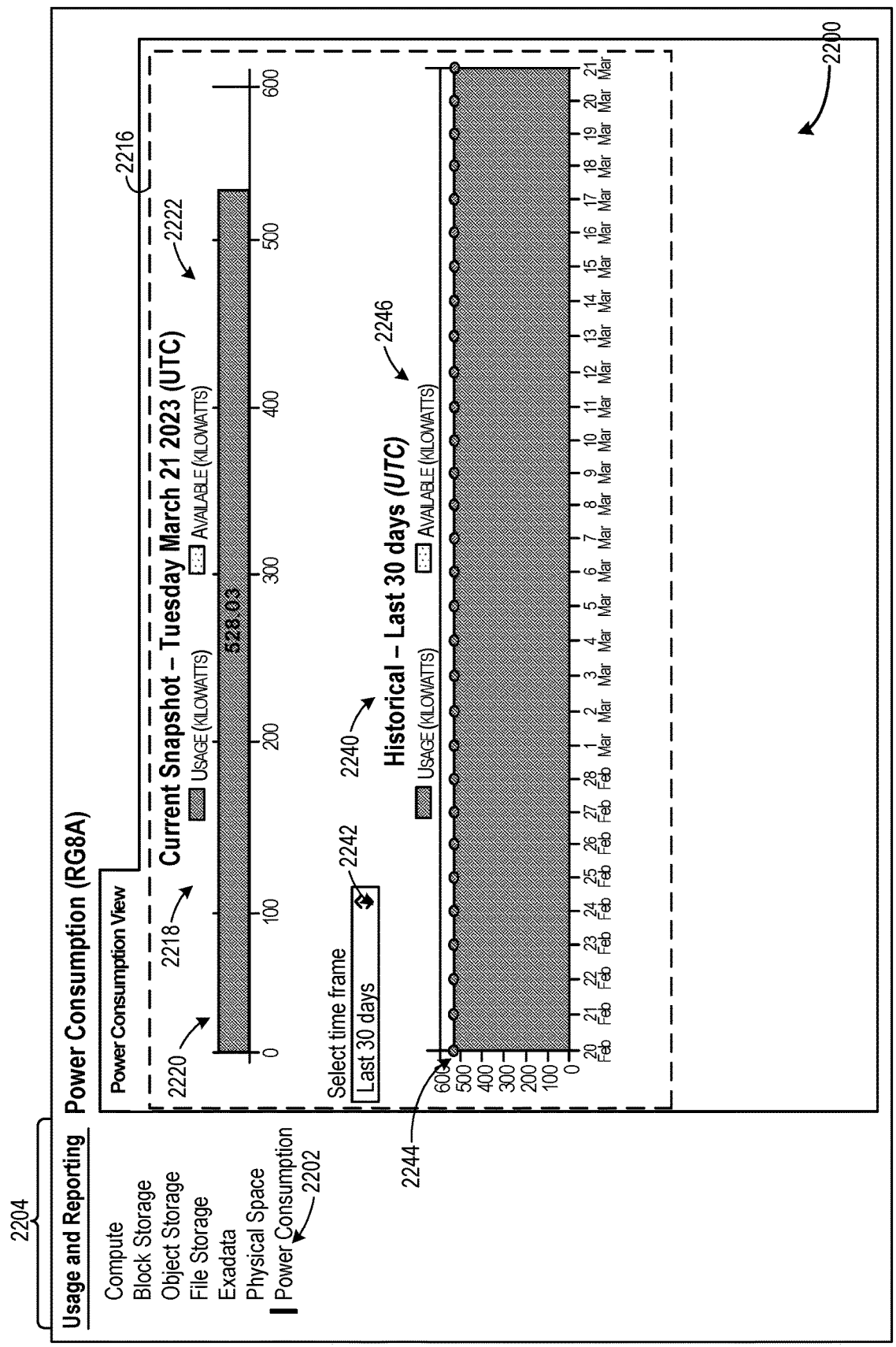
FIG. 22 is a block diagram depicting an exemplary user interface presenting power consumption details corresponding to a single region, according to at least one embodiment.

FIG. 22 is a block diagram depicting an exemplary user interface (e.g., user interface 2200, one of the user interface(s) 308 of FIG. 3) presenting power consumption details corresponding to a single region (e.g., "RG8A"), according to at least one embodiment. In some embodiments, user interface 2200 may represent a portion of user interface 1200, or the user interface 2200 may provide a interface separate from user interface 1200. As described above, a user may navigate to user interface 2200 by selecting, for example, option 1220 of FIG. 12. Selecting option 1220 may navigate the user to the power consumption view presented in FIG. 2200 as indicated at 2202 of navigational panel 2204, the contents of which may replace or update the contents of area 1204 of FIG. 12, or any suitable previously presented navigational panel, based on the navigational option selected.

Area 2216 may present current snapshot data 2218 indicating a number of units of power consumption (e.g., kilowatts) currently being used and a number of units of power consumption not currently being used (e.g., available power consumption). Snapshot data 2218 may include one or more bar graphs (e.g., bar graph 2220). The amounts indicated within bar graph 2220 of FIG. 22 indicates that 528.03 kilowatts of power is currently being consumed and that additional kilowatts are not available. The bar graph 2220 may be colorized such that the individual metrics depicted with bar graph 2220 may correspond with the colors presented in legend 2222. The current snapshot data may be differently formatted or presented in a different area of 2216 than depicted in FIG. 22 without departing from this disclosure.

The user interface 2200 may present historical data 2240. As depicted, and potentially by default, the historical data may represent historical data that is associated with a default time period (e.g., the last 30 days). However, option 2242 may be presented which, if utilized, enables the user to select different time frames (e.g., the last week, the last 24 hours, the last year, the last 6 months, etc.). In some embodiments, selection made via option 2242 may cause the historical data 2240 to be updated to correspond to the selection made.

In some embodiments, historical data 2240 may be presented in graph 2244, although the historical data 2240 may be differently presented, and in any suitable format. The graph 2244 may present a number of different sets of usage data. By way of example, the graph 2244 may be configured to present a number of kilowatts being consumed historically and a number of kilowatts that have been historically unconsumed (e.g., available). Each set of data may be colorized to distinguish the data sets from one another. The color (or other distinguishing feature) corresponding to each data set may be indicated within legend 2246 or in any suitable manner.

The data presented in user interface 2200 may be differently formatted and may include additional data or may lack some of the data shown in FIG. 22.

Figure 23:
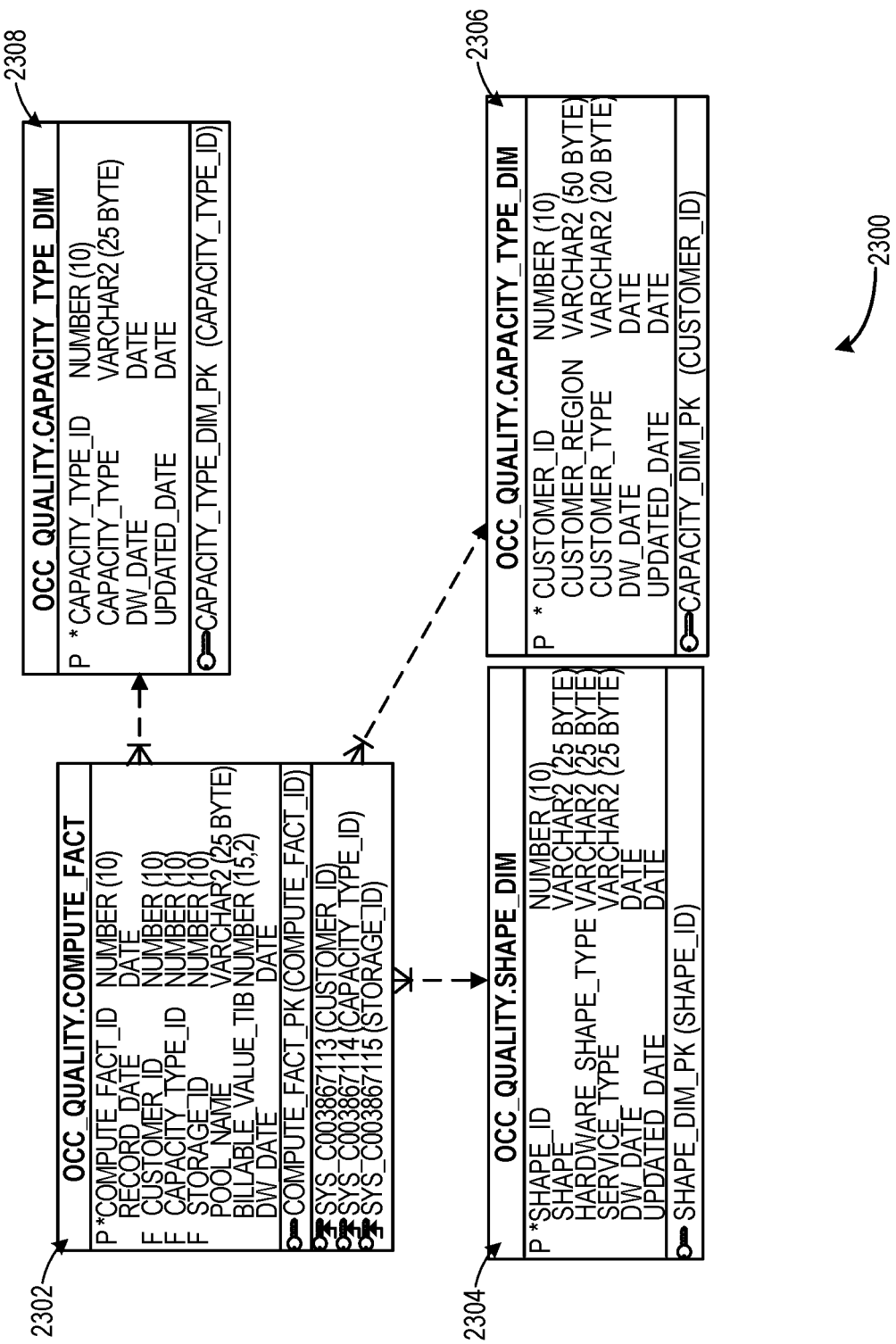
FIGS. 23-25 illustrate a number of example schemas, according to at least one embodiment.
Figure 24:
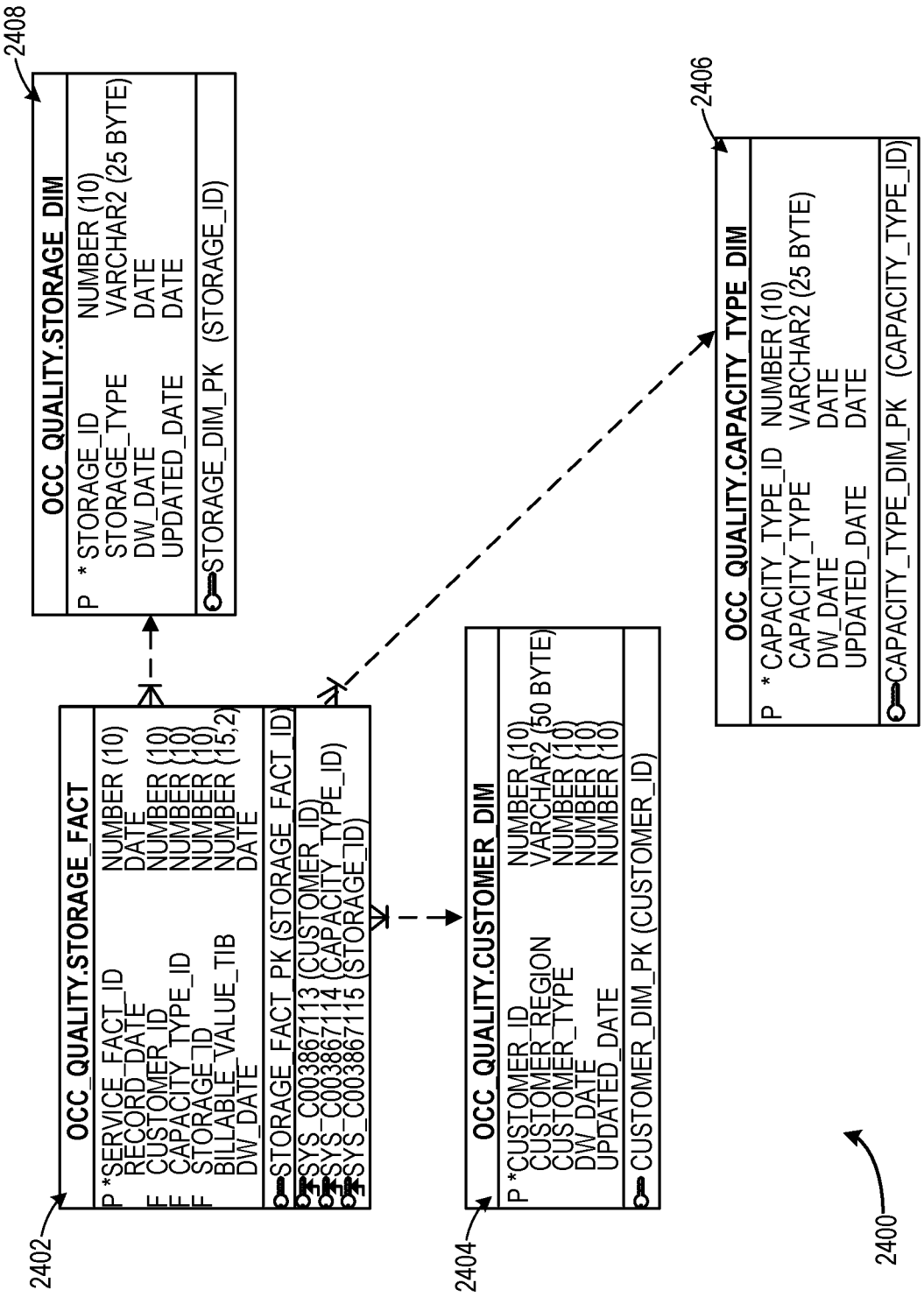
Figure 25:
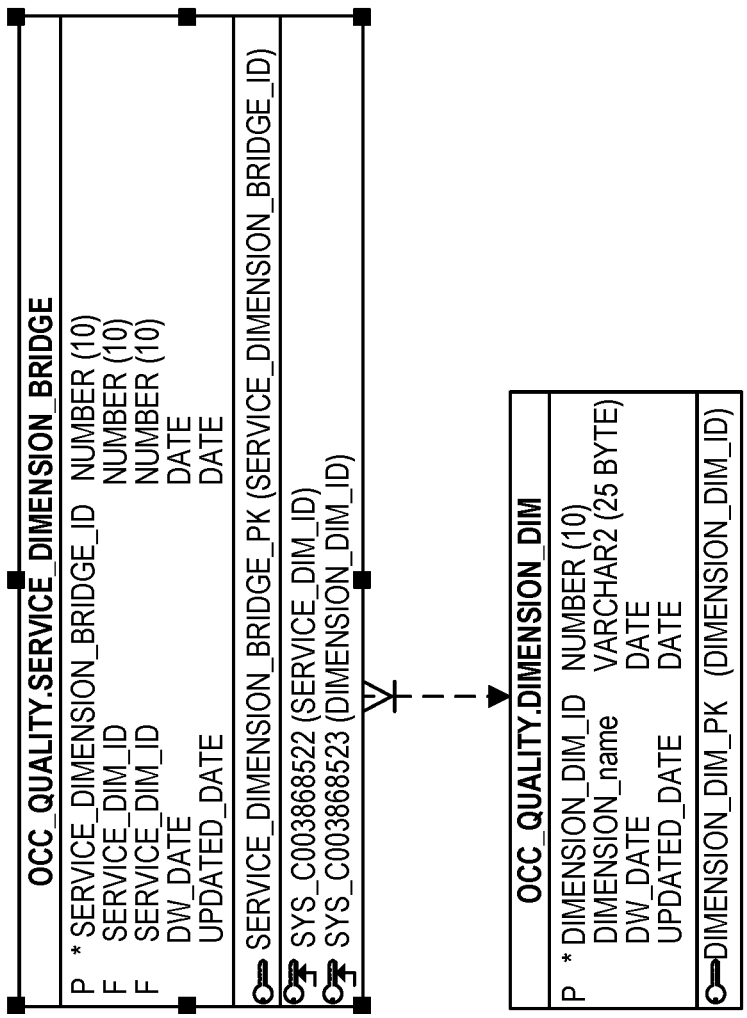

FIGS. 23-25 illustrate a number of example schemas, according to at least one embodiment.

FIG. 23 illustrates an entity relationship diagram 2300 for data represented by a number of schemas corresponding to a compute related service. A star schema pattern may be utilized. A star pattern refers to a schema that includes one or more fact tables referencing any suitable number of dimension tables. Entity relationship diagram 2300 may include fact table 2302 that includes a number of numeric values and keys that reference dimensional data stored in dimension tables 2304-2308. Dimension tables 2304-2308 may include data corresponding to storage shape data, customer data, and capacity type data, respectively. At least some of the data collected by the DRCC Horizon Service 120 of FIG. 1 (e.g., data corresponding to compute service 116) may be obtained and/or translated to data corresponding to data structures and/or records that conform to entity relationship diagram 2300. Using these structures/records, the data corresponding FIGS. 9 and 11-14 can be ascertained for the compute resources described in connection with those figures and presented at the corresponding user interfaces.

FIG. 24 illustrates an entity relationship diagram 2400 for data represented by a number of schemas from a variety of storage-related services (Block Storage, Object Storage, File System Storage). Entity relationship diagram 2400 may include fact table 2402 that includes a number of numeric values and keys that reference dimensional data stored in dimension tables 2404-2408. Dimension tables 2304-2308 may include data corresponding to storage shape data, customer data, and capacity type data, respectively. At least some of the data collected by the DRCC Horizon Service 120 of FIG. 1 (e.g., data corresponding to block storage service 114, object storage service 112, and file system service 110) may be obtained and/or translated to data corresponding to data structures and/or records that conform to entity relationship diagram 2300. Using these structures/records, the data corresponding FIGS. 9, 11, and 15-17 can be ascertained for the storage resources described in connection with those figures and presented at the corresponding user interfaces.

FIG. 25 illustrates an entity relationship diagram 2500 for service and dimension data represented by a number of schemas. SERVICE_DIM may be utilized to hold the data for all the services that may be reported on and DIMENSION_DIM may be utilized to hold the dimensions associated with each service. A Star Schema pattern may be utilized to maintain these records and their corresponding relationships. Using the data stored in these records and using their corresponding relationships, collected data may be processed to identify usage data such as a percentage and/or a number of resources utilized by services associated with the cloud provider. The results may be presented as described in the figures above.

FIG. 26 is a block diagram illustrating an exemplary method 2600 for obtaining capacity and usage data within a dedicated region cloud, according to at least one embodiment. The method 2600 may be performed by one or more components of the DRCC/PLC region 102. By way of example, the method 2600 may be performed by a computing device providing the OCC Service 124 of FIG. 1. The operations discussed in connection with method 2600 may be performed in any suitable order. Method 2600 may include more or fewer operations than the operations discussed in connection with FIG. 26.

Figure 27:
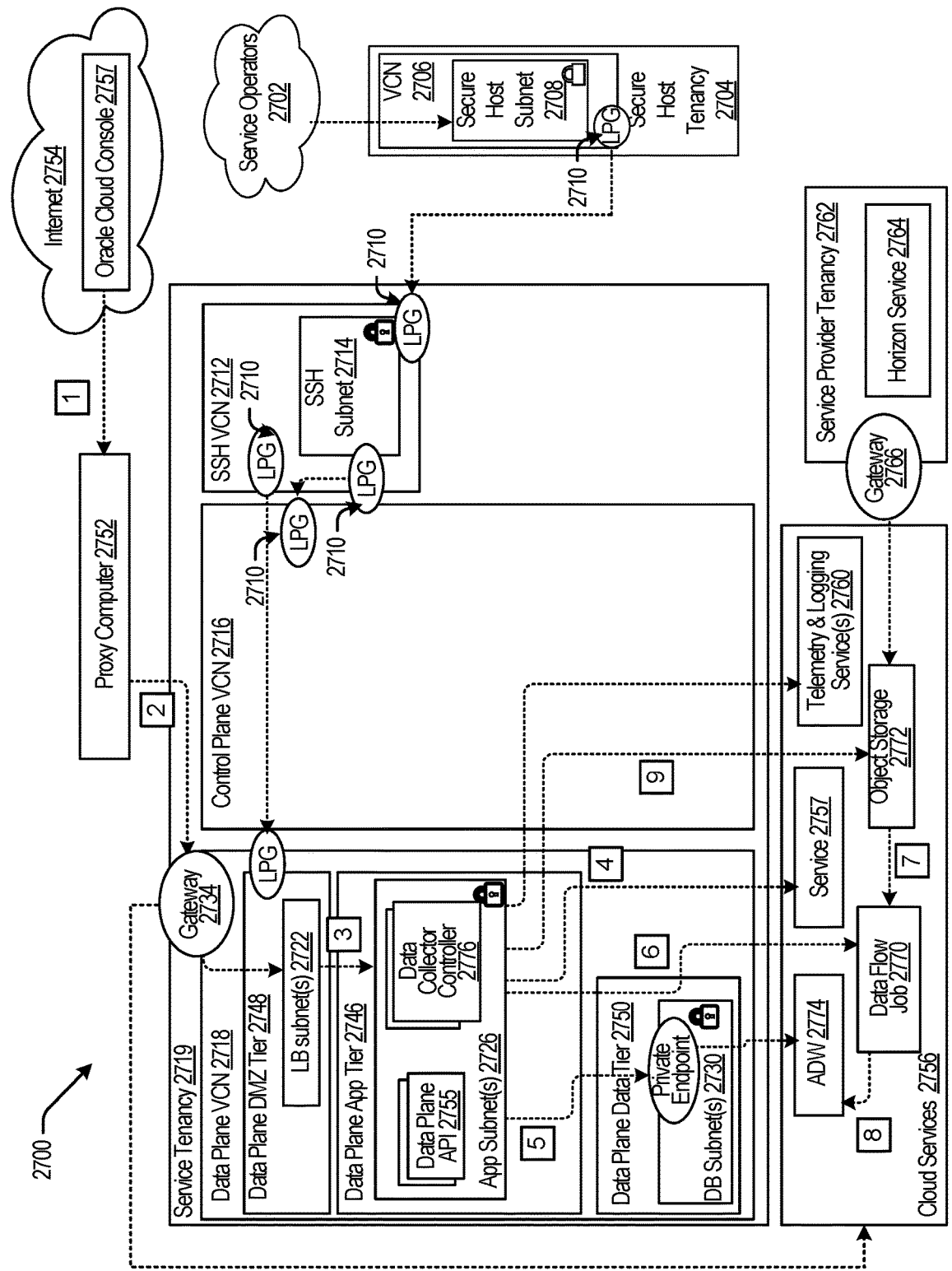
FIG. 27 is a block diagram illustrating a pattern for implementing a cloud infrastructure as a service system including a dedicated region operating as part of a DRCC, according to at least one embodiment.

The method 2600 may begin at 2602, where a dedicated region cloud (e.g., DRCC/PLC region 102 of FIG. 1) may be implemented, at least in part, by a computing device (e.g., a computing device of FIG. 27). In some embodiments, the dedicated region cloud may comprise a plurality of cloud infrastructure components providing corresponding cloud services associated with a cloud service provider (e.g., Oracle). The plurality of cloud infrastructure components being hosted by one or more computing devices located at a third-party location (e.g., the cloud owner's premises). In some embodiments, the third-party location may be associated with a third-party entity (e.g., the cloud owner) that is different from the cloud service provider (e.g., Oracle).

At 2604, capacity and usage data capacity and usage data associated with at least one of the plurality of cloud infrastructure components may be obtained. By way of example, capacity and usage data may include any suitable combination of data associated with compute resources, block storage, object storage, file storage, database resources, physical space (e.g., floor tiles), server resources/racks, network resources/racks, and/or power consumption. In some embodiments, the capacity and usage data presented at the user interface comprises physical space data (e.g, any suitable data presented via user interfaces 1900-2100 of FIGS. 19-21) indicating a number of units of physical space available for placing additional computing devices at the third-party location. In some embodiments, the capacity and usage data comprises first capacity and usage data corresponding to the third-party entity and second capacity and usage data corresponding to the cloud service provider. The user interface may be implemented based at least in part on a console plug-in that is installed with a preexisting dedicated region console (e.g., the DRCC OCC Console 128 of FIG. 1) of the dedicated region cloud. In some embodiments, the capacity and usage data may be initially obtained by a data processing service (e.g., DRCC Horizon Service 120 of FIG. 1). In some embodiments, the data processing service operates in a separate tenancy (e.g., service provider tenancy 2762 of FIG. 27) from a tenancy associated with the third-party entity.

At 2606, a control center service (e.g., the OCC Service 124) may be executed within the dedicated region cloud located at the third-party location. The control center service may process and present, at a user interface hosted within the dedicated region cloud (e.g., any suitable combination of the user interfaces 400-2200 of FIGS. 4-22), at least a portion of the capacity and usage data that is associated with the at least one of the plurality of cloud infrastructure components cloud.

At 2606, the capacity and usage data may be stored within a data store of the dedicated region cloud (e.g., ADW 126 of FIG. 1) for subsequent use. In some embodiments, storing the capacity and usage data within the data store of the dedicated region cloud causes the capacity and usage data to be obtained by one or more corresponding computing devices of a central cloud-computing environment hosted by the cloud service provider (e.g., by a computing device hosting the Central Horizon Service 121, a computing device hosting the object storage utilized for object storage import 130 of FIG. 1, etc.). In some embodiments, at least one of the one or more corresponding computing devices of the central cloud-computing environment presents the first capacity and usage data with additional capacity and usage data that was obtained from one or more additional dedicated region clouds that are individually associated with a respective third-party entity.

FIG. 27 is a block diagram 2700 illustrating an example pattern of an IaaS architecture (e.g., a DRCC architecture), according to at least one embodiment. Service operators 2702 can be communicatively coupled to a secure host tenancy 2704 that can include a virtual cloud network (VCN) 2706 and a secure host subnet 2708. In some examples, the service operators 2702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2706 and/or the Internet.

The VCN 2706 can include a local peering gateway (LPG) 2710 that can be communicatively coupled to a secure shell (SSH) VCN 2712 via an LPG 2710 contained in the SSH VCN 2712. The SSH VCN 2712 can include an SSH subnet 2714, and the SSH VCN 2712 can be communicatively coupled to a control plane VCN 2716 via the LPG 2710 contained in the control plane VCN 2716. Also, the SSH VCN 2712 can be communicatively coupled to a data plane VCN 2718 via an LPG 2710. The control plane VCN 2716 and the data plane VCN 2718 can be contained in a service tenancy 2719 that can be owned and/or operated by the IaaS provider.

The data plane VCN 2718 can include the data plane app tier 2746, a data plane DMZ tier 2748, and a data plane data tier 2750. The data plane DMZ tier 2748 can include LB subnet(s) 2722 that can be communicatively coupled to the app subnet(s) 2726 of the data plane app tier 2746 and the gateway 2734 of the data plane VCN 2718. The gateway 2734 may be an example of an Internet gateway, a service gateway, a NAT gateway, or the like. The data plane data tier 2750 can also include the DB subnet(s) 2730 that can be communicatively coupled to the app subnet(s) 2726 of the data plane app tier 2746.

The gateway 2734 of the data plane VCN 2718 can be communicatively coupled to a proxy computer 2752 (e.g., a Splat proxy) that can be communicatively coupled to public Internet 2754. Public Internet 2754 can be communicatively coupled to the gateway 2734 of the of the data plane VCN 2718. The gateway 2736 (e.g., a service gateway of gateway 2736) of the of the data plane VCN 2718 can be communicatively couple to cloud service(s) 2756. In some embodiments, cloud service(s) 2756 may operate within a DRCC on hardware provided by the customer. Cloud service(s) 2756 may include any suitable service such as ADW 2774 (an example of ADW 126 of FIG. 1), Service 2757 (an example of one of the service(s) 118 of FIG. 1), object storage 2772 (an example of object storage managed by object storage service 112 of FIG. 1), telemetry and logging service(s) 2760 (an example of the service(s) 118 of FIG. 1), although any suitable service, including those discussed in connection with FIG. 1 may be included in cloud service(s) 2756. Data flow job (e.g., an example of spark job 214 of FIG. 2) may be configured to pull collected data from object storage (e.g., from Object Storage Bucket (Horizon Bucket) 122 of FIG. 2) and transform and/or write the data to ADW (e.g., ADW 126 of FIGS. 1 and 2).

A service provider tenancy 2762 may contain Horizon Service 2764 (an example of Horizon Service of FIGS. 1 and 2) that may be communicatively connected via gateway 2766 with cloud service(s) 2756. As discussed above, Horizon Service 2764 may be configured to perform data collection operations to obtain any suitable operational data of the DRCC such as any suitable data related to capacity management, expansion management, health and performance tracking, change management, and the like. As a non-limiting example, the Horizon Service 2764 may be configured to obtain capacity and usage data such as a number of CPUs, a total amount and used amount of block storage, a total amount and used amount of object storage, a total amount and used amount of file storage, and the like, or any suitable data presented in FIGS. 4-22. In some embodiments, this may include interacting with one or more of cloud service(s) 2756. Horizon Service 2764 may be configured to store any suitable data discussed above within a dedicated bucket (e.g., a Horizon bucket) within object storage 2772 (e.g., object storage bucket (horizon bucket) 122 of FIG. 1).

In some examples, the gateway 2734 (e.g., a service gateway) of the data plane VCN 2718 can make application programming interface (API) calls (e.g., using data plane API 2755) to cloud service(s) 2756 without going through public Internet 2754. The API calls to cloud service(s) 2756 from the gateway 2734 can be one-way: the gateway 2734 can make API calls (e.g., using data plane API 2755) to cloud service(s) 2756, and cloud service(s) 2756 can send requested data to the gateway 2734. But, cloud service(s) 2756 may not initiate API calls to the service gateway 2736.

In some examples, the secure host tenancy 2704 can be directly connected to the service tenancy 2719, which may be otherwise isolated. The secure host subnet 2708 can communicate with the SSH subnet 2714 through an LPG 2710 that may enable two-way communication over an otherwise isolated system. Connecting the secure host subnet 2708 to the SSH subnet 2714 may give the secure host subnet 2708 access to other entities within the service tenancy 2719.

In some examples, users of the system, or customers, can make requests, for example create, read, update, or delete (CRUD) operations, through public Internet 2754 (e.g., using a user interface provided by Oracle Cloud Console 2757) that can communicate the requests to the proxy computer 2752. The proxy computer 2752 can communicate the request to the data plane VCN 2718 through the gateway 2734. The request can be received by the LB subnet(s) 2722 contained in the data plane DMZ tier 2748. The LB subnet(s) 2722 may determine that the request is valid, and in response to this determination, the LB subnet(s) 2722 can transmit the request to app subnet(s) 2726 contained in the data plane app tier 2724. If the request is validated and requires a call to Internet 2754, the call to Internet 2754 may be transmitted to the gateway 2734 (e.g., a NAT gateway of gateway 2734) that can make the call to Internet 2754. Memory that may be desired to be stored by the request can be stored in the DB subnet(s) 2730.

In some embodiments, the control plane VCN 2716 and the data plane VCN 2718 can be contained in the service tenancy 2719. In this case, the user, or the customer, of the system may not own or operate either the control plane VCN 2716 or the data plane VCN 2718. Instead, the IaaS provider may own or operate the control plane VCN 2716 and the data plane VCN 2718, both of which may be contained in the service tenancy 2719. In some embodiments, the hardware that implements the service tenancy 2719 may be owned by the customer, but managed by the IaaS provider. In some embodiments, the isolation of these networks (VCNs) may enable allow users or customers of the system to store databases privately without needing to rely on Internet 2754, which may not have a desired level of threat prevention, for storage.

In other embodiments, the LB subnet(s) 2722 contained in the control plane VCN 2716 can be configured to receive a signal from the gateway 1034. In this embodiment, the data plane VCN 1018 may be configured to be called by a customer of the IaaS provider without calling Internet 2754. Customers of the IaaS provider may desire this embodiment since database(s) that the customers use may be controlled by the IaaS provider and may be stored on the service tenancy 2719, which may be isolated from Internet 2754.

In some embodiments, the following operations may be performed. At step 1, Oracle Cloud Console 2757 sends an HTTPS request to proxy computer 2752. Proxy computer 2752 may be configured to perform authentication and/or authorization operations. At step 2, Proxy computer 2752 may forward the request to LB subnet(s) 2722 via HTTPS. At step 3, a load balancer of LB subnet(s) 2722 forward the request to one of the OCC data plane via HTTPS/mTLS. At step 4, the proxy computer 2752 may perform authentication handled via mTLS with certificates loaded from service 2757. At step 5, data from ADW 2774 is read and returned to the caller.

In some embodiments, a timer (e.g., a daily timer) may elapse to start data flow job 2770 (an example of spark job 214 of FIG. 2). At step 7, the data flow job 2770 may pull data from object storage 2772 from a bucket owned and operated by the service provider associated with service provider tenancy 2762. At step 8, the data flow job may process and store the retrieved data in ADW 2774 (an example of the ADW 216 of FIG. 1). At step 9, a zipfile with spark jobs may be loaded to object storage 2772. Data collector controller 2776 may load a file (e.g., a zipfile) with spark jobs to object storage 2772. Data flow job 2770 may be configured to consume code from there.

While not depicted, the IaaS/DRCC architecture may be hosted by a number of racks. By way of example, the architecture may utilize a 12-rack base footprint, or at least fewer racks than the number utilized in a typical public cloud. In some embodiments, the cloud service(s) 2756 may be hosted on a fewer number of racks as utilized for cloud service(s) within a public cloud. In some embodiments, the public cloud may utilize 21 racks for a service enclave, while the IaaS/DRCC of FIG. 27 may utilize four. While the public cloud may utilize 12 racks for a customer enclave, the IaaS/DRCC of FIG. 27 may utilize five racks. As another example, while the public cloud may utilize 12 racks for networking, the IaaS/DRCC of FIG. 27 may utilize three racks. The IaaS/DRCC architecture may, like the public cloud, maintain separation between service enclave, customer enclave and network racks. This may allow for the highest density of cores in both substrate and overlay networks. In some embodiments, the hardware utilize to host the IaaS/DRCC may be configured by the service provider and placed on-premises at the customer's location.

Figure 28:
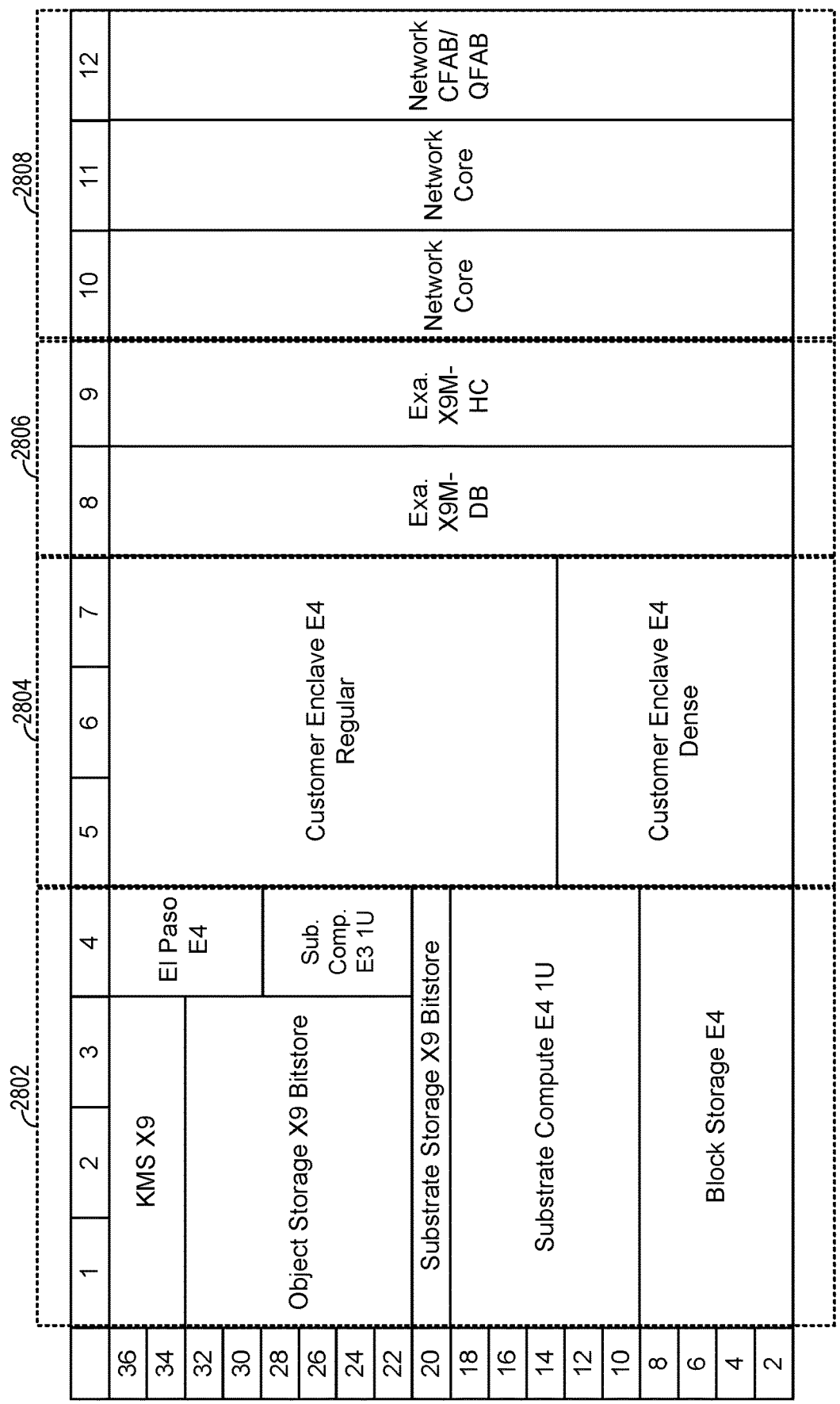
FIG. 28 illustrates a high-level structure of an exemplary 12 rack base footprint on which an IaaS/DRCC architecture is hosted.

FIG. 28 illustrates a high-level structure of an exemplary 12 rack base footprint on which an IaaS/DRCC architecture (e.g., the IaaS/DRCC architecture of FIG. 27) is hosted. Each of the 12 racks may configured to hold 18 servers. 6 servers may be utilized to provide key management service and configured according to a predefined X9 configuration. These 6 servers may be spread over three racks (e.g., racks 1-3) for fault tolerance. 18 servers may be utilized to provide object storage resources according to a X9 bit store configuration. These 18 servers may be spread over three racks (e.g., racks 1-3) for fault tolerance as depicted in FIG. 28 and may be utilized to provide 1818 TiB of capacity. 4 servers, over four racks (e.g., racks 1-4) may be utilized to provide substrate storage according to a X9 bit store configuration and may be utilized to provide 288 virtual CPU and 864 TiB of capacity. 45 servers, spread over four racks (e.g., racks 1-4) may be utilized to provide substrate compute resources according to an E4 platform, using 1 U servers. These 45 servers may be used to provide 11520 virtual CPU and 1080 TiB of non-volatile memory express (NVMe) capacity. 4 servers of a single racks (e.g., rack 4) may be utilized to provide substrate compute resources according to an E3 platform, using 1 U servers. 8 servers of a single racks (e.g., rack 4) may be utilized to provide additional substrate compute resources according to an El Paso, E4 platform. 16 servers, spread over four racks (e.g., racks 1-4) may be utilized to provide block storage resources according to an E4 platform. These servers may be utilized to provide 1280 TiB of capacity. 36 servers, spread over 3 racks (e.g., racks 5-7) may be utilized to provide a customer enclave according to a E4, regular platform (e.g., using standard AMD processors) to provide 4608 OCPU of compute capacity. 18 servers, spread over 3 racks (e.g., racks 5-7) may be utilized to provide a customer enclave according to a E4, dense platform (e.g., using E4 AMD dense processors), to provide 2304 OCPU of compute capacity. 18 servers of a single rack (e.g., rack 8) may be utilized to host Exadata X9M database (DB) nodes (e.g., 18 nodes). Another 18 servers of another rack (e.g., rack 9) may be utilized to hose Exadata X9M high capacity (HC) nodes (e.g., 15 HC nodes). Racks 10 and 11 and the corresponding 36 servers may be utilized for network core resources (e.g., to provide 32-128 standard racks). Rack 12 and its 36 servers may be utilized to provide Network CFAB/QFAB as discussed in connection with FIG. 31.

As depicted, a service enclave 2802 may be implemented using the servers of racks 1-4, a customer service enclave 2804 may be implemented using the servers of racks 5-7, Exadata resources may be implemented using the servers of racks 8 and 9, and networking resources may be implemented using the servers of racks 10-12.

Figure 29:
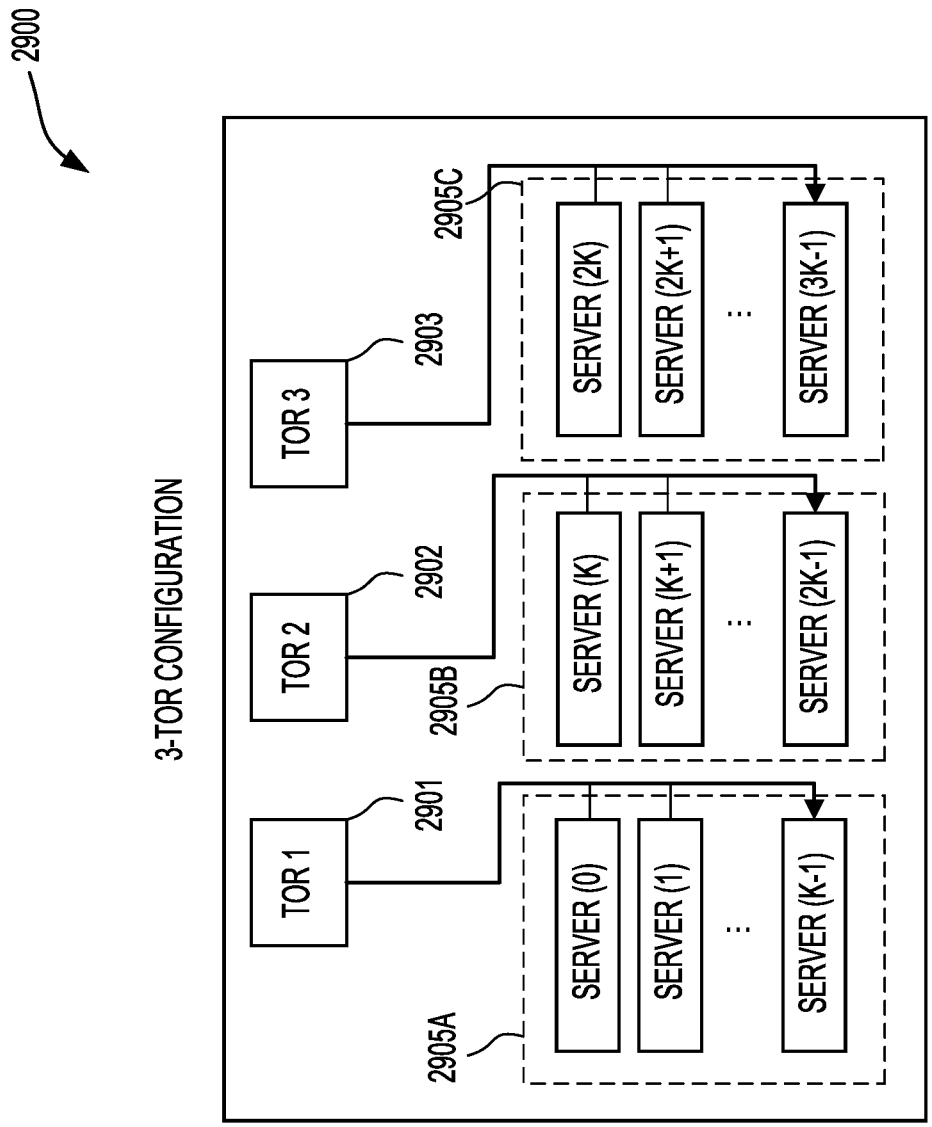
FIG. 29 depicts a configuration of a plurality of TORs included in a rack, according to at least one embodiment.

FIG. 29 depicts a configuration of a plurality of TORs included in a rack, according to at least one embodiment. The configuration 2900 of a plurality of TORs depicted in FIG. 29 corresponds to a 3-TOR configuration. A rack includes the three TORs (2901, 2902, and 2903), and a plurality of host machines/servers. In one implementation, a fault domain is created within the availability domain (i.e., the rack) by selecting a subset of host machines from the plurality of host machines. Each host machine in the group of selected host machines (i.e., the subset of host machines) is communicatively coupled to one of the TORs included in the plurality of TORs. For instance, as shown in FIG. 29, a first subset of host machines from the plurality of host machines is depicted as 2905A. Each host machine/server included in 2905A is communicatively coupled to a first TOR i.e., TOR 1, 2901. Thus, the combination of the first subset of host machines (2905A) and the first TOR (2901) form a first fault domain.

A second fault domain is created within the availability domain by selecting a second subset of host machines from the plurality of host machines. Each host machine in the second subset of host machines is communicatively coupled to another TORs (i.e., different from TOR associated with the first fault domain) included in the plurality of TORs. It is noted that the first subset of host machines is disjoint from the second subset of host machines. For example, as shown in FIG. 29, a second subset of host machines from the plurality of host machines is depicted as 2905B. Each host machine/server included in 2905B is communicatively coupled to a second TOR i.e., TOR 2, 2902.

In a similar fashion, a third fault domain may be created within the availability domain by selecting a third subset of host machines from the plurality of host machines. Each host machine in the third subset of host machines is communicatively coupled to another TORs (i.e., different from TORs associated with the first fault domain and the second fault domain). It is noted that the third subset of host machines is disjoint from the first subset of host machines as well as the second subset of host machines. For example, as shown in FIG. 29, the third subset of host machines from the plurality of host machines is depicted as 2905C. Each host machine/server included in 2905C is communicatively coupled to a third TOR i.e., TOR 3, 2903 to form the third fault domain.

Each of the first, second, and third subset of servers (2905A, 2905B, and 2905C) is depicted in FIG. 29 to include K servers. It is appreciated that this is in no way limiting the scope of the present disclosure. A particular subset of servers may have a different number of servers included in it as compared to another subset of servers. Further, the rack includes a plurality of network virtualization devices (NVDs). A first subset of NVDs from the plurality of NVDs is employed to connect the first subset of servers/host machines to the first TOR. In a similar manner, a second subset of NVDs from the plurality of NVDs is employed to connect the second subset of servers/host machines to the second TOR, and a third subset of NVDs is employed to connect the third subset of servers/host machines to the third TOR.

Further, for each fault domain (i.e., combination of a subset of servers and a TOR switch associated with the subset of servers), a set of addresses corresponding to host machines/servers included in the first subset of host machines/servers are associated with the TOR switch associated with the first subset of servers. In this manner, a control plane is configured to forward a packet destined for a particular server included in a first subset of servers to the first TOR that is associated with the first subset of servers.

Thus, the configuration of the rack as depicted in FIG. 29 provides for three distinct fault domains, which provide a blast radius (i.e., percentage of capacity loss upon a TOR switch being failed) that is smaller than the case of having all servers within a rack being communicatively coupled to a single TOR switch. Specifically, the configuration of the rack as depicted in FIG. 29 incurs a blast radius of 33% i.e., we have a 33% capacity loss upon the failure of a single TOR. It is noted however that the probability of having multiple TORs fail at the same time within a rack is very low i.e., negligible. In one implementation, the rack configuration of FIG. 29 provides one or more fault domains that may be presented to a customer. Upon obtaining a request from the customer requesting allocation of one or more host machines in the rack, the control plane may assign the one or more host machines included in the one or more fault domains based on certain criterion. For example, if high availability is requested by the customer, the control plane may allocate host machines that are in different fault domains.

Figure 30:
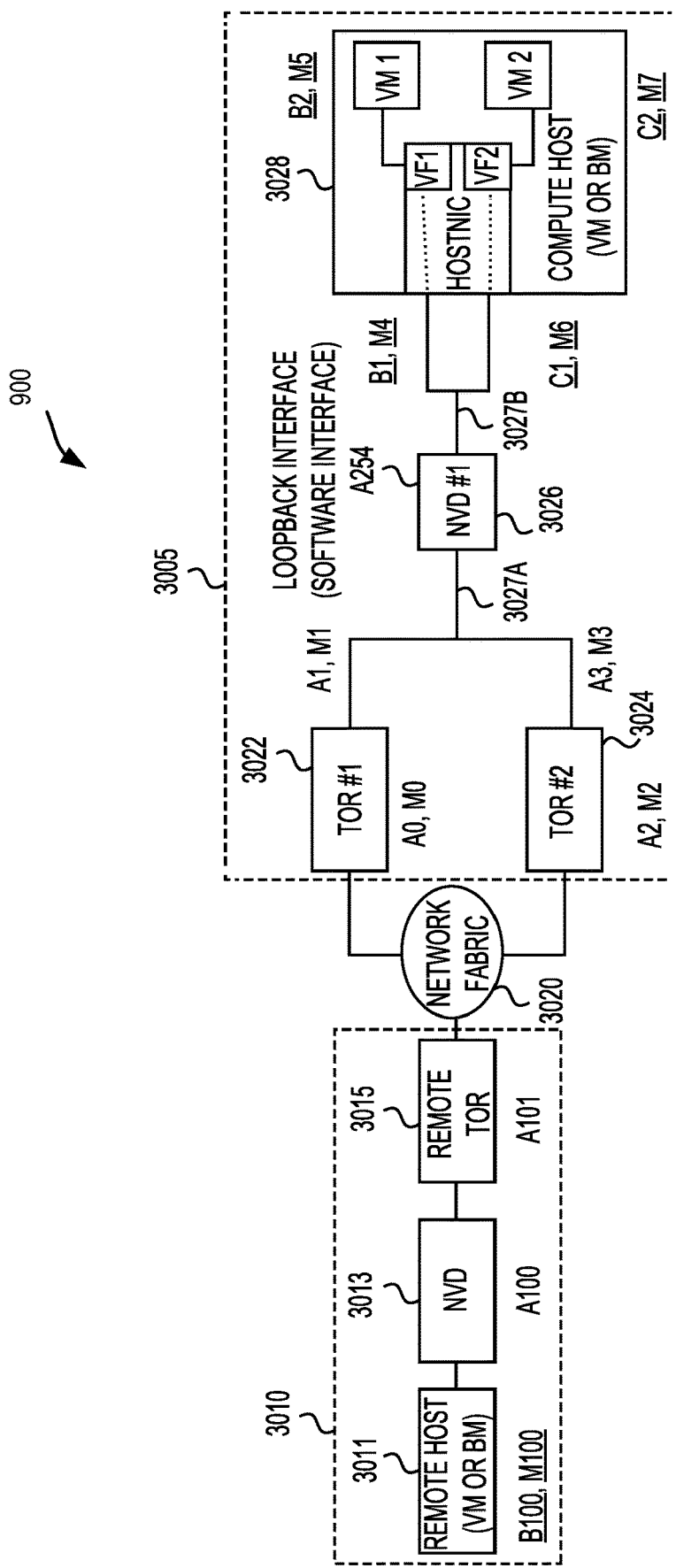
FIG. 30 depicts an exemplary infrastructure of a DRCC according to some embodiments.

Turning now to FIG. 30, there is depicted an exemplary architecture 3000 of a DRCC framework that brings to customers, the full capabilities of a public cloud. As such, customers can reduce infrastructure and operational costs, upgrade legacy applications on modern cloud services, and meet the most demanding regulatory, data residency, and latency requirements.

According to some embodiments, FIG. 30 depicts a datacenter 3005 (of which DRCC/PLC(s) 104 of FIG. 1 are an example) that includes a pair of TORs i.e., TOR #1 3022 and TOR #2 3024, a network virtualization platform e.g., NVD 3026, and a compute host 3028 (also referred to herein as a local compute host). It is appreciated that the compute host 3028 includes a plurality of virtual machines or bare metal instances. The NVD 3026 is referred to herein as a local NVD. The compute host 3028 includes a host network interface card (i.e., host NIC). For sake of illustration, FIG. 30 depicts the compute host 3028 as comprising two virtual machines i.e., VM1 and VM2, respectively. It is noted that each of the VMs is communicatively coupled to the host NIC via one of the logical interfaces (e.g., logical interfaces depicted as PF1 and PF2, respectively). Furthermore, it is noted that the local NVD 3026 may be disposed on the same chassis as the host NIC included in the compute host 3028.

The compute host 3028 included in the datacenter may be coupled to another host machine 3011 that is referred to herein as a remote host machine. It is appreciated that the remote host machine can be 'any' host machine such as: (i) another host inside the DRCC and which is located behind another NVD, or (ii) another host in another DRCC (e.g., in a group of DRCCs meant for the same customer/organization) and located behind another NVD (e.g., in a group of DRCCs meant for the same customer/organization), or (iii) a host machine included in a customer's on-premise network. It is noted that in the case of having the host machine included in the customer's on-premise network, the host machine may connect to the DRCC via a Fast-Connect or IPSec VPN tunnel and use a dynamic routing gateway (DRG) to connect to a host machine in the DRCC. For sake of illustration, in the following description, it is assumed that the remote host machine (e.g., host machine 3011) is one which is included in the DRCC and located behind another NVD (e.g., NVD 3013 and served by a remote TOR 3015). However, it is noted that the features described below are equally applicable to the other cases of the remote host machines outlined above. Moreover, it is appreciated that in this case (and as shown in FIG. 30), the two host machines (i.e., local host machine 3028 and remote host machine 3011) may be coupled via a network fabric 3020). Further, for sake of convenience, the NVD 3013 is referred to herein as a remote NVD.

According to some embodiments, the local NVD 3026 has multiple physical ports. For instance, in one implementation as shown in FIG. 30, the local NVD 3026 has two physical ports—a first physical port 3027A (referred to herein as a TOR facing port) that is connected to the TORs 3022 and 3024 respectively, and a second physical port 3027B (referred to herein as a host facing port) that is connected to the compute host 3028. Each physical port of the local NVD 3026 may be divided into multiple logical ports. For instance, as shown in FIG. 30, the physical port 3027B is divided into two logical ports on the host facing side, and the physical port 3027A is divided into two logical ports on the TORs facing side.

Dividing each of the physical ports of the local NVD 3026, provides for each of the physical ports of the NVD 3026 the flexibility to be represented by two logical ports, two MAC addresses, and two IP addresses. For example, in FIG. 30, overlay IP addresses and overlay MAC addresses are denoted by an underlined symbol (e.g., B1, M1), whereas substrate IP and MAC addresses are denoted without the underline symbol (e.g., A0, M0). As shown in FIG. 30, the first physical port 3027A of the local NVD 3026 is associated with a first IP address (A1), a second IP address (A3), a first MAC address (M1), and a second MAC address (M3). The second physical port 3027B of the local NVD 3026 is associated with a first overlay IP address (B1), a second overlay IP address (C1), a first overlay MAC address (M4), and a second overlay MAC address (M6).

It is appreciated that a limit on the number of logical ports that can be obtained by dividing the physical port (e.g., port 3027A) of the NVD 3026 is dependent on a width of a serializer/de-serializer component (i.e., SerDes component) that is included in the NVD chipset. In one instance, each physical port of the NVD 3026 may be bifurcated into four logical ports. It is appreciated that a higher number of logical ports may be obtained for each physical port of the NVD 3026 via the utilization of a gearbox component in the NVD. The datacenter 3005 (i.e., DRCC) brings the full capabilities of the public cloud to customers. Specifically, the DRCC hosts applications and data that require strict data residency, control, and security, and provide a means for data to remain in specific locations for low-latency connectivity and data-intensive processing. Accordingly, customers can avail all cloud services running directly in their own data centers, as opposed to a cloud region that is hundreds or thousands of miles away. Thus, the DRCC with a smaller footprint (e.g., DRCC/PLC(s) 104 of FIG. 1) provides organizations an opportunity to run workloads outside the public cloud.

Figure 31:
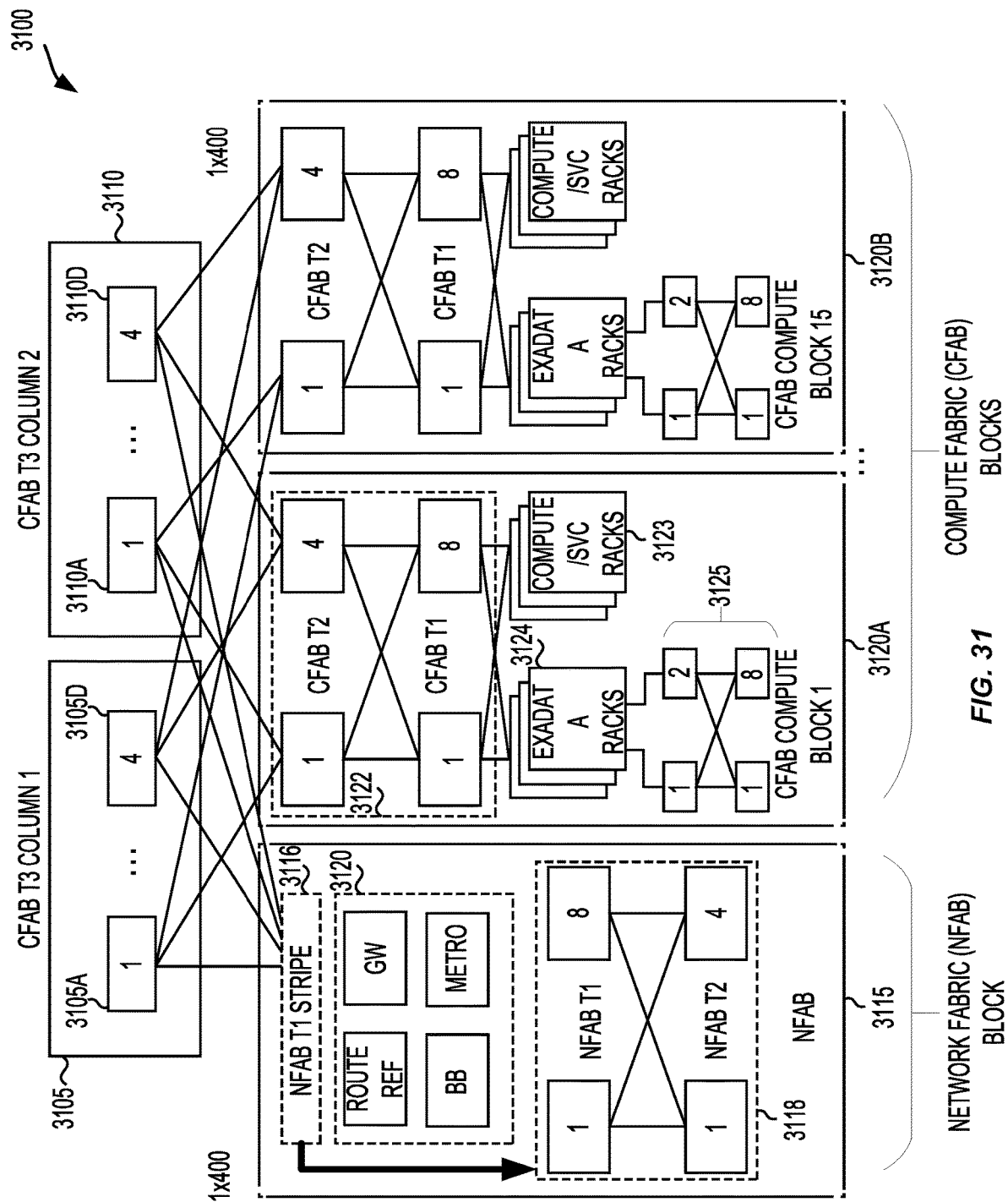
FIG. 31 depicts an exemplary network fabric architecture of a DRCC according to some embodiments.

FIG. 31 depicts an exemplary network fabric architecture of a DRCC according to some embodiments. The network fabric architecture 3100 for the DRCC includes a combination of compute fabric blocks (referred to herein as CFABs, 3120A-3120B) and a network fabric block (referred to herein as NFAB, 3115). The NFAB 3115 is communicatively coupled to each of the CFAB blocks (3120A-3120B) via a plurality of blocks of switches (3105, 3110). The plurality of blocks of switches is also referred to the herein as Tier 3 (T3) level switches. Each plurality of blocks of switches includes a predetermined number of switches e.g., four switches. For example, the block of switches 3105 includes four switches labeled 3105A-3105D, and the block of switches 3110 includes four switches labeled 3110A-3110D.

According to some embodiments, a compute fabric block (e.g., CFAB block 3120A) is communicatively coupled to the plurality of blocks of switches 3105, 3110. The compute fabric block 3120A includes a set of one or more racks, e.g., Exadata racks 3124 or compute racks 3123. Each rack in the set of one or more racks comprises one or more servers configured to execute one or more workloads of a customer. It is appreciated that each Exadata rack 3124 may be associated with a cluster network of virtual machines 3125. The CFAB block 3120A further includes a first plurality of switches 3122 organized into a first plurality of levels (e.g., levels labeled CFAB T1 and CFAB T2). The first plurality of switches 3122 communicatively couples the set of one or more racks (e.g., rack 3123, 3124) to the plurality of blocks of switches (3105, 3110). Specifically, the first plurality of levels associated with the first plurality of switches 3122 in the compute fabric block 3120A includes: (i) a first tier-one level of switches i.e., CFAB T1, and (ii) a first tier-two level of switches i.e., CFAB T2.

The first tier-one level of switches are communicatively coupled at a first end to the set of one or more racks and are communicatively coupled at a second end to the first tier-two level of switches. In turn, the first tier-two level of switches i.e., CFAB T2, connects the first tier-one level of switches i.e., CFAB T1, to the plurality of blocks of switches 3105, 3110. In one implementation, the first tier-one level of switches (CFAB T1) in the compute fabric block includes eight switches, and the first tier-two level of switches (CFAB T2) in the compute fabric block includes four switches. Each switch in the first tier-one level of switches in the compute fabric block is connected to each switch in the first tier-two level of switches in the compute fabric block. In turn, each switch in the first tier-two level of switches (CFAB T2) in the compute fabric block is connected to at least one switch in each block of the plurality of blocks of switches 3105, 3110.

According to some embodiments, the NFAB block 3115 is communicatively coupled to the plurality of blocks of switches 3105, 3110. The network fabric block 3115 includes: (i) one or more edge devices 3120, and (ii) a second plurality of switches 3118 that are organized into a second plurality of levels. The one or more edge devices 3120 includes a first edge device that provides connectivity to a first external resource. For example, the first external resource may be a public communication network, e.g., Internet, and the first edge device may be a gateway that provides connectivity to the public communication network. The one or more edge devices 3120 may include a gateway, a backbone edge device, a metro edge device, and a route reflector. Accordingly, the first edge devices e.g., gateway, enables access to the first external resource (e.g., Internet) to a workload that is executed by a server included in a rack in the set of one or more racks included in the CFAB block 3120A.

The second plurality of switches 3118 that are organized into a second plurality of levels (labeled NFAB T1 and NFAB T2) communicatively couple the one or more edge devices 3120 to the plurality of blocks of switches 3105, 3110. The connections between the plurality of blocks of switches and the second plurality of switches 3118 is depicted as a logical construct 3116 (NFAB T1 stripe) in FIG. 31. The detailed connections of the logical construct 3116 are described later with reference to FIG. 32. According to some embodiments, the second plurality of levels associated with the second plurality of switches 3118 in the network fabric block 3115 includes: (i) a second tier-one level of switches i.e., NFAB T1, and (ii) a second tier-two level of switches i.e., NFAB T2. Each switch in the second tier-two level of switches is communicatively coupled to each switch included in the second tier-one level of switches i.e., NFAB T1. In one implementation, the second tier-one level of switches in the network fabric block include eight switches, and the second tier-two level of switches in the network fabric block include four switches.

According to some embodiments, an initial deployment of the DRCC network architecture includes deploying the NFAB block (3115), one CFAB block (3120A), and the T3 switch layer (i.e., the plurality of blocks of switches 3105, 3110) that interconnects the NFAB to the CFAB. It is appreciated that additional CFAB blocks (as well as additional T3 layer switch blocks) may be deployed on the fly (i.e., in real time) based on customer demands. It is appreciated that the number of switches described above with reference to the first tier-one level of switches or the second tier-one level of switches in the network fabric (e.g., eight switches) are for illustrative purposes only. The number of switches included in the first tier-one level, or the second tier-one level may be any other number of switches such as four or sixteen or a variable number of switches. In a similar manner, the second tier-two level of switches in the network fabric block as described above includes four switches. However, it is appreciated that this is for illustrative purposes only and that the actual number of switched in this level may be a variable number of switches e.g., half of the number of switches at Tier-1.

Figure 32:
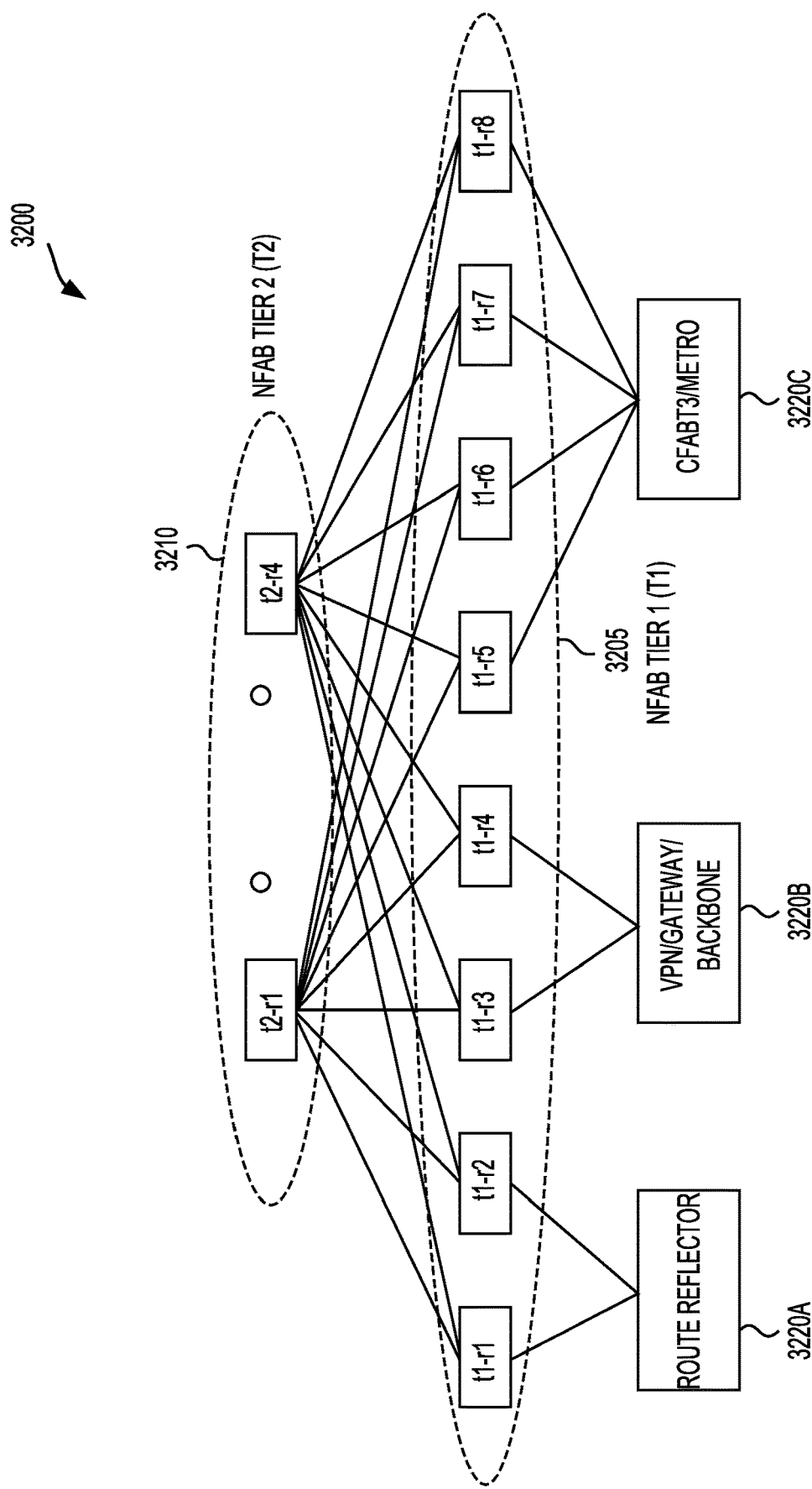
FIG. 32 illustrates connections between the NFAB block and a plurality of blocks of switches as well as connections within the NFAB block according to some embodiments.

FIG. 32 illustrates connections between the NFAB block and the plurality of blocks of switches, as well as connections within the NFAB block i.e., between the second plurality of switches that are organized into the second plurality of levels in the NFAB. The second plurality of levels associated with the second plurality of switches in the NFAB includes: (i) a second tier-one level of switches (i.e., NFAB Tier 1, 3205) and (ii) a second tier-two level of switches (i.e., NFAB Tier 2, 3210). In one example, the second tier-one level of switches in the NFAB includes eight switches (labeled in FIG. 32 as t1-r1 to t1-r8), and the second tier-two level of switches in the network fabric block include four switches (labeled in FIG. 32 as t2-r1 to t2-r4).

As shown in FIG. 32, a first subset of switches included in the second tier-one level of switches (i.e., NFAB Tier 1) are communicatively coupled, at a first end, to the one or more edge devices. For instance, as shown in FIG. 32, switches t1-r1, t1-r2, t1-r3, t1-r4 are coupled to route reflector 3220A and VPN gateway 3220, respectively. Further, a second subset of switches included in the second tier-one level of switches (e.g., switches t1-r5, t1-r6, t1-r7, and t1-r8) are communicatively coupled, at the first end, to the plurality of blocks of switches (i.e., labeled in FIG. 32 as CFAB Tier 3). It is noted that the second subset of switches may also be coupled with WDM metro switch i.e., a switch used for interconnecting racks situated in different buildings. The first subset and the second subset of switches included in the second tier-one level of switches are coupled, at a second end, to the second tier-two level of switches included in the network fabric block.

Specifically, in order to provide connectivity between switches of the T1 layer 3205, a T2 layer of switches (e.g., four switches) 3210 is employed in the NFAB. As shown, each of the four switches included in the T2 layer switches of the NFAB connects to each T1 layer switch. In this manner, service enclaves included in the different CFAB blocks are communicatively coupled to edge devices via the NFAB fabric. Thus, a workload executed by a server included in a rack of the compute fabric block accesses the first external resource (e.g., Internet) by establishing a connection to a first switch in the plurality of blocks of switches. Referring to FIG. 32, this connection is further routed as follows: (i) from the first switch to a second switch included in the second subset of switches in the second tier-one level of switches (e.g., switches t1-r5, t1-r6, t1-r7, and t1-r8), (ii) from the second switch to a third switch included in the second tier-two level of switches (e.g., one of the switches from the group of switches t1-r1, t1-r2, t1-r3, t1-r4), (iii) from the third switch to a fourth switch included in the first subset of switches in the second tier-one level of switches (e.g., switches t1-r1, t1-r2, t1-r3, and t1-r4), and (iv) from the fourth switch to a gateway. It is appreciated that the CFAB and JFAB blocks described above with respect to FIGS. 31 and 32 support 400G connections and operate at a power budget of 100 KW. The architecture includes a total of 3 network racks and an optional fourth rack to support backbone and metro connections.

Figure 33:
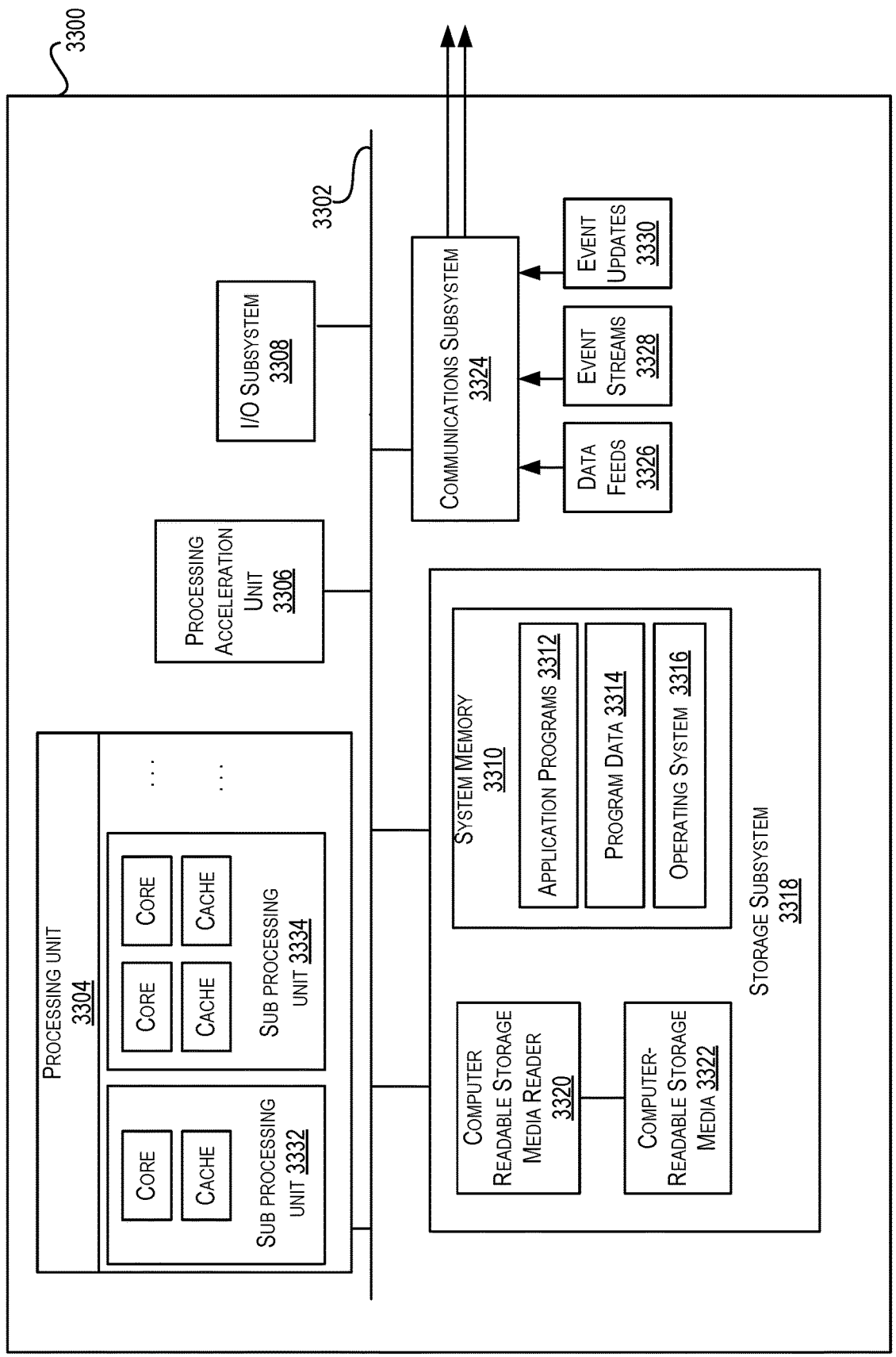
FIG. 33 is a block diagram illustrating an example computer system, according to at least one embodiment.

FIG. 33 illustrates an example computer system 3300, in which various embodiments may be implemented. The system 3300 may be used to implement any of the computer systems described above. As shown in the figure, computer system 3300 includes a processing unit 3304 that communicates with a number of peripheral subsystems via a bus subsystem 3302. These peripheral subsystems may include a processing acceleration unit 3306, an I/O subsystem 3308, a storage subsystem 3318 and a communications subsystem 3324. Storage subsystem 3318 includes tangible computer-readable storage media 3322 and a system memory 3310.

Bus subsystem 3302 provides a mechanism for letting the various components and subsystems of computer system 3300 communicate with each other as intended. Although bus subsystem 3302 is shown schematically as a single bus, alternative embodiments of the bus subsystem may utilize multiple buses. Bus subsystem 3302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 3304, which can be implemented as one or more integrated circuits (e.g., a conventional microprocessor or microcontroller), controls the operation of computer system 3300. One or more processors may be included in processing unit 3304. These processors may include single core or multicore processors. In certain embodiments, processing unit 3304 may be implemented as one or more independent processing units 3332 and/or 3334 with single or multicore processors included in each processing unit. In other embodiments, processing unit 3304 may also be implemented as a quad-core processing unit formed by integrating two dual-core processors into a single chip.

In various embodiments, processing unit 3304 can execute a variety of programs in response to program code and can maintain multiple concurrently executing programs or processes. At any given time, some or all of the program code to be executed can be resident in processor(s) 3304 and/or in storage subsystem 3318. Through suitable programming, processor(s) 3304 can provide various functionalities described above. Computer system 3300 may additionally include a processing acceleration unit 3306, which can include a digital signal processor (DSP), a special-purpose processor, and/or the like.

I/O subsystem 3308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 3300 may comprise a storage subsystem 3318 that comprises software elements, shown as being currently located within a system memory 3310. System memory 3310 may store program instructions that are loadable and executable on processing unit 3304, as well as data generated during the execution of these programs.

Depending on the configuration and type of computer system 3300, system memory 3310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 3304. In some implementations, system memory 3310 may include multiple different types of memory, such as static random access memory (SRAM) or dynamic random access memory (DRAM). In some implementations, a basic input/output system (BIOS), containing the basic routines that help to transfer information between elements within computer system 3300, such as during start-up, may typically be stored in the ROM. By way of example, and not limitation, system memory 3310 also illustrates application programs 3312, which may include client applications, Web browsers, mid-tier applications, relational database management systems (RDBMS), etc., program data 3314, and an operating system 3316. By way of example, operating system 3316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 3318 may also provide a tangible computer-readable storage medium for storing the basic programming and data constructs that provide the functionality of some embodiments. Software (programs, code modules, instructions) that when executed by a processor provide the functionality described above may be stored in storage subsystem 3318. These software modules or instructions may be executed by processing unit 3304. Storage subsystem 3318 may also provide a repository for storing data used in accordance with the present disclosure.

Storage subsystem 3300 may also include a computer-readable storage media reader 3320 that can further be connected to computer-readable storage media 3322. Together and, optionally, in combination with system memory 3310, computer-readable storage media 3322 may comprehensively represent remote, local, fixed, and/or removable storage devices plus storage media for temporarily and/or more permanently containing, storing, transmitting, and retrieving computer-readable information.

Computer-readable storage media 3322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 3300.

By way of example, computer-readable storage media 3322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 3322 may include, but is not limited to, Zip® drives, flash memory cards, universal serial bus (USB) flash drives, secure digital (SD) cards, DVD disks, digital video tape, and the like. Computer-readable storage media 3322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 3300.

Communications subsystem 3324 provides an interface to other computer systems and networks. Communications subsystem 3324 serves as an interface for receiving data from and transmitting data to other systems from computer system 3300. For example, communications subsystem 3324 may enable computer system 3300 to connect to one or more devices via the Internet. In some embodiments communications subsystem 3324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 3324 can provide wired network connectivity (e.g., Ethernet) in addition to or instead of a wireless interface.

In some embodiments, communications subsystem 3324 may also receive input communication in the form of structured and/or unstructured data feeds 3326, event streams 3328, event updates 3330, and the like on behalf of one or more users who may use computer system 3300.

By way of example, communications subsystem 3324 may be configured to receive data feeds 3326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 3324 may also be configured to receive data in the form of continuous data streams, which may include event streams 3328 of real-time events and/or event updates 3330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 3324 may also be configured to output the structured and/or unstructured data feeds 3326, event streams 3328, event updates 3330, and the like to one or more databases that may be in communication with one or more streaming data source computers coupled to computer system 3300.

Computer system 3300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 3300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
  implementing, at least in part by one or more computing devices located at a third-party location, a dedicated region cloud comprising a plurality of cloud infrastructure components providing corresponding cloud services associated with a cloud service provider, the plurality of cloud infrastructure components being hosted by the one or more computing devices, the third-party location being associated with a third-party entity that is different from the cloud service provider;
  obtaining, by a data processing service executing at a computing device of the one or more computing devices and in a corresponding tenancy that is separate from a tenancy associated with the third-party entity, capacity and usage data associated with the third-party entity and at least one of the plurality of cloud infrastructure components;
  storing, by the data processing service executing at the computing device, the capacity and usage data at a first storage location of the one or more computing devices located at the third-party location;
  executing, by at least one of the computing devices and within the dedicated region cloud located at the third-party location, a control center service that processes the capacity and usage data stored at the first storage location and presents, at a first user interface hosted within the dedicated region cloud and specific to the dedicate region cloud, at least a portion of the capacity and usage data that is associated with the at least one of the plurality of cloud infrastructure components; and storing, by the data processing service executing at the computing device, the capacity and usage data at a second storage location of the one or more computing devices located at the third-party location, the capacity and usage data being stored at the second storage location causing a central cloud service that is associated with the cloud service provider to automatically import and present the capacity and usage data at a second user interface corresponding to the cloud service provider, the second user interface presenting data corresponding to a plurality of dedicated region clouds that are hosted at a plurality of third-party locations.

2. The computer-implemented method of claim 1, wherein the first user interface hosted within the dedicated region cloud is implemented based at least in part on a console plug-in installed with a preexisting dedicated region console of the dedicated region cloud.

3. The computer-implemented method of claim 1, wherein the capacity and usage data comprises first capacity and usage data corresponding to the third-party entity and second capacity and usage data corresponding to the cloud service provider.

4. The computer-implemented method of claim 3, wherein storing the capacity and usage data at the second storage location of the dedicated region cloud causes the capacity and usage data to be obtained by one or more corresponding computing devices of a central cloud-computing environment hosted by the cloud service provider.

5. The computer-implemented method of claim 4, wherein at least one of the one or more computing devices of the central cloud-computing environment presents the capacity and usage data that is associated with the third-party entity with additional capacity and usage data that was obtained from one or more additional dedicated region clouds that are individually associated with a respective third-party entity.

6. The computer-implemented method of claim 1, wherein the first user interface hosted within the dedicated region cloud further presents additional data associated with at least one of: order tracking, incident management, facilities management, change management, or alerts.

7. The computer-implemented method of claim 1, wherein the second storage location is a dedicated object storage bucket within the dedicated region cloud.

8. The computer-implemented method of claim 1, wherein the first user interface hosted within the dedicated region cloud further presents additional data associated with order tracking, incident management, facilities management, change management, and alerts.

9. A computing device comprising:
one or more processors; and
one or more memories storing computer-executable instructions that, when executed by one or more processors of the computing device, causes the computing device to:
implement, at least in part, a dedicated region cloud comprising a plurality of cloud infrastructure components providing corresponding cloud services associated with a cloud service provider, the plurality of cloud infrastructure components being hosted by one or more computing devices located at a third-party location and comprising the computing device, the third-party location being associated with a third-party entity that is different from the cloud service provider;

obtain, by a data processing service executing at the computing device and in a corresponding tenancy that is separate from a tenancy that is associated with the third-party entity, capacity and usage data associated with the third-party entity and at least one of the plurality of cloud infrastructure components;

store, by the data processing service executing at the computing device, the capacity and usage data at a first storage location of the one or more computing devices located at the third-party location;

execute, within the dedicated region cloud located at the third-party location, a control center service that processes the capacity and usage data stored at the first storage location and presents, at a first user interface hosted within the dedicated region cloud, at least a portion of the capacity and usage data that is associated with the at least one of the plurality of cloud infrastructure components; and store, by the data processing service executing at the computing device, the capacity and usage data at a second storage location of the one or more computing devices located at the third-party location, the capacity and usage data being stored at the second storage location causing a central cloud service that is associated with the cloud service provider to automatically import and present the capacity and usage data at a second user interface corresponding to the cloud service provider, the second user interface presenting data corresponding to a plurality of dedicated region clouds that are hosted at a plurality of third-party locations.

10. The computing device of claim 9, wherein the first user interface hosted within the dedicated region cloud is implemented based at least in part on a console plug-in installed with a preexisting dedicated region console of the dedicated region cloud.

11. The computing device of claim 9, wherein the capacity and usage data comprises first capacity and usage data corresponding to the third-party entity and second capacity and usage data corresponding to the cloud service provider.

12. The computing device of claim 11, wherein storing the capacity and usage data at the second storage location of the dedicated region cloud causes the capacity and usage data to be obtained by one or more corresponding computing devices of a central cloud-computing environment hosted by the cloud service provider.

13. The computing device of claim 12, wherein at least one of the one or more computing devices of the central cloud-computing environment presents the capacity and usage data that is associated with the third-party entity with additional capacity and usage data that was obtained from one or more additional dedicated region clouds that are individually associated with a respective third-party entity.

14. A non-transitory computer readable medium storing computer-executable instructions that, when executed by a processor of a computing device, causes the computing device to:
implement, at least in part, a dedicated region cloud comprising a plurality of cloud infrastructure components providing corresponding cloud services associated with a cloud service provider, the plurality of cloud infrastructure components being hosted by one or more computing devices located at a third-party location and comprising the computing device, the third-party location being associated with a third-party entity that is different from the cloud service provider;

obtain, by a data processing service executing at the computing device in a corresponding tenancy that is separate from a tenancy that is associated with the third-party entity, capacity and usage data capacity and usage data associated with at least one of the plurality of cloud infrastructure components;

store, by the data processing service executing at the computing device, the capacity and usage data at a first storage location of the one or more computing devices located at the third-party location;

execute, within the dedicated region cloud located at the third-party location, a control center service that processes the capacity and usage data stored at the first storage location and presents, at a first user interface hosted within the dedicated region cloud and specific to the dedicated region cloud, at least a portion of the capacity and usage data that is associated with the at least one of the plurality of cloud infrastructure components; and store, by the data processing service executing at the computing device, the capacity and usage data at a second storage location of the one or more computing devices located at the third-party location, the capacity and usage data being stored at the second storage location causing a central cloud service that is associated with the cloud service provider to automatically import and present the capacity and usage data at a second user interface corresponding to the cloud service provider, the second user interface presenting data corresponding to a plurality of dedicated region clouds that are hosted at a plurality of third-party locations.

15. The non-transitory computer readable medium of claim 14, wherein the first user interface hosted within the dedicated region cloud is implemented based at least in part on a console plug-in installed with a preexisting dedicated region console of the dedicated region cloud.

16. The non-transitory computer readable medium of claim 14, wherein the capacity and usage data comprises first capacity and usage data corresponding to the third-party entity and second capacity and usage data corresponding to the cloud service provider.

17. The non-transitory computer readable medium of claim 16, wherein storing the capacity and usage data at the second storage location of the dedicated region cloud causes the capacity and usage data to be obtained by one or more corresponding computing devices of a central cloud-computing environment hosted by the cloud service provider, and wherein at least one of the one or more computing devices of the central cloud-computing environment presents the capacity and usage data that is associated with the third-party entity with additional capacity and usage data that was obtained from one or more additional dedicated region clouds that are individually associated with a respective third-party entity.

* * * * *